(12) United States Patent
Omori et al.

(10) Patent No.: US 7,271,824 B2
(45) Date of Patent: Sep. 18, 2007

(54) PIXEL CLOCK GENERATING APPARATUS, OPTICAL WRITING APPARATUS USING A PIXEL CLOCK, IMAGING APPARATUS, AND METHOD FOR GENERATING PIXEL CLOCKS

(75) Inventors: Atsufumi Omori, Kanagawa (JP); Masaaki Ishida, Kanagawa (JP); Yasuhiro Nihei, Kanagawa (JP); Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 741 days.

(21) Appl. No.: 10/259,769

(22) Filed: Sep. 30, 2002

(65) Prior Publication Data

US 2003/0067533 A1 Apr. 10, 2003

(30) Foreign Application Priority Data

| Sep. 28, 2001 | (JP) | 2001-302644 |
| Jan. 21, 2002 | (JP) | 2002-011618 |
| Mar. 20, 2002 | (JP) | 2002-079455 |

(51) Int. Cl.
B41J 2/435 (2006.01)

(52) U.S. Cl. .................................. 347/249

(58) Field of Classification Search ........ 347/234–235, 347/247–250, 252; 359/216; 708/276
See application file for complete search history.

(56) References Cited

U.S. PATENT DOCUMENTS

| 4,935,891 | A | * | 6/1990 | Curry | .......................... 708/276 |
| 5,138,479 | A | * | 8/1992 | Ando | .......................... 359/216 |
| 6,081,386 | A | | 6/2000 | Hayashi et al. | |
| 6,100,915 | A | * | 8/2000 | Iwasaki et al. | ............. 347/249 |
| 6,185,026 | B1 | | 2/2001 | Hayashi et al. | |
| 6,198,562 | B1 | | 3/2001 | Hayashi et al. | |
| 6,229,638 | B1 | | 5/2001 | Sakai et al. | |
| 6,317,246 | B1 | | 11/2001 | Hayashi et al. | |
| 6,369,927 | B2 | | 4/2002 | Hayashi | |
| 6,400,391 | B1 | | 6/2002 | Suhara et al. | |
| 6,445,482 | B1 | | 9/2002 | Hayashi | |
| 6,462,853 | B2 | | 10/2002 | Hayashi | |

(Continued)

FOREIGN PATENT DOCUMENTS

JP 06-059552 3/1994

(Continued)

OTHER PUBLICATIONS

U.S. Appl. No. 10/053,272, filed Jan. 17 2002.

(Continued)

*Primary Examiner*—Hai Pham
(74) *Attorney, Agent, or Firm*—Oblon, Spivak, McClelland, Maier & Neustadt, P.C.

(57) ABSTRACT

A pixel clock generating apparatus includes a data offset circuit and a pixel generator. The data offset circuit defines multiple data blocks, each data block consisting of a predetermined number of successive clocks, and produces phase data for each data block. The phase data represents an amount and a direction of phase shift to be carried out for a certain clock in each data block. The pixel generator receives the phase data from the data offset circuit and generates a phase-shifted pixel clock a predetermined number of times in each data block based on the phase data.

35 Claims, 49 Drawing Sheets

U.S. PATENT DOCUMENTS

| | | |
|---|---|---|
| 6,498,617 B1 | 12/2002 | Ishida et al. |
| 2001/0055140 A1 | 12/2001 | Sakai et al. |
| 2002/0105707 A1 | 8/2002 | Hayashi |
| 2003/0067533 A1 | 4/2003 | Omori et al. |

FOREIGN PATENT DOCUMENTS

| | | |
|---|---|---|
| JP | 6-242386 | 9/1994 |
| JP | 10-90629 | 4/1998 |
| JP | 2000-238319 | 9/2000 |
| JP | 2000-289251 | 10/2000 |

OTHER PUBLICATIONS

U.S. Appl. No. 09/791,407, filed Feb. 22, 2001.
U.S. Appl. No. 09/765,608, filed Jan. 22, 2001, pending.
U.S. Appl. No. 09/860,520, filed May 21, 2001, pending.
U.S. Appl. No. 09/910,797, filed Jul. 24, 2001.
U.S. Appl. No. 09/946,665, filed Sep. 6, 2001, pending.
U.S. Appl. No. 09/968,546, filed Oct. 2, 2001.
U.S. Appl. No. 09/982,831, filed Oct. 22, 2001, pending.
U.S. Appl. No. 10/028,698, filed Dec. 28, 2001, pending.
U.S. Appl. No. 10/085,707, filed Mar. 1, 2002, pending.
U.S. Appl. No. 10/101,937, filed Mar. 21, 2002, pending.
U.S. Appl. No. 10/095,913, filed Mar. 13, 2002, pending.
U.S. Appl. No. 10/143,013, filed May 13, 2002, pending.
U.S. Appl. No. 10/259,769, filed Sep. 30, 2002, pending.
U.S. Appl. No. 10/953,372, filed Sep. 30, 2004, Nihei, et al.
U.S. Appl. No. 10/927,226, filed Aug. 27, 2004, Izumi et al.
U.S. Appl. No. 10/942,073, filed Sep. 16, 2004, Ozasa, et al.
U.S. Appl. No. 10/942,825, filed Sep. 17, 2004, Hayashi.
U.S. Appl. No. 10/259,769, filed Sep. 30, 2002, Omori et al.
U.S. Appl. No. 10/866,043, filed Jun. 14, 2004, Hayashi et al.
U.S. Appl. No. 10/854,268, filed May 27, 2004, Ishida et al.
U.S. Appl. No. 10/820,733, filed Apr. 9, 2004, Suhara et al.
U.S. Appl. No. 10/803,042, filed Mar. 18, 2004, Ishida et al.
U.S. Appl. No. 10/787,095, filed Feb. 27, 2004, Hayashi et al.
U.S. Appl. No. 10/771,521, filed Feb. 5, 2004, Nihei et al.
U.S. Appl. No. 10/667,321, filed Sep. 23, 2003, Omori et al.
U.S. Appl. No. 10/642,173, filed Aug. 18, 2003, Ono et al.
U.S. Appl. No. 10/635,520, filed Aug. 7, 2003, Sakai et al.
U.S. Appl. No. 10/609,577, filed Jul. 1, 2003, Nakajima et al.
U.S. Appl. No. 10/435,034, filed May 12, 2003, Nihei et al.
U.S. Appl. No. 10/421,786, filed Apr. 24, 2003, Atsuumi et al.
U.S. Appl. No. 10/409,143, filed Apr. 9, 2003, Ozasa et al.

* cited by examiner

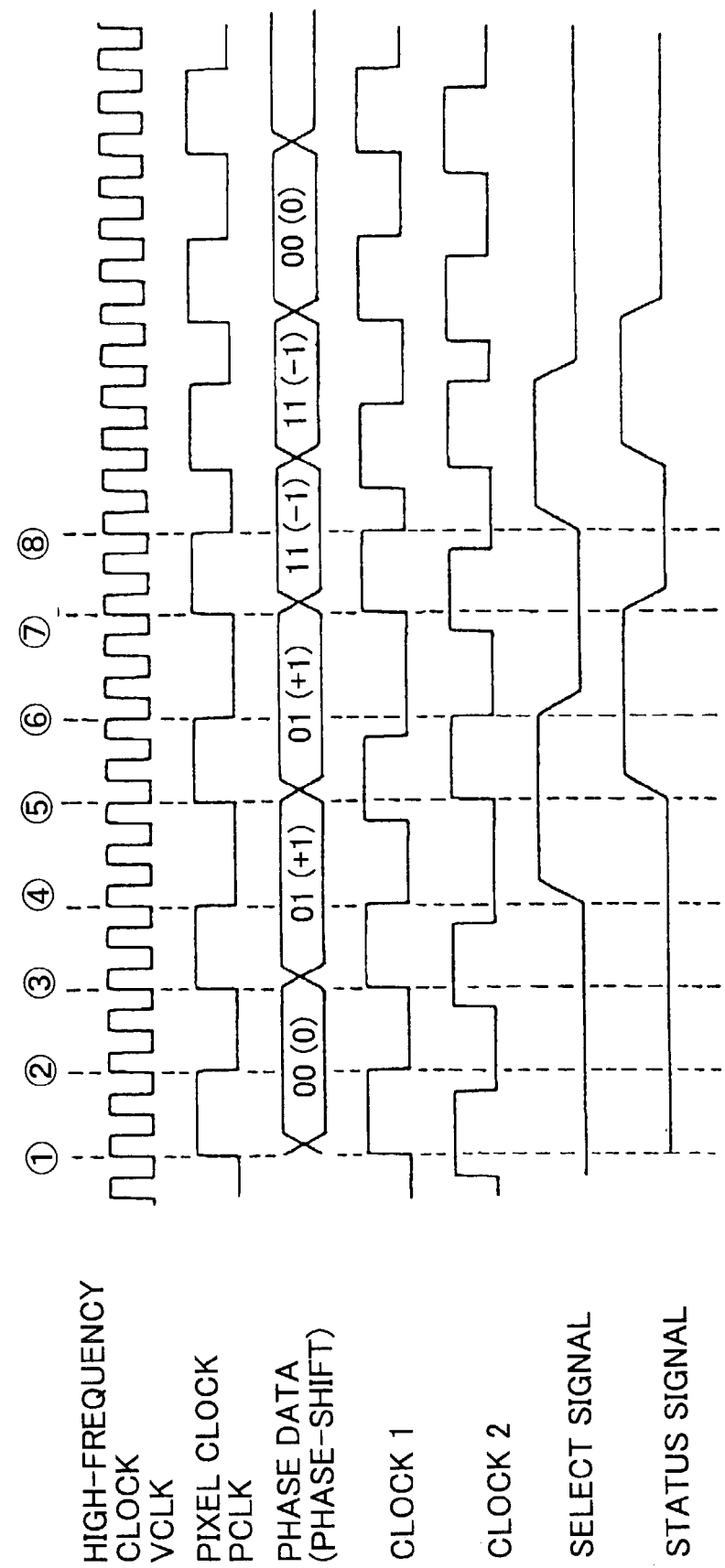

☐ 1PCLK
▨ 7/8PCLK (a) PIXEL CLOCK
(WITHOUT TIMING CHANGE)

(b) PIXEL CLOCK
(DATA OFFSET COUNTER)

(a) PIXEL CLOCK
(WITHOUT TIMING CHANGE)

(b) PIXEL CLOCK
(RESET FUNCTION)

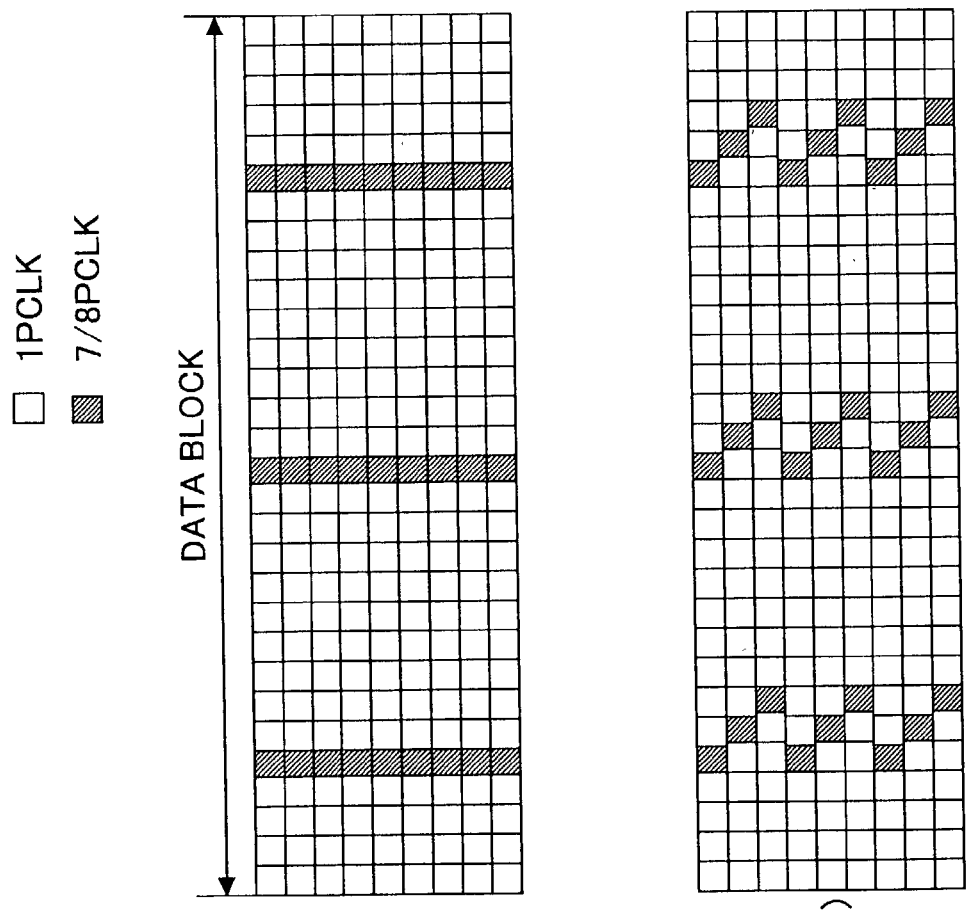

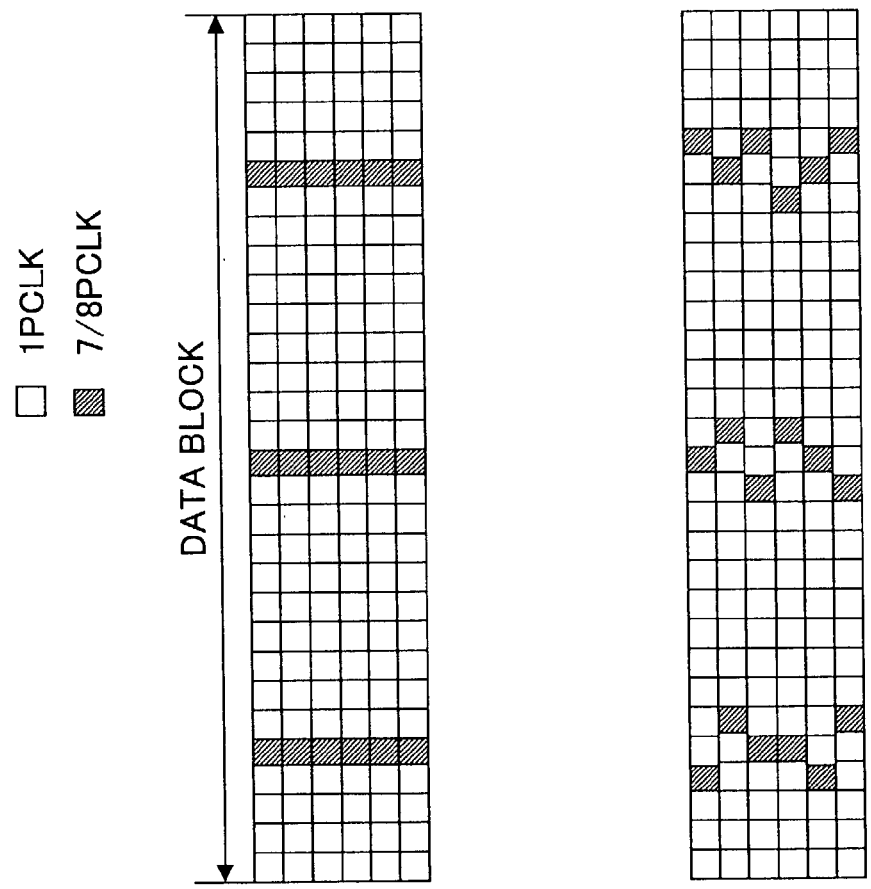
FIG.22A (a) PIXEL CLOCK (WITHOUT TIMING CHANGE)
FIG.22B (b) PIXEL CLOCK (PHASE SHIFT DATA TIMING CORRECTION CIRCUIT)

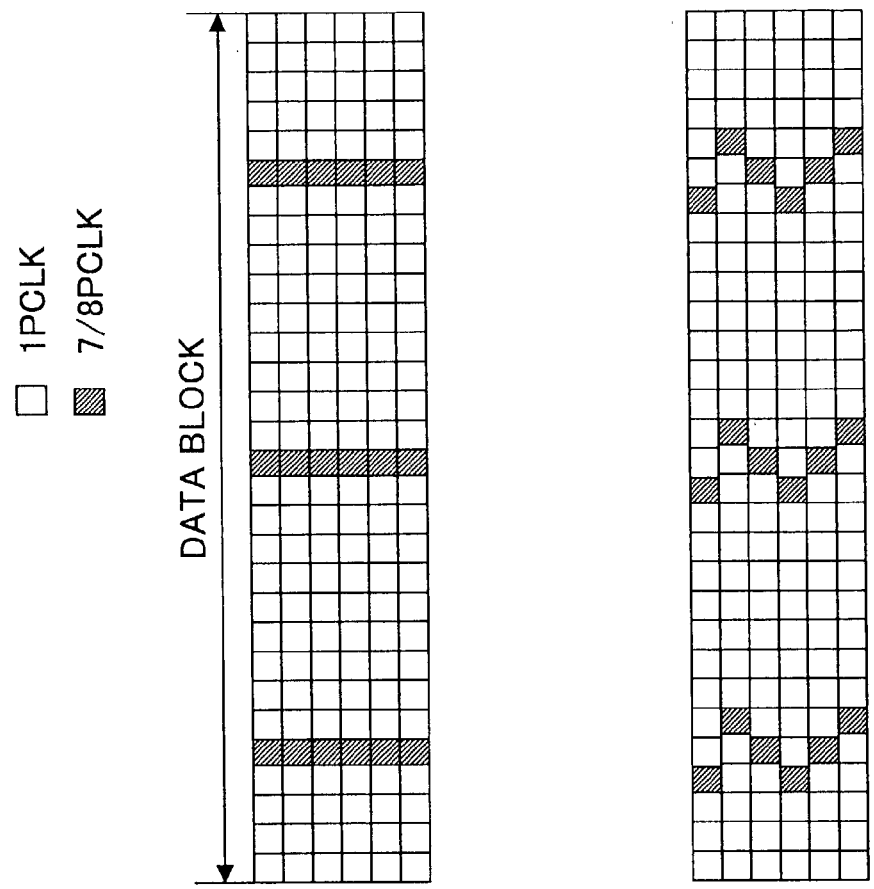
FIG.23A (a) PIXEL CLOCK (WITHOUT TIMING CHANGE)
FIG.23B (b) PIXEL CLOCK (DATA OFFSET RANDOM CIRCUIT)

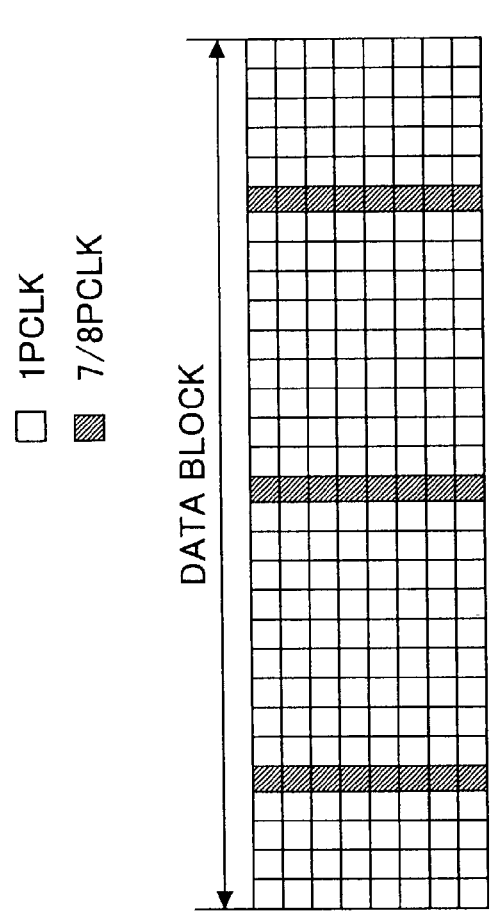
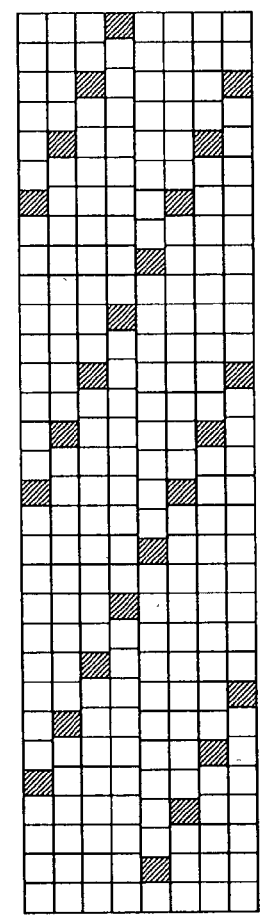
FIG. 24A (a) PIXEL CLOCK (WITHOUT TIMING CHANGE)
FIG. 24B (b) PIXEL CLOCK (PHASE SHIFT DATA COUNTER)

FIG.26A (a) INITIAL STATE (LINEARITY=0 AT CENTER OF IMAGE HEIGHT)

FIG.26B (b) WITH SHIFTED PIXEL CLOCK FREQUENCY

FIG.26C (c) AVERAGE LINEARITY = 0

PIXEL CLOCK GENERATING APPARATUS, OPTICAL WRITING APPARATUS USING A PIXEL CLOCK, IMAGING APPARATUS, AND METHOD FOR GENERATING PIXEL CLOCKS

BACKGROUND OF THE INVENTION

1. Field of the Invention

The present invention relates to a technique for controlling the phase of a pixel clock to correct the positional offset of dots in an imaging apparatus, and to a technique for detecting a scanning beam in synchronization with optical writing to control the phase of the pixel clock.

2. Description of the Related Art

FIGS. 1A and 1B schematically illustrate conventional imaging apparatuses. In FIG. 1A, a laser beam emitted from a semiconductor laser unit 1001 is reflected by a rotating polygonal mirror 1002 in a scanning direction, and focused by a scanning lens 1003 onto a photosensitive unit 1004. The focused laser beam forms a light spot and produces an electrostatic latent image on the photosensitive unit 1004. Laser driving circuit 1007 controls the light emission time of the semiconductor laser unit 1001, based on pixel data generated by an image processing unit 1006 and the pixel clock whose phases are determined by a phase synchronizing circuit 1009. The scanning laser beam is detected by a detector 1005, and the detection signal is supplied to the phase synchronizing circuit 1009.

In FIG. 1B, a pair of detectors 1010 are positioned in a plane extended from the surface of the photosensitive unit 1004 to detect synchronization of the scanning laser beam. Detection signals are supplied from the detectors 1010 to a counter 1011, and then to the look-up table 1012. The timings of the two detection signals are supplied to the phase synchronizing circuit 1009, which determines the phase of a pixel clock and supplies the phase-determined pixel clock to the image processing unit 1006. The laser driving circuit 1007 controls the light emission time of the semiconductor laser unit 1001, based on pixel data generated by an image processing unit 1006 and pixel clocks whose phases are determined by the phase synchronizing circuit 1009. In this manner, the position of the electrostatic latent image formed on the photosensitive drum (or the scanned medium) 1004 is regulated in the scanning direction.

In these imaging apparatuses, the position for forming an image has to be precisely regulated. Japanese Laid-open Patent Publication 2000-238319 discloses a technique for correcting the start position of writing an image of each color within an error range of one clock in a color laser printer. Another publication, Japanese Laid-open Patent Publication 2000-289251, discloses a technique for adjusting the start position and the end position of optical image writing in the main scanning direction.

However, even if controlling the start position and the end position of writing an optical image, the scanning rate of the light spot (formed by the scanning beam) moving on the photosensitive unit fluctuates in the conventional optical writing system. Such fluctuation of the scanning rate is due to variation in distance from the optical axis to the reflecting surface of the deflector (such as a polygonal mirror). If the scanning rate fluctuates, dot positions formed on a sheet are offset from the correct positions in the main scanning direction, which results in image fluctuation and deteriorated image quality.

When using a multi-beam optical system with multiple color light sources with different oscillation wavelengths, exposure positions of the respective color beams are offset from each other unless the chromatic aberration of the scanning lens is corrected accurately. In this case, the displacement of the light spots of the respective color beams differ from each other on the scanned medium (e.g., the photosensitive unit), which causes the image quality to deteriorate.

It is difficult to correct the displacement or positional offset of light spots or dots because the fluctuation of the scanning rate itself varies along the scanning line due to the characteristics of the optical systems used in the imaging apparatus.

Fluctuation of the scanning rate and positional offset of dots are likely to occur especially when the following factors arise:

1) the fθ characteristic of the scanning lens is not sufficiently corrected;
2) precision of the optical parts of the optical scanning system and assembling precision of the components onto the housing are insufficient;
3) the focal length changes due to deformation and change of the indexes of refraction of the optical components, which are caused by environmental changes, such as temperature change and humidity change, in the imaging apparatus;
4) the distance from the optical axis to the reflecting surface of the deflector (e.g., the polygonal mirror) varies, and the moving rate of the light spot on the scanned medium changes, as has been explained.

Neither prior art publication 2000-238319 nor 2000-289251 provide teaching that can sufficiently correct the adverse influence of positional offset of the dots occurring in the main scanning direction due to characteristics of optical systems or the deflectors.

Japanese Laid-open Patent Publication H6-59552 discloses a technique for correcting positional offset of dots in an optical scanner of a multi-point synchronizing type. This technique aims to correct displacement of the dots, which is caused by fluctuation of the rotational speed of the deflector or the variation in machining precision of optical system components. However, this technique is directed to changing the frequency of the PLL in order to control the dot position. With this method, the clock signal fluctuates due to the influence of the frequency change during the lock-up time of the PLL, and consequently, the phase of the pixel clock cannot be precisely regulated.

Another problem in the prior art is that a huge amount of correction data is required to make correction to the entirety of image data when correcting the fluctuation of the scanning rate. This problem causes the circuit scale to become large, and the cost for the control system also increases.

Still another problem is that if the phase of the pixel clock is corrected, without flexibility, based on the shift data, the corrected portions are repeated at the same positions in the sub-scanning direction, and vertical streaks appear in the resultant image.

There is yet another problem in the conventional optical writing system shown in FIG. 1B, which is separation of light flux. A portion of the light flux has to be guided to the synchronization detectors 1010 in order to control the dot position, while the remaining portion of the light flux is guided to the effective writing area on the scanned medium (photosensitive unit) 1004. To separate the light flux, the optical scanning system, including a deflector (e.g., a polygonal mirror) and other elements, inevitably becomes large. In addition, separating a portion of the light flux from the light beam guided to the effective writing area deteriorates the detecting precision. This problem becomes conspicuous especially in a multi-color imaging apparatus with multiple optical scanning systems.

It is important for the multi-color imaging apparatus to reduce relative inclination and bend of the scanning line, as well as to reduce the full-width or a partial magnification error in the scanning direction. The initial characteristics of the optical systems may be corrected by measuring the acquisitiveness prior to assembling the systems. However, errors that occur due to environmental changes as time passes, have to be measured and corrected during the operation of the apparatus.

In general, inclination of the scanning line and the full-width magnification error are measured on both sides of the effective writing area, while the bend of the scanning line and the partial magnification error have to be measured within the effective writing area. This separation of light flux between the effective writing area and the detecting positions on the both sides is difficult.

There is a known system in which multiple optical scanning systems are arranged in the main scanning direction to scan the beams on the non-scanning plane. However, it is more difficult for such a system to extract a portion of light flux in order to detect synchronization because of the layout design of arranging the optical scanning systems in the main scanning direction.

SUMMARY OF THE INVENTION

Therefore, it is an object of the present invention to provide a technique for producing a pixel clock that is capable of correcting positional offset of dots in the main scanning direction at a high precision, while reducing the amount of data required for dot offset correction.

It is another object of the invention to prevent vertical streaks in a resultant image reproduced by an imaging apparatus.

It is still another object of the invention to provide a technique for correcting positional offset of dots, based on information obtained from two or more detectors in an efficient manner, while reducing adverse influence on light flux.

To achieve the objects, in one aspect of the invention, a pixel clock generating apparatus used in an optical writing system for optically producing an image at timing of a pixel clock is provided. The pixel clock generating apparatus comprises a data offset circuit and a pixel generator. The data offset circuit defines multiple data blocks, each of the data blocks consisting of a predetermined number of successive clocks, and produces phase data for each data block, the phase data representing an amount and a direction of phase shift made to a certain clock in each data block. The pixel generator receives the phase data from the data offset circuit and generates a phase-shifted pixel clock a predetermined number of times in each of the data blocks based on the phase data.

The dot offset circuit includes a data block setting unit configured to determine said predetermined number of successive clocks in each of the data blocks, and a phase data generating unit configured to produce the phase data for each of the data blocks based on said predetermined number of clocks and phase shift data, the phase shift data representing a number of times phase shift is to be carried out in each of the data blocks.

By giving phase data to a data block unit, the amount of correction data for dot offset can be greatly reduced, while flexibly and precisely correcting dot offset in the main scanning direction for each data block.

In another aspect of the invention, an optical writing apparatus is provided. The optical writing apparatus comprises a light source; a deflector configured to deflect light flux emitted from the first light source; a photosensitive unit on which an image is optically formed; two or more detectors configured to detect the light flux and produce detection signals; an optical guide positioned between the deflector and the photosensitive unit and configured to guide the light flux deflected by the deflector to the photosensitive unit and said two or more detectors; and a pixel clock generating unit configured to create phase data and generate a pixel clock based on the phase data, the phase data being corrected based on a scanning time required for the light flux to scan between said two or more detectors and designating a phase shift timing.

In still another aspect of the invention, an optical writing apparatus comprises a light source; a photosensitive unit having a writing start position and a writing end position; a deflector configured to deflect light flux emitted from the light source toward the photosensitive unit; an optical guide configured to guide the light flux deflected from the deflector to the photosensitive unit and let the light flux scan between the writing start position and the writing end position; first and second detectors positioned corresponding to the writing start position and the writing end position and configured to detect the light flux as the light flux scans on the photosensitive unit; and a pixel clock generating unit configured to produce and adjust phase data based on a change in scanning time required for the light flux to scan between the detectors, and to generate a phase-shifted pixel clock whose phase has-been shifted based on the phase data.

The above-described optical writing apparatus can be suitably applied to an imaging apparatus, including a tandem-type color imaging apparatus. In this case, the reproduced image is sharp and clear without much dot offset in the main scanning direction.

In still another aspect of the invention, a method for generating a pixel clock used in an optical writing apparatus is provided. The method comprises the following steps.

(a) Defining multiple data blocks, each of the data blocks consisting of a predetermined number of successive clocks.

(b) Producing phase data for each of the data blocks, the phase data representing an amount and a direction of phase shift that is to be made to a certain clock in each of the data block.

(c) Then, generating a phase-shifted pixel clock based on the phase data.

With this method, phase data for designating phase shift given to a pixel clock is given to each data block, and the amount of data required to correct dot offset in the main scanning direction can be greatly reduced.

BRIEF DESCRIPTION OF THE DRAWINGS

Other objects, features, and advantages of the invention will become more apparent from the following detailed description when read in conjunction with the accompanying drawings, in which:

FIG. 5 illustrates timing charts of a high-frequency reference clock and pixel clocks;

FIG. 21 illustrates an example of making phase shift correction to successive pixel clock lines using an automatic reset function, compared with not adjusting the phase shift positions;

FIG. 22 illustrates an example of making phase shift correction to successive pixel clock lines using a phase shift data timing correction circuit, compared with not adjusting the phase shift positions;

FIG. 23 illustrates an example of making phase shift correction to successive pixel clock lines using a data offset random circuit, compared with not adjusting the phase shift positions;

FIG. 24 illustrates an example of making phase shift correction to successive pixel clock lines using a phase shift data counter, compared with not adjusting the phase shift positions;

DETAILED DESCRIPTION OF THE EMBODIMENTS

Figure 2:
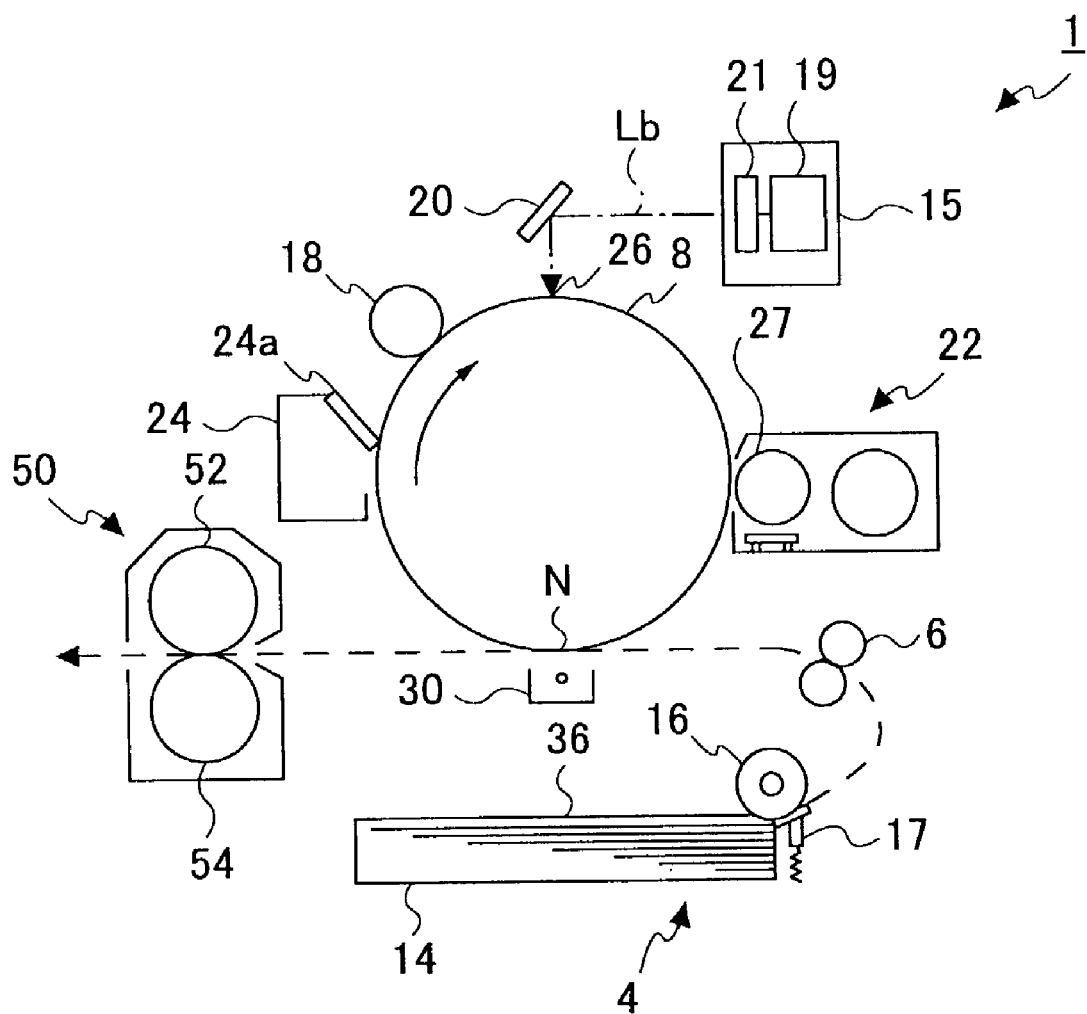
FIG. 2 illustrates the structure of an imaging apparatus to which an optical writing apparatus of the present invention is applied.

FIG. 2 illustrates a printer 1, which is an example of an imaging apparatus to which the present invention is applied. Printer 1 comprises a paper supply unit 4, a pair of resist rollers 6, a photosensitive drum 8 that carries an image, an image transfer unit 30, and a fixing unit 50.

The paper supply unit 4 includes a paper supply tray 14 in which paper (recording media) 36 are accommodated, a paper-supply roller 16 that feeds the uppermost paper from the tray 14 successively, and a separator 17. Paper 36 fed by the paper-supply roller 16 is stopped at the-pair of resist rollers 6, at which the tilt of paper is corrected, and then supplied to the image transfer site N in synchronization with the rotation of the photosensitive drum 8. In other words, paper 36 is supplied to the image transfer site N so that the leading edge of the toner image formed on the photosensitive drum 8 aligns with the prescribed position near the leading edge of the paper 36.

Around the photosensitive drum 8 in the clockwise direction are arranged a charging roller 18, an optical writing apparatus 15, a mirror 20, a developing unit 22 of a nonmagnetic single-component developing type having a sleeve 27 carrying a developer, a transfer unit 30, and a cleaning unit 24 having a cleaning blade 24a in the clockwise direction. The optical writing apparatus 15 comprises a pixel clock generating unit 19 and a laser beam emitting unit 21. The laser beam emitting unit 21 includes, for example, a semiconductor laser, and a laser driving circuit. The laser beam emitting unit 21 is connected to an image processing unit (not shown) in the optical writing apparatus 15.

Laser beam "Lb" is emitted from the laser beam emitting unit 21, and guided by the mirror 20 to the exposure position 26 on the photosensitive drum 8, which is located between the charging roller 18 and the developing unit 22. The laser beam Lb moves on surface of the photosensitive drum 8 at the exposure position 26.

In operation, when the photosensitive drum 8 starts rotating, the surface of the photosensitive drum 8 is uniformly charged by the charging roller 18. Laser beam Lb scans at the exposure position 26 based on the pixel information to form an electrostatic latent image corresponding to an image to be produced. As the photosensitive drum 8 rotates, the electrostatic latent image reaches the developing unit 22, at which toner is supplied onto the surface of the photosensitive drum 8 by the developing sleeve 27, thereby forming a visible toner image.

The toner image formed on the photosensitive drum 8 is transferred to paper 36 that has been supplied to the image transfer site N at a prescribed timing, upon application of bias voltage by the transfer unit 30.

Paper 36 that carries the toner image is transported to the fixing unit 50 having a fixing roller 52 and a pressure roller 54, and the toner image is thermally fixed under application of pressure. Then, the paper 36 is ejected to the ejecting tray (not shown).

The toner remaining on the photosensitive drum 8 is cleaned away by the cleaning blade 24a of the cleaning unit 24 as the photosensitive drum 8 rotates. Then, electric charge remaining on the photosensitive drum 8 is removed by the discharge unit (not shown) prior to the next imaging process.

First Embodiment

Figure 3:
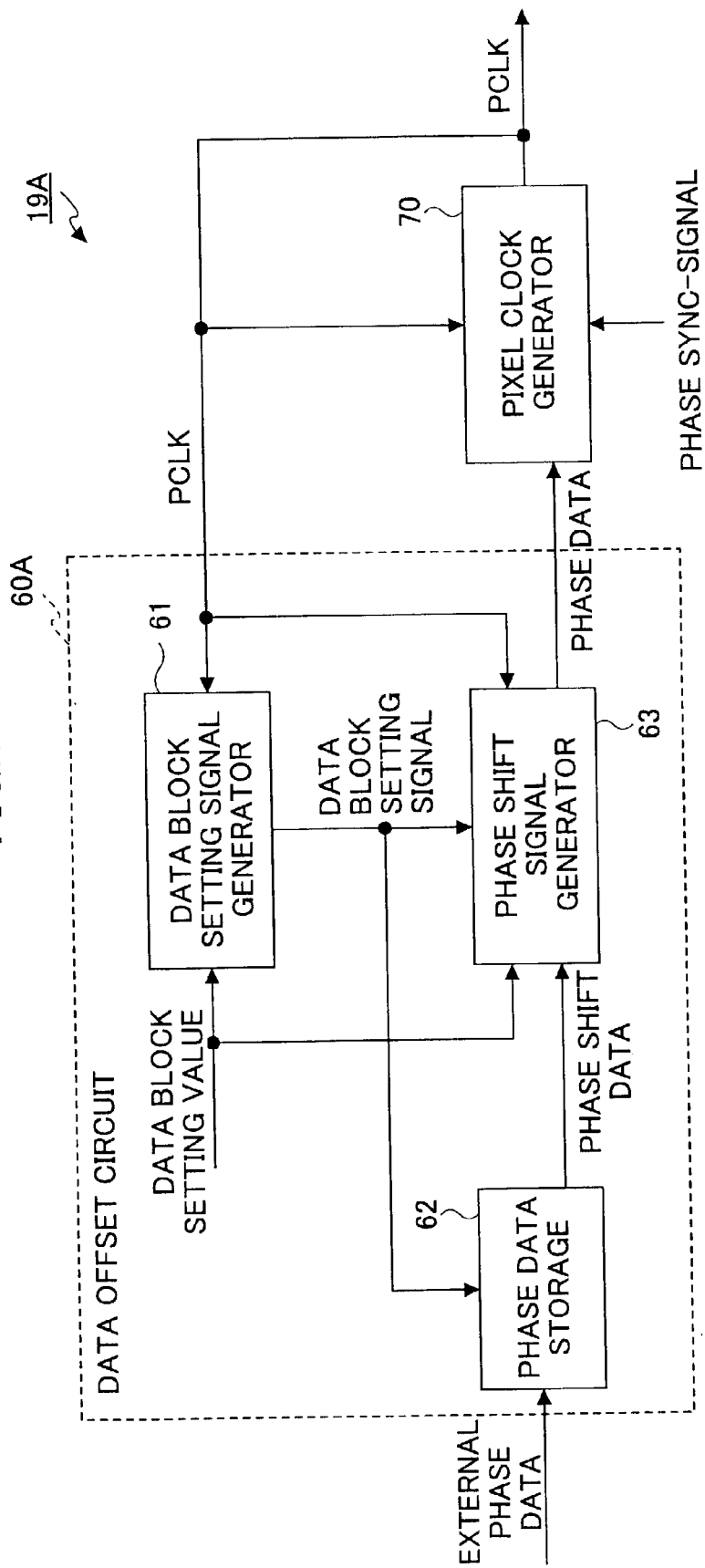
FIG. 3 illustrates a pixel clock generating unit used in the optical writing apparatus according to the first embodiment of the invention.

FIG. 3 illustrates a pixel clock generating unit 19A used in the optical writing apparatus 15 according to the first embodiment of the invention. In the first embodiment, the pixel block generating unit 19A divides the effective writing period (which corresponds to the effective writing range on the photosensitive unit) of the optical writing apparatus 15 into multiple data blocks to carry out phase shift correction for each data block. To realize this, the pixel clock generating unit 19A comprises a pixel clock generator 70, and a data offset circuit 60A that defines data blocks and provides appropriate phase data to the pixel clock generator 70 for each data block.

The data offset circuit 60A includes a data block setting signal generator 61, a phase data storage 62, and a phase shift signal generator 63. The data block setting signal generator 61 generate's a data block setting signal based on a data block setting value, that defines the number of pixel clocks PCLK contained in a data block. The data block setting signal is a timing signal for defining a data block by counting a predetermined number of PCLK. To this end, the data block setting signal generator is referred to as a data block setting unit. The phase data storage 62 stores externally supplied phase-relating data in advance. The phase data storage 62 reads the external phase data for the associated data block in response to the data block setting signal, and outputs phase shift data to the phase shift signal generator 63. The phase shift data represents how many times phase shift is to be carried out in each block. The phase shift signal generator 63 produces phase data based on the phase shift data and the data block setting signal. Phase data is a timing signal for shifting the phase of a certain pixel clock by a predetermined amount (for example, ⅛PCLK) in the positive or negative direction.

The phase data is supplied to the pixel clock generator 70, and causes the pixel clock generator 70 to produce a phase-shifted pixel clock a predetermined number of times (for example, three times in this example) in synchronization with a timing of a high-frequency reference signal during counting the clocks of each data block.

Figure 4A:
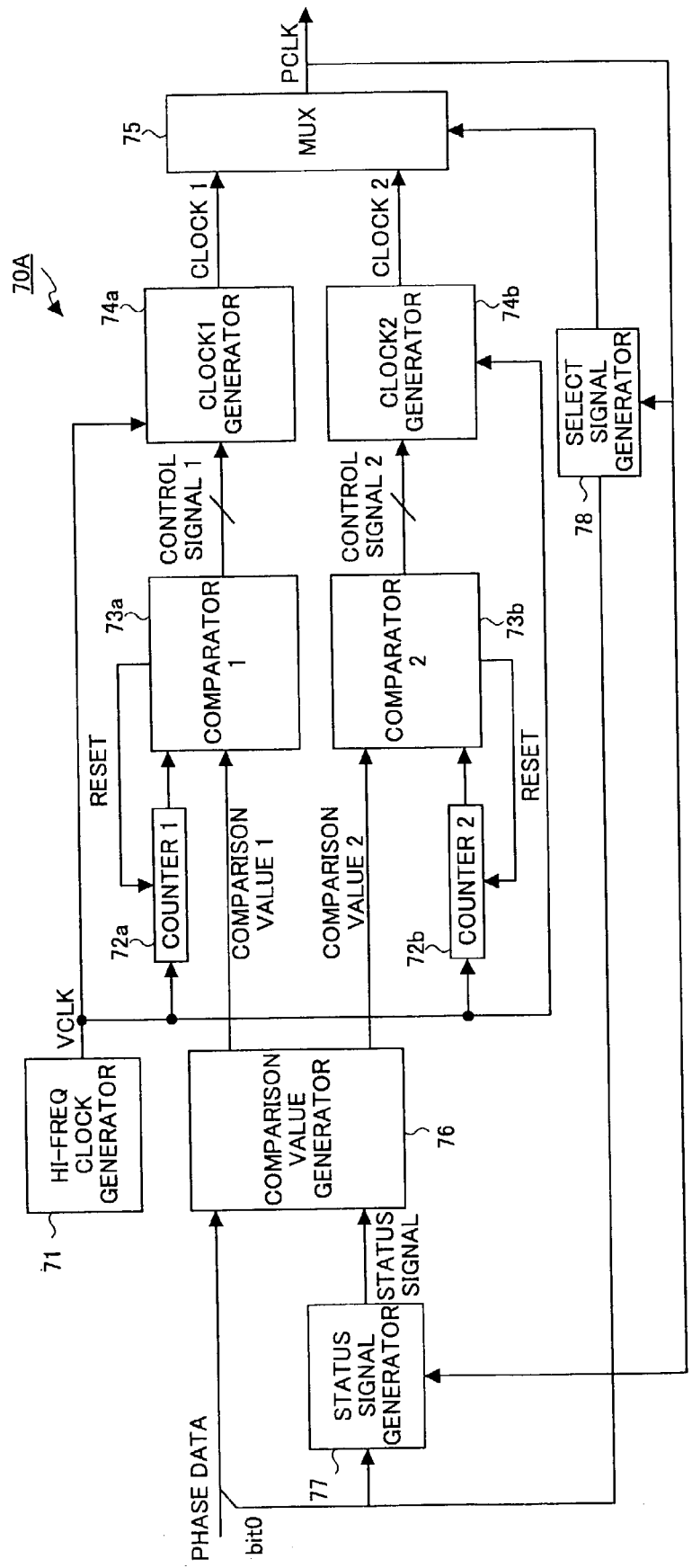
FIG. 4A and FIG. 4B illustrate examples of pixel clock generators used in the pixel clock generating unit shown in FIG. 3.
Figure 4B:
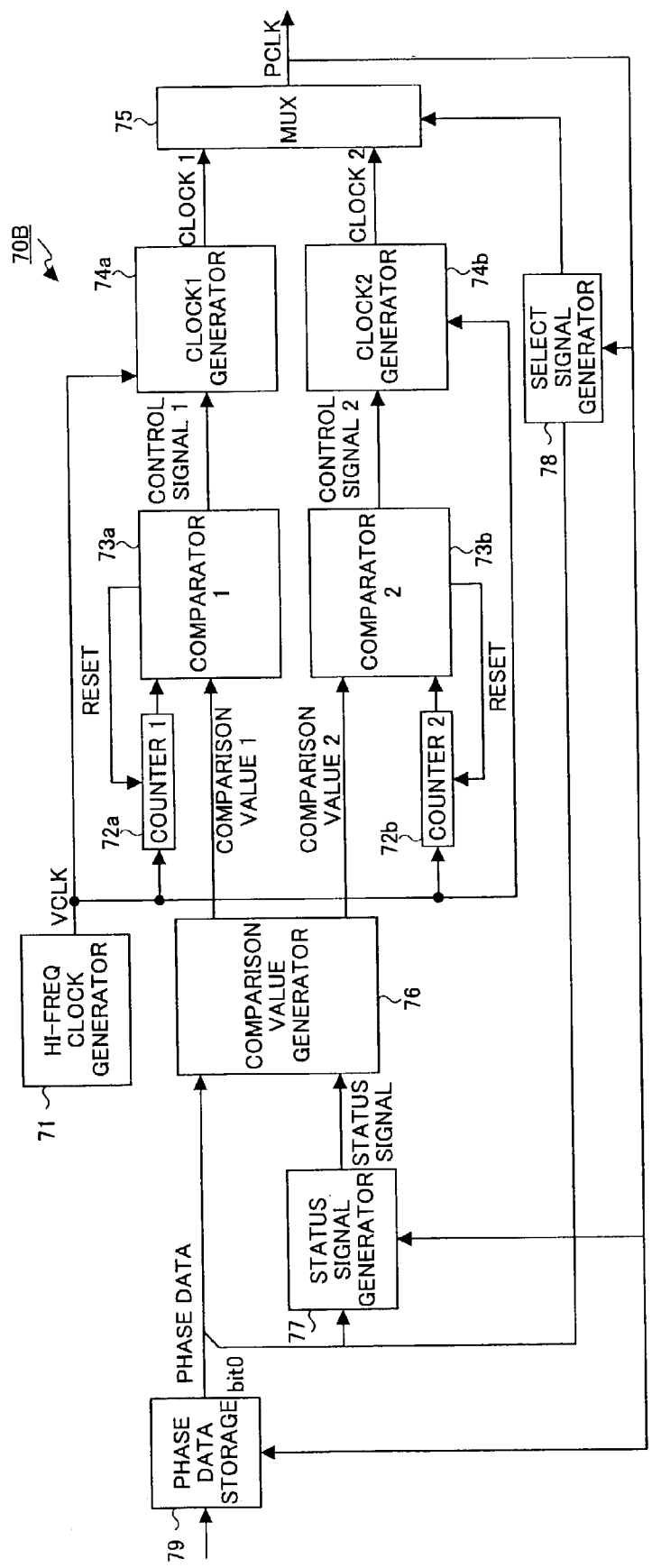

FIG. 4A and FIG. 4B illustrate examples of the pixel clock generator 70 shown in FIG. 3. In the pixel clock generator 70A shown in FIG. 4A, a high-frequency clock generating circuit 71 produces a high-frequency clock VCLK, which becomes a reference for pixel clock PCLK. The first counter 72a operates at the leading edge of VCLK. The first comparator 73a compares the counter value of the first counter 72a with a predetermined value, and with the comparison value 1 output from the comparison value generator 76. Then, the first comparator 73a outputs a control signal 1 based on the comparison result. The clock 1 generating circuit 74a produces clock 1 based on the control signal 1. The second counter 72b operates at the trailing edge of VCLK. The second comparator 73b compares the counter value of the second counter 72b with a predetermined value, and with the comparison value 2 that is output from the comparison value generator 76. Then, the second comparator 73b outputs a control signal 2 based on the comparison result. The clock 2 generating circuit 74b produces clock 2 based on the control signal 2.

Multiplexer (MUX) 75 selects either clock 1 or clock 2, based on a select signal generated by a select signal generating circuit 78, to output PCLK. The comparison value generator 76 produces comparison values 1 and 2, based on the phase data supplied form the data offset circuit 60A and on a status signal produced by the status signal generating circuit 77. The status signal generating circuit 77 toggles a signal at the leading edge of PCLK when bit0 (LSB) of the phase data is "1", and outputs the status signal. The select signal generating circuit 78 toggles a signal at the trailing edge of PCLK when bit0 (LSB) of the phase data is "1", and outputs a select signal.

In the pixel clock generator 70B shown in FIG. 4B, a phase data storage 79 is added. Phase data supplied from the data offset circuit 60A is stored in the phase data storage 79. The phase data storage outputs phase data successively in synchronization with pixel clock PCLK. The same set of phase data may be required for every scanning line to correct the fluctuation of the scanning rate due to a static factor, such as the characteristics of the scanning lens. In this case, a predetermined set of phase data is stored in the phase data storage 79 in advance, and this set of phase data is output every time a new line is scanned. With this arrangement, it is unnecessary to externally supply the same set of phase data for each line. The phase data output from the phase data storage 79 may be composite with externally supplied phase data. Such composite data can be used to control the phase of clock signals when correcting fluctuation due to a dynamic factor, such as the instable rotating speed of the polygonal mirror or a temperature change in the optical system.

FIG. 5 is a time chart of the pixel clock generating unit 19A. In this example, a pixel clock PCLK generated by the pixel clock generating unit 19A has a quarter (¼) frequency of VCLK, and the amount of phase shift is either +(⅛)PCLk, −(⅛)PCLK, or zero, depending on the value of two-bit phase data. The relation between the phase data and the amount of phase shift is defined in Table 1. FIG. 5 also shows pulse timings of clock 1 and clock 2.

TABLE 1

| Amount of phase shift | Phase data |
| --- | --- |
| 0 | 00 |
| +(⅛)PCLK | 01 |
| −(⅛)PCLK | 11 |

When clock 1 is selected by multiplexer (MUX) 75, phase data "00" shown in Table 1 is given in synchronization with PCLK (at time 1). Since bit0 (LSB) of the phase data is "0", the select signal is also "0", and clock 1 is output as PCLK (at time 2). Accordingly, PCLK is a clock without phase shift. Then, the phase data "01" is given (at time 3). In this case, bit0 (LSB) of the phase data is "1", and select signal is toggled to "1" at the trailing edge of PCLK (at time 4). Consequently, clock 2 is selected, which is to be output as PCLK. At this time, the period of clock 2 has been extended by a period of VCLk, and consequently, a PCLK with the phase shifted by +(⅛)PCLK is obtained.

Then, phase data "01" is again given (at time 5). Since bit0 of the phase data is "1", the select signal is toggled to "0" at the trailing edge of PCLK to select clock 1 (at time 6). The clock 1 is to be output as PCLK. At this time, the period of clock 1 has been extended by a period of VCLK, and consequently, PCLK with a phase shifted by +(⅛) is obtained.

Then, phase data "11" is given (at time 7). Since bit0 of the phase data is "1", the select signal is toggled to "1" at the trailing edge of PCLK to select (at time 8). Clock 2 is to be output as PCLK. At this time, the period of clock 1 has been shortened by a period of VCLK, and consequently, PCLK with a phase shifted by −(⅛)PCLK is obtained. In this manner, the periods of clock 1 and clock 2 are varied according to the phase data. Clock 1 and clock 2, each having a variable period, are switched, and a selected one is output as PCLK. Consequently, a pixel clock with a phase shifted by a step size of −(⅛)PCLK can be obtained.

Figure 6:
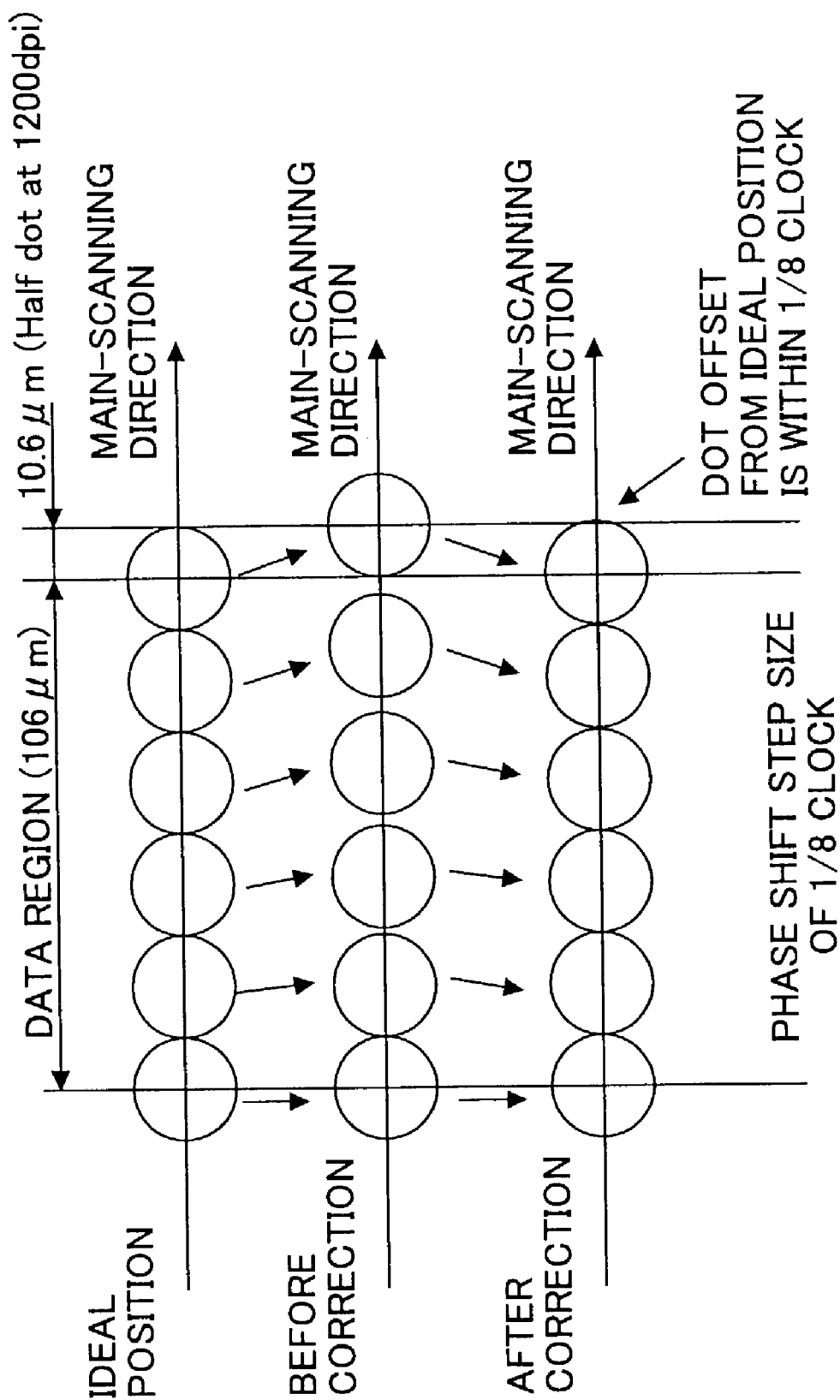
FIG. 6 illustrates how dot positions are corrected based on phase correction for the pixel clocks.

FIG. 6 illustrates how positional offset of dots is corrected using the phase-shifted pixel clock PCLK generated by the pixel clock generating unit 19. As has been explained with reference to FIG. 5, the phase of the pixel clock PCLK is shifted by +(⅛)PCLK or −(⅛)PCLK based on phase data which is given in synchronization with each pixel clock PCLK. The optical writing apparatus 15 (shown in FIG. 2) forms a electrostatic latent image on the photosensitive drum 8 by controlling the beam emission time of the semiconductor laser based on the pixel data produced by the image processing unit and the pixel clock that becomes the reference for the pixel data. By shifting the phase of the pixel clock PCLK, the positional offset of dots, which occurs in the main scanning direction because of the fluctuation of the scanning speed due to the characteristics of the optical elements, or of the displacement of the exposure spot due to difference in the oscillation wavelengths of multi-color light sources, can be corrected at a precision of the phase shift (for example, one eighth (⅛) of PCLK).

In FIG. 6, "ideal position" indicates the correct dot positions in the main scanning direction, where fluctuation of scanning rate or displacement of exposure spots does not occur. Successive six dots with a diameter of 21.2 μm are formed at 1200 dpi. Before correction, the first dot is located at the correct position. However, the sixth dot is offset from the correct position by 10.6 μm, which corresponds to half (½) dot at a rate of 1200 dpi.

Since time required for writing a dot is one pixel clock (1 PCLK), the dot position can be corrected at a precision of one eighth (⅛) of dot with phase shift resolution of (⅛) PCLK.

After correction, the position of the sixth dot is located at the appropriate position by carrying out four times of phase shift of −(⅛)PCLK. Consequently, the position of the sixth dot is shifted by total of −(½)PCLK.

Figure 7:
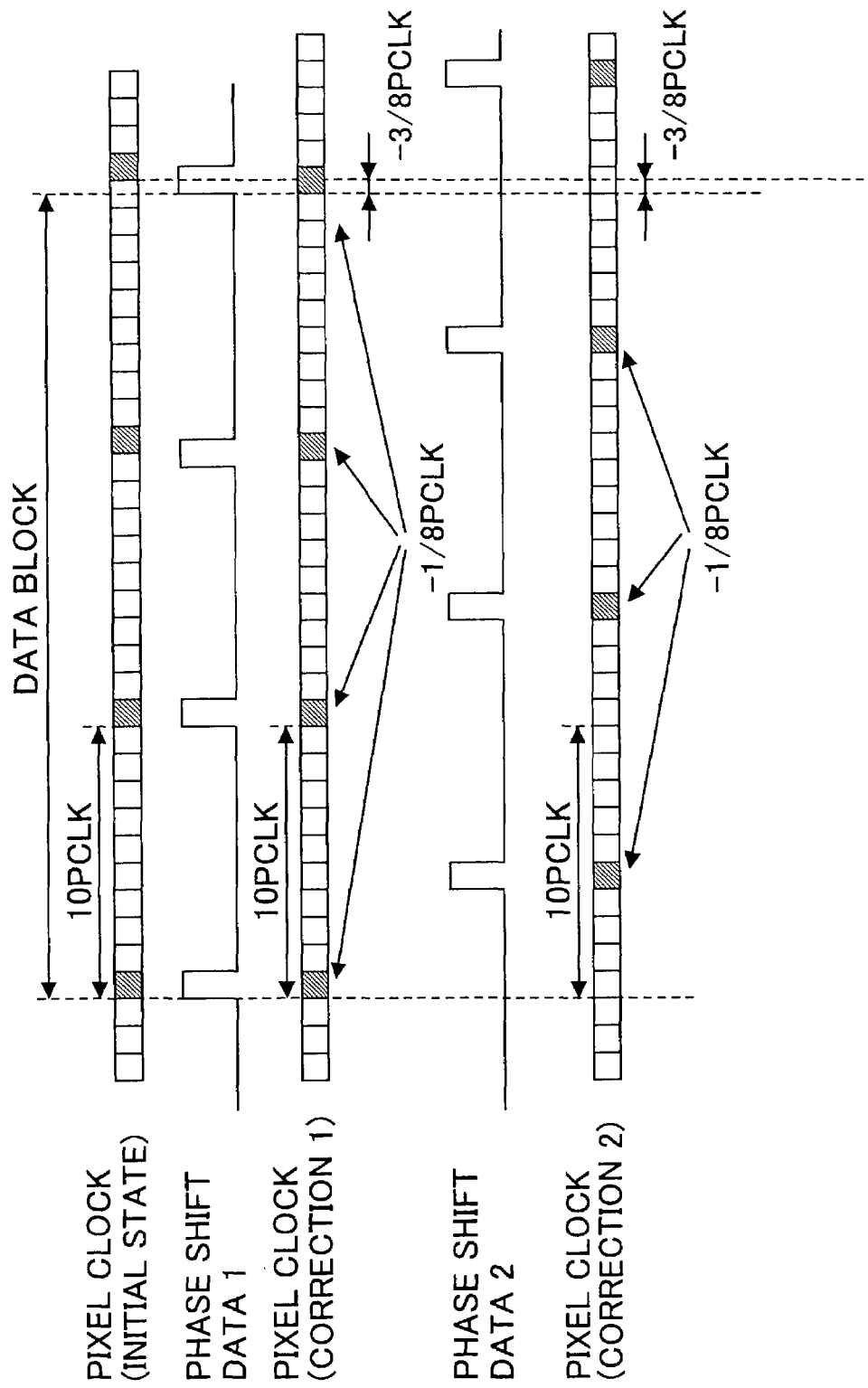
FIG. 7 illustrates examples of providing phase shift data to certain pixel clocks in a data block using the pixel clock generating unit according to the first embodiment.

FIG. 7 illustrates how the pixel clock is shifted in a data block. In this example, a data block consists of thirty pixel clocks (PCLK), which is determined by the data block setting value (see FIG. 3), and total phase shift in this data block is −(⅜)PCLK. Assuming that the phase shift resolution of a pixel clock is ±(⅛)PCLK, phase shift is carried out three times in each data block. In the example shown in FIG. 7, phase shift is carried out every constant number of pixel clocks. In this case, the pixel clock generating unit 19A has a phase shift counter (not shown) to determine the phase shift timing of a constant interval.

In Correction 1 shown in FIG. 7, phase shift of −(⅛) PCLK is carried out every ten pixel clocks, starting from the first pixel clock in the data block, based on phase shift data 1 that has a value of −3 and defines the phase shift positions. In correction 2, phase shift of −(⅛)PCLK is carried out every ten pixel clocks, but starting from the fifth pixel clock in the data block, based on phase shift data 2 having a value of −3 and defining the fifth pixel clock as the phase shift start position. In this manner, the data offset circuit 60A controls the phase shift start position for each data block.

Figure 8:
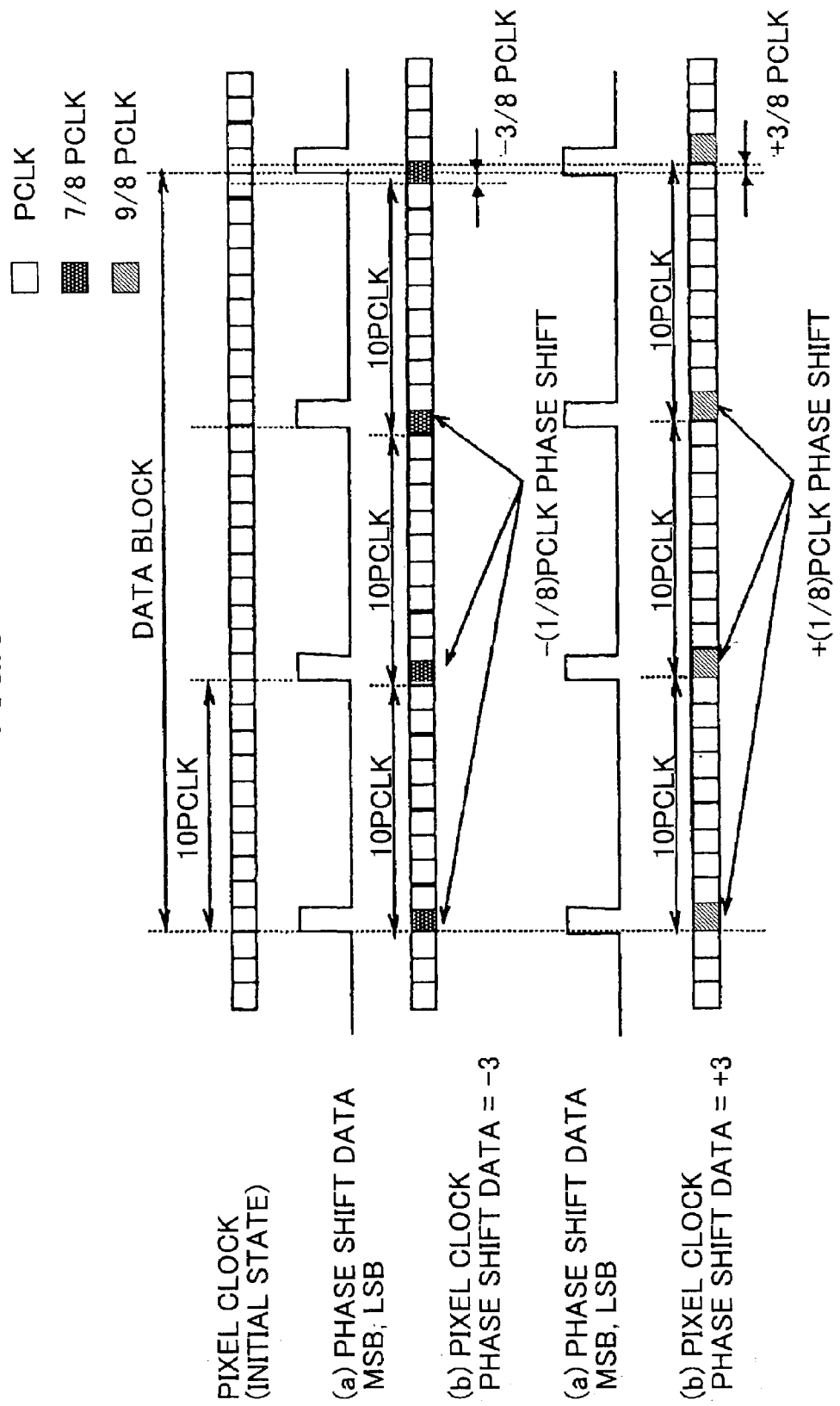
FIG. 8 illustrates examples of providing phase shifts in the positive and negative directions.

FIG. 8 also illustrates an example of carrying out phase shift at regular intervals of pixel clocks in the negative or positive direction, depending on the value of the two-bit phase data shown in Table 1. Although, in FIG. 8, the phase shift is carried out beginning from the first pixel clock, the phase shift start position may be changed by the data offset circuit 60A as shown in FIG. 7.

When shifting the phase of PCLK by total three eighth (⅜) of PCLK in a data block in the positive direction, phase shift data has a value +3. Accordingly, phase shift of +(⅛)PCLK, which is the correcting resolution, is carried out three time every ten pixel clocks. The phase-shifted pixel clock has a period of nine eighth (⅞) of PCLK.

Phase shift data may be produced as serial data, which is input directly to the pixel clock generating unit 19A from an externally generated signal. Alternatively, a counter may be provided to carry out phase shift at a predetermined interval. The former method allows phase shift to be carried out at a desired position in the data block, and the phase shift timing can be changed so that the phase shift pattern does not affect the resultant image. With the latter method, the initial value of the counter can be changed so as to prevent a vertical streak from appearing when writing a number of successive lines.

In the embodiment, PCLK signals generated by the pixel clock generating unit 19A are input to necessary circuits (e.g., an image processing unit or a laser driving circuit) at a timing of a phase synchronizing signal. However, since the actual image region is defined a predetermined number of pixel clocks behind the phase synchronizing signal, a counter may be provided at the input port of each circuit so as to input the pixel clock PCLK after said predetermined number of clocks are counted.

Second Embodiment

Figure 9:
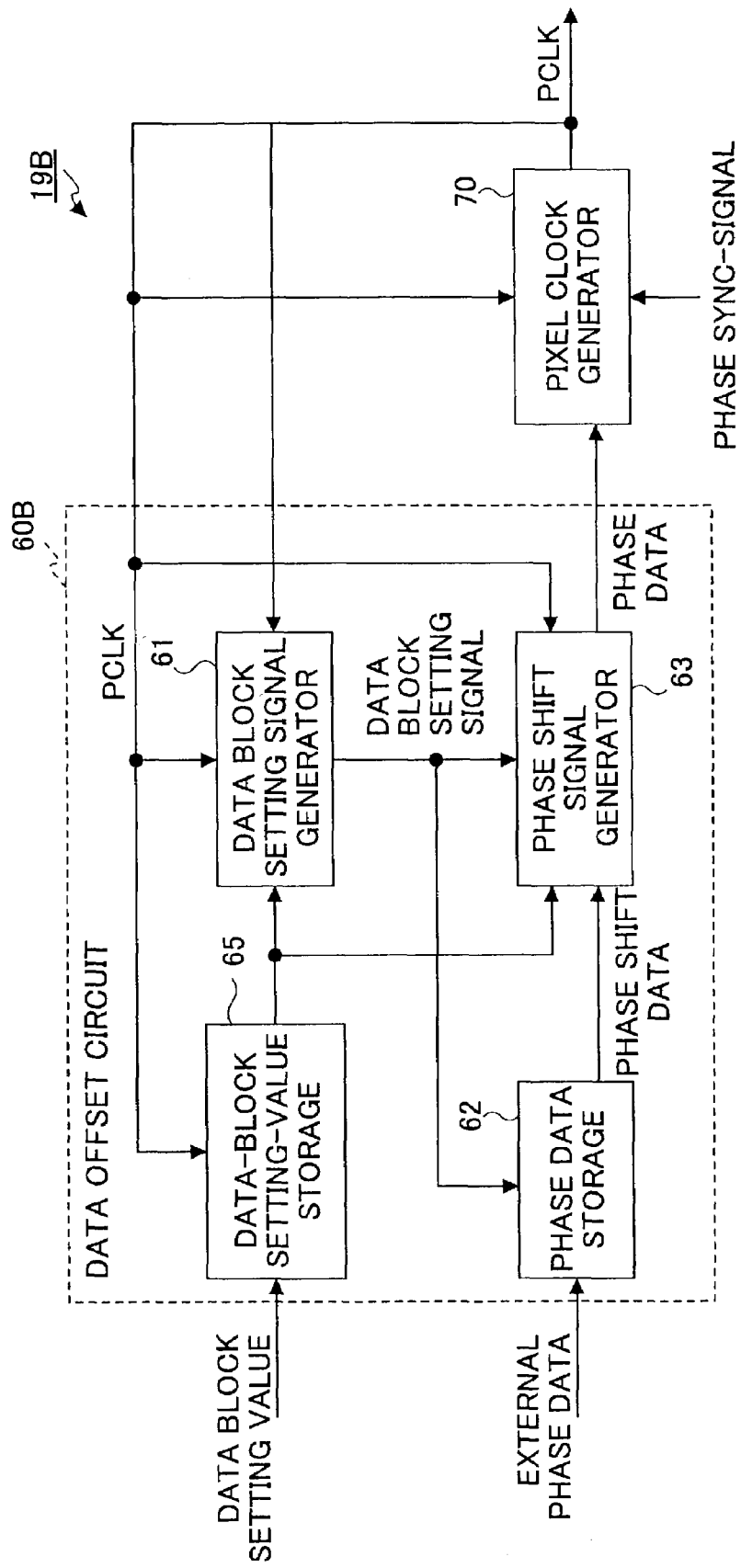
FIG. 9 illustrates a pixel clock generating unit used in the optical writing apparatus according to the second embodiment of the invention.

FIG. 9 illustrates a pixel clock generating unit 19B used in the optical writing apparatus 15 according to the second embodiment of the invention. The pixel clock generating unit 19B comprises a data offset circuit 60B, and a pixel clock generator 70. The structure of the pixel clock generator 70 is the same as that shown in FIG. 4A or FIG. 4B. The data offset circuit 60B includes data-block setting-value storage 65, in addition to the data block setting signal generator 61, the phase data storage 62, and the phase shift signal generator 63. The same elements as those shown in FIG. 3 of the first embodiment are denoted by the same numerical references, and the explanation for them will be omitted.

The data-block setting-value storage 65 stores externally supplied data region setting values, and reads a data region setting value at a timing of input of PCLK. The dot offset characteristic in the main scanning direction is measured in advance over the entire image height, and the number of PCLK included in a data block is determined for each image height based on the dot offset characteristic, which varies depending on the image height. The number of PCLK for each image height is then stored in the data block setting value storage 65.

The effective writing period is divided into, for example, fifteen data blocks, and each data block has a different number of pixel clocks, depending on the corresponding image height. This arrangement allows the correction accuracy to improve, as compared with the case of using equally divided data blocks, each having the same number of pixel clocks. This effect is illustrated in FIG. 11(C) and FIG. 11(D), which will be explained in more detail below. In other words, by varying the size of data block depending on the image height, the total number of data blocks can be reduced to achieve the same extent of correction accuracy with the equally divided data blocks. This effect is illustrated in FIGS. 10(C) and 10(D), the details of which will be described below. Consequently, the data size and the memory size required for carrying out phase shift correction can be greatly reduced.

The data block setting values may also be determined based on the dot offset data measured in advance. Dot offset data in the main scanning direction can be obtained using a pair of photo detectors, which are positioned along the image height with a certain distance between them. A laser beam scans in the main scanning direction, and time difference between the light fluxes passing through the two photo detectors is measured. The time difference is converted into a positional offset of dots in the main scanning direction. The measurement is carried out over the entire image height. If image height data X(n) includes X(−n), X(−n+1), ... X(−1), X(1), X(2), ... X(n−1), X(n), and if positional offset data Y(n) includes Y(−n), Y(−n+1), ... Y(−1), Y(1), Y(2), Y(n−1), Y(n), then the dot offset in the main scanning direction between image height X(a) and image height X(a+b) is |Y(a+b)−Y(a)|. The step size of image height is determined so that the absolute value of dot offset (|Y(a+b)−Y(a)|) does not exceed a predetermined value. In this case, a computing unit for determining a step size between two adjacent image heights is provided. Then, the step size between two adjacent image heights is synchronized with a pixel clock PCLK, thereby acquiring the number of pixel clocks that corresponds to a data block setting value. With this arrangement, if the dot offset in the main scanning direction is large between certain image heights, the data block is made small so that the correction density increases. If the dot offset in the main scanning direction is small at a certain step of image height, the data block is made large. By changing the number of pixel clocks depending on the image height, more flexible and precise correction can be made to dot offset in the main scanning direction.

In general, the semiconductor laser is modulated by a pixel clock in the effective scanning period that defines the actual imaging area, and the modulated laser beam forms an electrostatic latent image on the photosensitive unit via the optical system. If the pixel clock generating unit is designed so that a pixel clock is generated at a certain time period after the rising edge of the phase synchronizing signal for designating a start timing of writing, a light spot formed on the photosensitive unit by the semiconductor laser is offset in the main scanning direction. Although the effective scanning period in the main scanning direction varies depending on the optical system, the image height can be expressed in a relative manner. For example, if the center of image height is set to zero, the maximum and the minimum image heights can be set to 1 and −1 for an arbitrary optical system.

Figure 10:
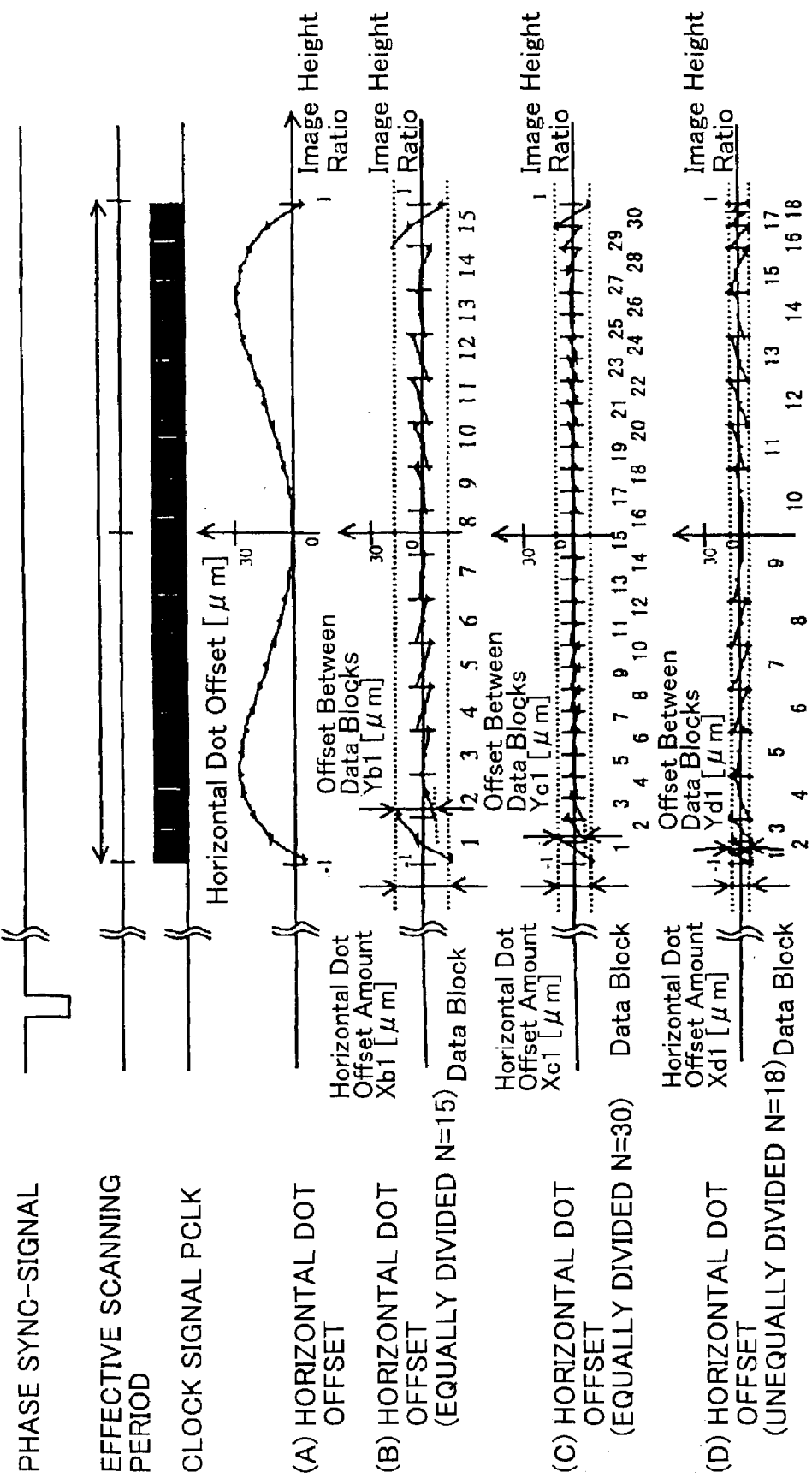
FIG. 10 illustrates charts showing the relation between the dot offset amount and phase shift correction carried out in equally and unequally divided data blocks in an optical writing apparatus having a certain offset characteristic.
Figure 11:
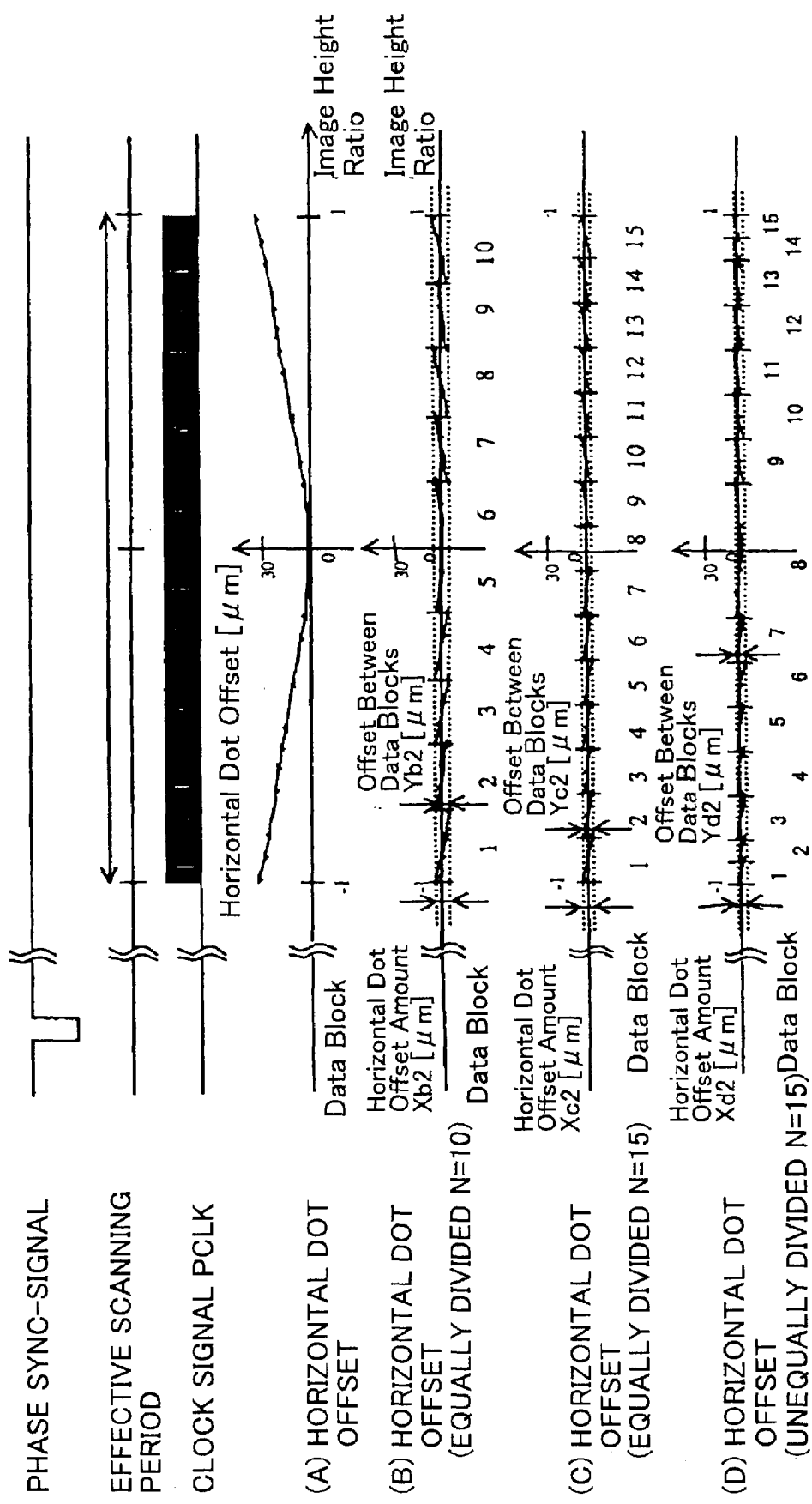
FIG. 11 illustrates charts showing the relation between the dot offset amount and phase shift correction carried out in equally and unequally divided data blocks in an optical writing apparatus having a different offset characteristic.

FIG. 10 and FIG. 11 are charts showing dot offset in the main scanning direction (or the horizontal direction of paper) over the effective scanning range (or period). In FIGS. 10(A)-10(D) and FIGS. 11(A)-11(D), the horizontal axis represents image height ratio, and the vertical axis represents dot offset in the main scanning direction. In FIG. 10, an optical system having dot-offset characteristic shown in FIG. 10 is used. Phase shift correction is carried out by dividing the effective scanning period into fifteen equal data blocks (FIG. 10(B)), thirty equal data blocks (FIG. 10(C)), and eighteen unequal data blocks (FIG. 10(D)). In FIG. 11, an optical system having the dot-offset characteristic shown in FIG. 11(A) is used, and phase shift correction is carried out by dividing the effective scanning period into ten equal data blocks (FIG. 11(B)), fifteen equal data blocks (FIG. 11(C)), and fifteen unequal data blocks (FIG. 11(D)).

According to the optical characteristics shown in FIGS. 10(A) and 11(A), dot offset becomes large as the image height increases, while dot offset becomes small at the center at which the image height is zero. In either case, phase data is given for each data block so that the amount of dot offset becomes zero at the center of each image height. In these charts, X denotes the dot offset amount in the main scanning direction (or in the horizontal direction) after phase shift correction is made, and Y denotes the offset amount between data blocks. If the absolute value of X is small, the condition of phase shift correction is effective. If the absolute value of Y is large, the dot density varies between adjacent data blocks, either dense or sparse. Therefore, Y has to be as small as possible.

In FIG. 10(B), the effective scanning period, which corresponds to the effective writing range of 300 mm, is equally divided into fifteen data blocks (N=15), and the image height is, for example, ±150 mm. If the writing rate is 1200 dpi, the length of each data block becomes 20 mm. Since the dot diameter is 21.2 µm, each data block contains 943 (20/0.212=943) dots. If all of the pixel clocks are subjected to phase shift in each data block, at a resolution of ±(⅛)PCLK, then the total of about ±2.5 mm of dot shift can be achieved in each data block. The maximum and the minimum amount of phase shift can be uniform in the respective data blocks because each data block consists of the same number of pixels.

In FIG. 11(B), the effective scanning period is equally divided into ten data blocks (N=10), and the phase data is set so that the linearity becomes zero between data block 5 and data block 6. If the amount of phase shift is ±(⅛)PCLK and if phase shift data is given to every pixel clock, two bits are required to define three types of phase shift (that is, negative ⅛ clock, zero, and positive ⅛ clock). If the effective scanning length is 300 mm at 1200 dpi, a dot has a diameter of about 21.2 µm. The total number of dots is 300/0.0212, which equals 14150 dots. The number of dots contained in a data section is 14150/10, which equals 1415.

For correcting the fluctuation of the scanning rate due to a static characteristic, such as the characteristic of the scanning lens, two-bit phase data is given to every pixel clock. If dot offset correction is made for each pixel over the entire range of a scanning line, as in the conventional technique, total 28350 bits of data (2×14150=28350) are required for each scanning line.

In contrast, with the present invention, dot offset correction is made for each data block, each region containing 1415 dots in the above-described example. Twelve bits are sufficient to designate the number of dots that are subjected to phase shift among the 1415 dots. As has been explained, two bits are required to define three types of phase shift, and therefore, 24 bits (12×2) are required to determine phase data for a data block. With ten data blocks, only 240 bits (24×10) are required to set phase data for a scanning line. Accordingly, only 8% of memory capacity is required, as compared with setting phase data for each pixel clock. When making the pixel clock generating unit as an IC or an IP, the chip size can be greatly reduced with the reduced memory size.

Since the pixel clock generating units 19B is capable of shifting the phase of pixel clock in a fraction of a clock, the position of the light spot formed on the photosensitive drum 8 can be adjusted in the main scanning direction in a fraction of a dot. For example, if the resolution of phase shift is plus or minus one eighth (±⅛) of PCLK, the correcting amount for linearity can be regulated in the range from 0% to 12.5%. At a writing rate of 1200 dpi, the maximum dot offset in the main scanning direction for each dot can be reduced to 2.6 µm (21.2 µm/8) over the entire effective scanning range.

In FIGS. 10(B) and FIG. 11(B), the number of data blocks is determined so that the dot offset amount Xb in the main scanning direction does not exceed 25 µm. Dot offset between data blocks can also be reduced to or below 25 µm. Since the dot diameter is about 21.2 µm at 120 dpi, the positional offset of dots can be corrected within an error of only about one pixel. Consequently, a high-quality image can be produced with little dot fluctuation.

In FIG. 10(C) and FIG. 11(C), the number of data blocks is determined so that the dot offset amount Xc in the main scanning direction does not exceeds 10 µm. Dot offset between data blocks can also be reduced to or below 10 µm. At the writing rate of 2400 dpi, the dot diameter becomes about 10.6 µm. Accordingly, the positional offset of dots can be corrected within an error of only about one pixel, and a high-quality image can be obtained with greatly reduced dot offset.

In FIG. 10(D) and FIG. 11(D), the effective scanning period is divided into multiple data blocks unequally. In both FIG. 10(D) and 11(D), the data block near the center of the effective scanning period is set large, while the data block near the ends of the scanning period is set small. Since the data offset becomes large at both ends of the scanning range (where the image height is near ±1) the phase shift correction is carried out denser in the end data blocks. The number of data blocks of FIG. 10(D) is eighteen (N=18), which is much smaller than the equally divided thirty data blocks (N=30) shown in FIG. 10(C), but achieving the same extent of phase shift correction. The number of data blocks of FIG. 11(D) is fifteen (N=15), which is the same as that shown in FIG. 11(C). However, setting unequal data blocks allows the dot offset in the main scanning direction to be greatly reduced after the phase shift correction, as compared with the equal size of data blocks. As a result, the amount of phase data can be reduced, and the memory and the circuit can be made compact, while achieving more flexible and more precise dot-offset correction.

Figure 12:
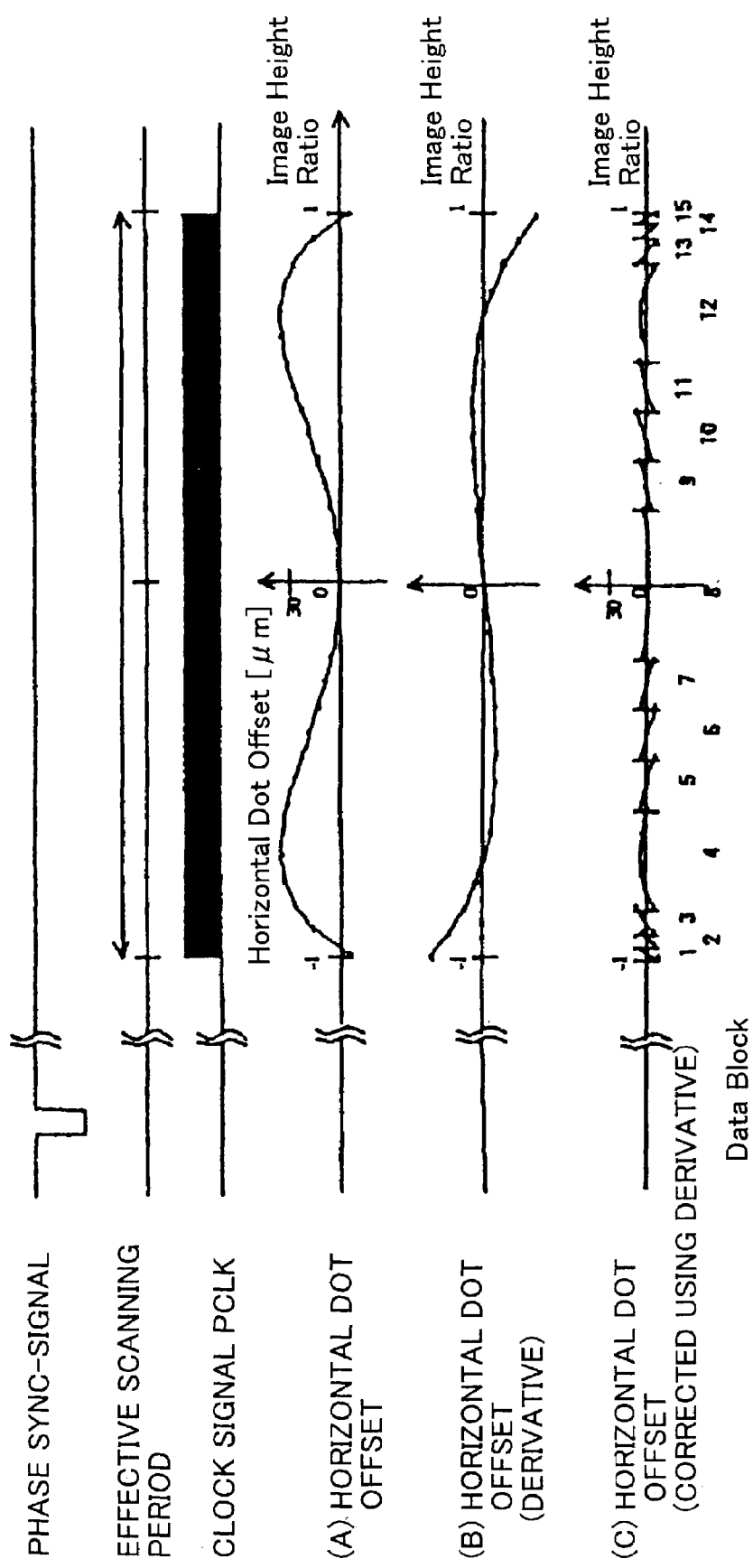
FIG. 12 illustrates another example of phase shift correction using derivatives in an optical writing apparatus having a certain offset characteristic.
Figure 13:
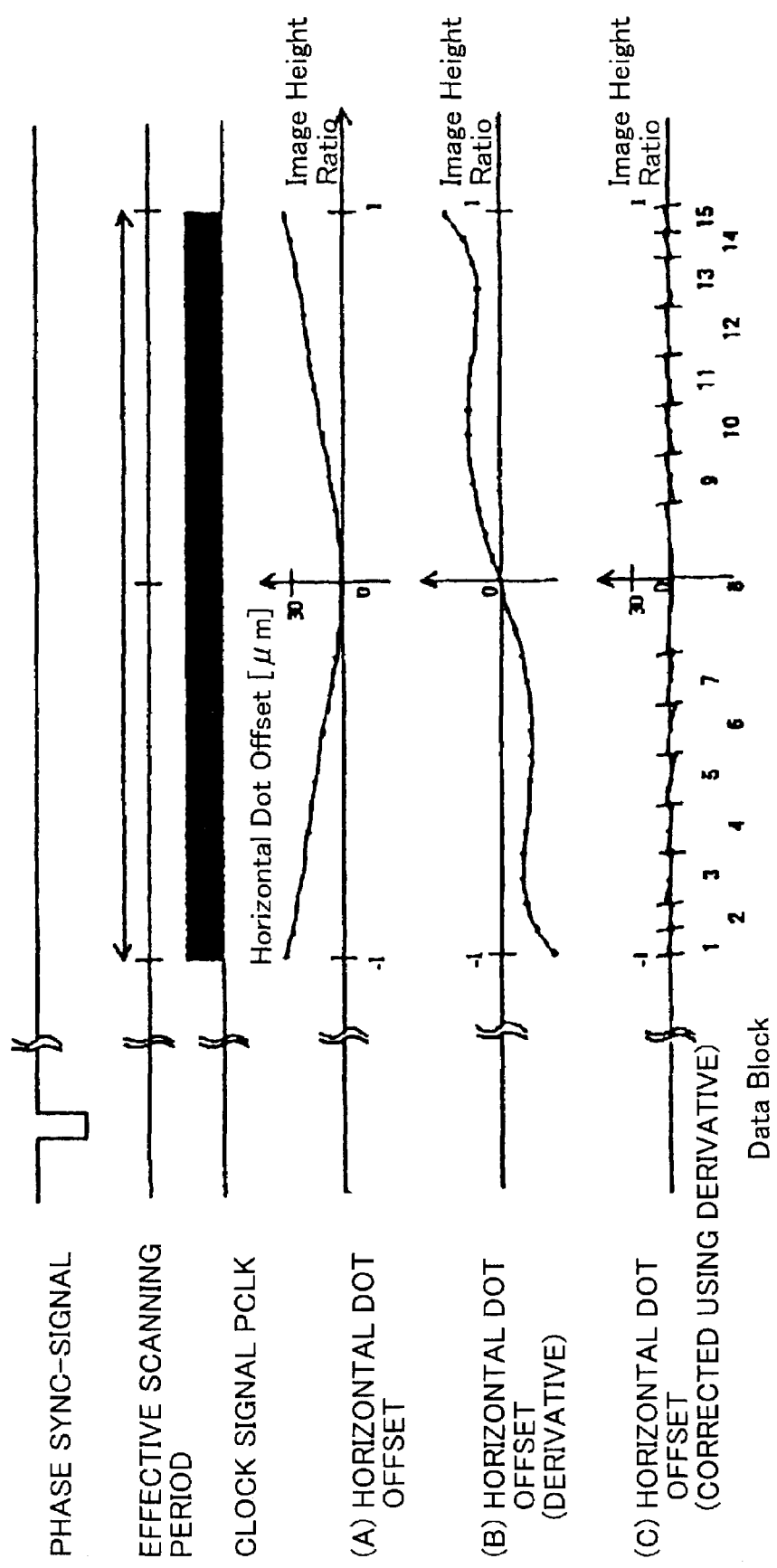
FIG. 13 illustrates the example of phase shift correction using derivatives in an optical writing apparatus having a different offset characteristic.

FIG. 12 and FIG. 13 illustrate another example of dot-offset correction using unequally divided data blocks. In this example, the size of data block (that is, the number of pixel clocks contained in a data block) is determined based on the derivative of the dot-offset characteristic of the optical system. FIGS. 12(A) and 13(A) illustrate the dot-offset characteristics of the corresponding to the optical systems, and FIGS. 12(B) and 13(B) illustrate the derivatives of the dot-offset characteristics shown in FIGS. 12(A) and 13(A), respectively.

In FIG. 12(B), the derivative becomes zero at the image height ratio of zero (0) and ±0.7, while it becomes maximum at −1 and minimum at +1. In FIG. 13(B), the derivative becomes zero only at the image height ratio of zero, and it becomes maximum at +1 and minimum at −1. When the derivative is at or near zero, the data block is set large with more pixel clocks contained in that data block. On the other hand, as the absolute value of the derivative increases, the size of the data block is reduced, with less pixel clocks contained in that data block, in order to carry out denser phase shift correction. By determining the size of a data block (i.e., the number of pixel clocks in a data block) based on the slope of the dot offset in the main scanning direction, positional offset of dots in the main scanning direction can be corrected more precisely with less data blocks, and a high-quality image can be produced efficiently.

In the example shown in FIGS. 12 and 13, a slope computation circuit may be provided to determine the data block size, that is, the data block setting value. The slope computation circuit calculates a slope ∠Y(a) of dot offset in the main scanning direction, which is obtained by computing ∠Y(a)=|[Y(a+1)−Y(a)]/[X(a+1)−X(a)]|. The data block setting value is determined based on the calculation result at each image height. If the slope is large, the data block setting value is set small, and if the slope is small, the data block setting value is set large. In this manner, the displacement of the dot offset in the main scanning direction can be acquired precisely, and appropriate size of data block is determined based on the displacement. Phase shift correction is made dense in a region with a large amount dot offset, and correction interval is increased in a region with less amount of dot offset.

Figure 14:
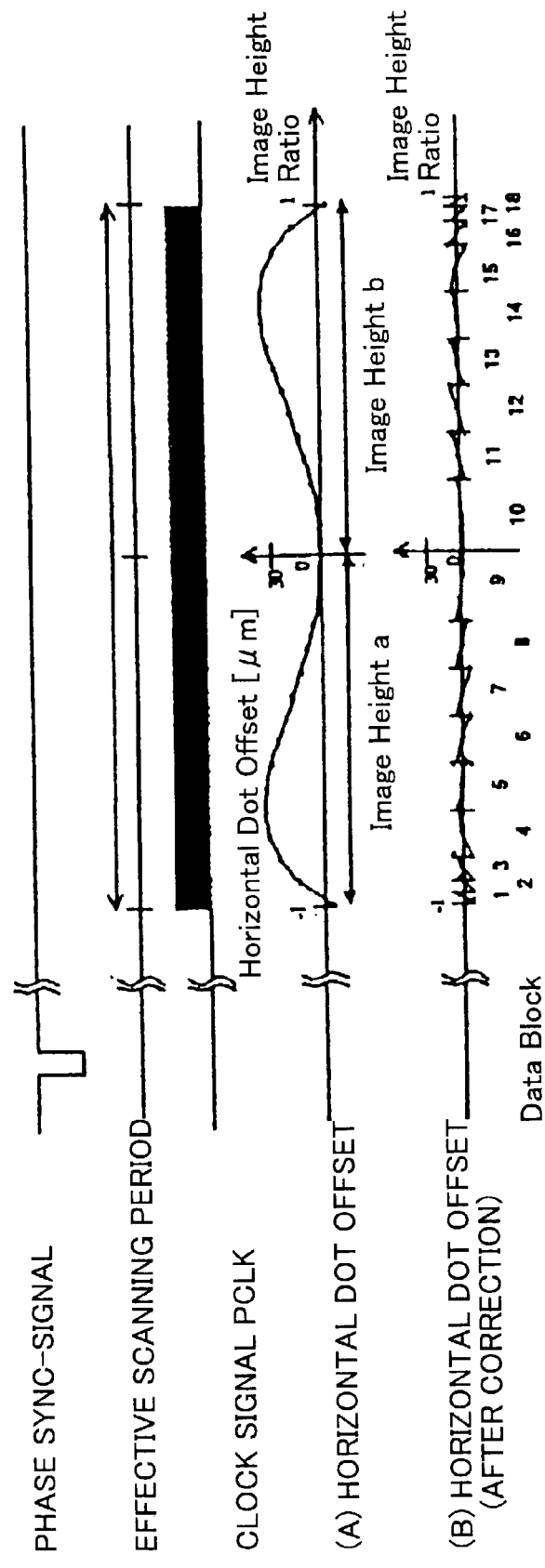
FIG. 14 illustrates still another example of phase shift correction carried out in an optical writing apparatus having a symmetric offset characteristic.

FIG. 14 illustrates a still another example of dot offset correction, which is suitable when the dot offset characteristic of the optical system is symmetric. In. FIG. 14(A), the dot-offset profile is symmetric, and the range of image height ratio −1 to 0 is denoted as image height "a", while the range of image height ratio 0 to +1 is denoted as image height "b". The amount of dot offset in the main scanning direction is symmetric with respect to image height of zero, and each of the image-height ranges "a" and "b" is divided into nine data blocks in a symmetric manner, as indicated by FIG. 14(B). Accordingly, the amount of phase shift correction made for image heights "a" and "b" is also symmetric.

Figure 15:
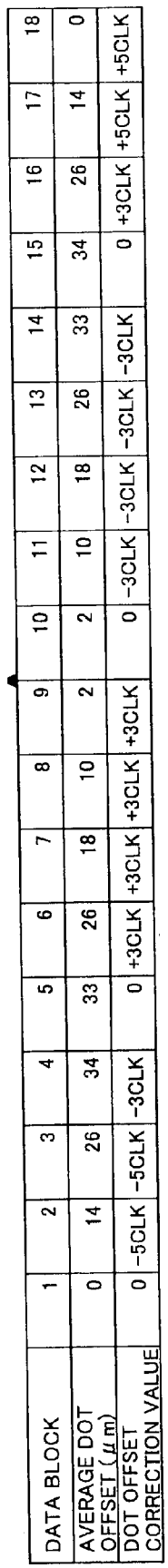
FIG. 15 is a table showing the phase shift correction value for each data block when the dot offset characteristic is symmetric with respect to the image height of zero.

FIG. 15 illustrates the average dot offset and the amount of phase shift correction for data blocks 1 through 18. In data blocks 9 and 10 which are located at the center of the effective scanning range and have the image height of zero, the horizontal dot offset (that is, dot offset in the main scanning direction) does not change, remaining almost zero offset. Accordingly, no phase shift correction is made in data block 10. In data block 11, phase shift correction of −3CLK is made, which has opposite polarity to phase shift amount of +3CLK made between data blocks 8 and 9. The same applies to data block 12, which produces phase shift correction opposite to that made between data blocks 7 and 8. In data block 15, no phase shift correction is made because the amount of dot offset correction made between data blocks 4 and 5 is zero. The phase data are prepared and set only for a half of the image height (e.g., for image height region "a"), and the same phase shift correction, but with opposite polarity, is made for the other half of the image height (e.g., for image height region "b"). In this manner, only half amount of correction data are required, and the data amount and the memory size can be reduced.

Third Embodiment

Figure 16:
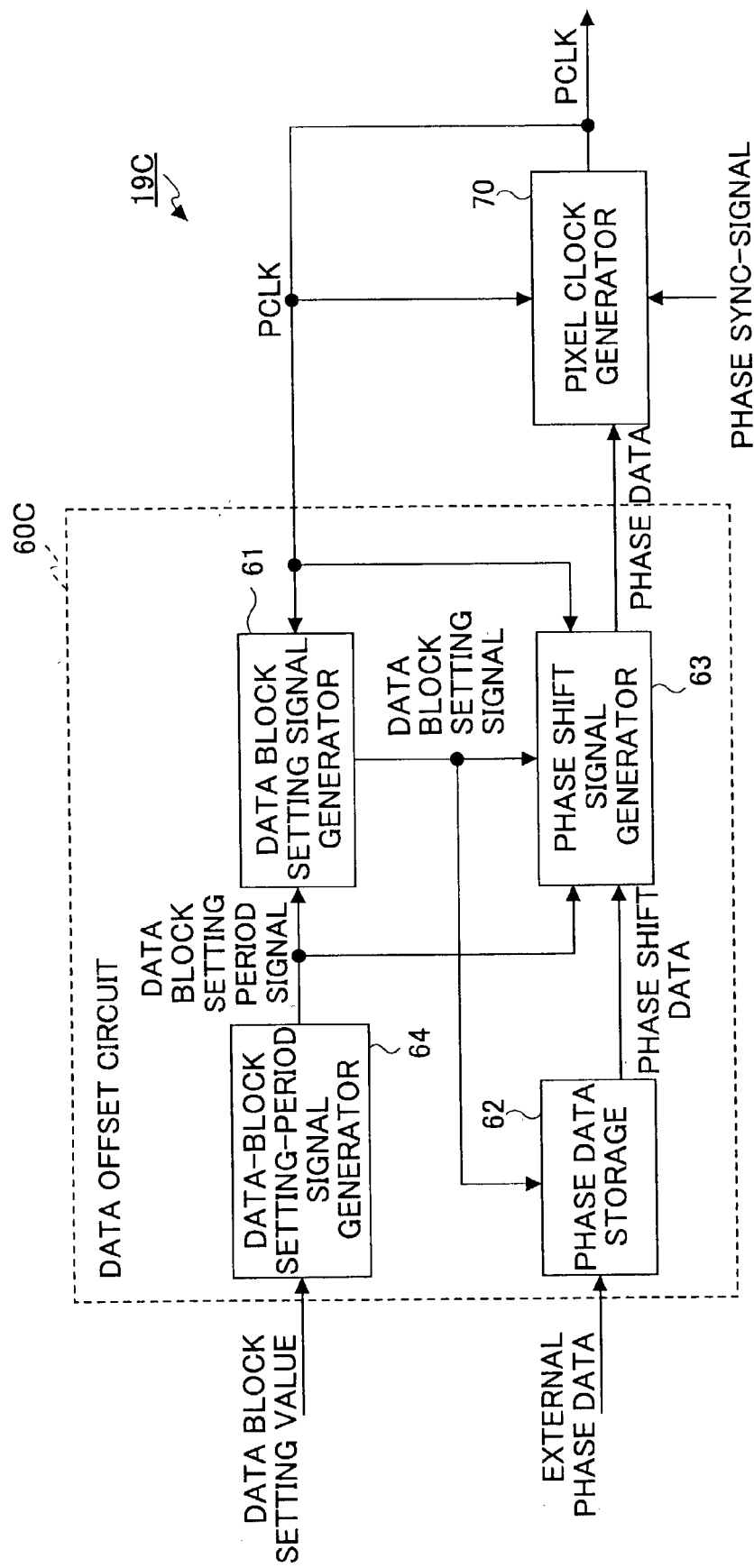
FIG. 16 illustrates a pixel clock generating unit used in the optical writing apparatus according to the third embodiment of the invention.

FIG. 16 illustrates a pixel clock generating unit 19C used in the optical writing apparatus 15 according to the third embodiment of the invention. The same elements as those shown in FIG. 3 and FIG. 9 are denoted by the same numerical references, and explanation for them will be omitted. The pixel clock generating unit 19C comprises a pixel clock generator 70, and a data offset circuit 60C that defines multiple data blocks in the effective writing range and supplies appropriate phase data to the pixel clock generator 70. The pixel clock generator 70 has the same structure as that shown in FIG. 4A or FIG. 4B. The data offset circuit 60C includes a data block setting signal generator 61, a phase data storage 62, a phase shift signal generator 63, and a data block setting period signal generator 64. The data block setting period signal generator 64 generates a data block setting period signal based on the externally supplied data block setting value that defines the number of pixel clocks contained in a data block.

In the third embodiment, the data offset circuit 60C shifts a phase shift start timing (i.e., dot offset correction timing) for each data block when scanning a next line, so as to change the periodicity of phase shift in the sub-scanning direction. By adjusting the phase shift timing for each data block, vertical streaks can be prevented from appearing in the resultant image,-while precisely correcting positional offset of dots in the main scanning direction.

Figure 17:
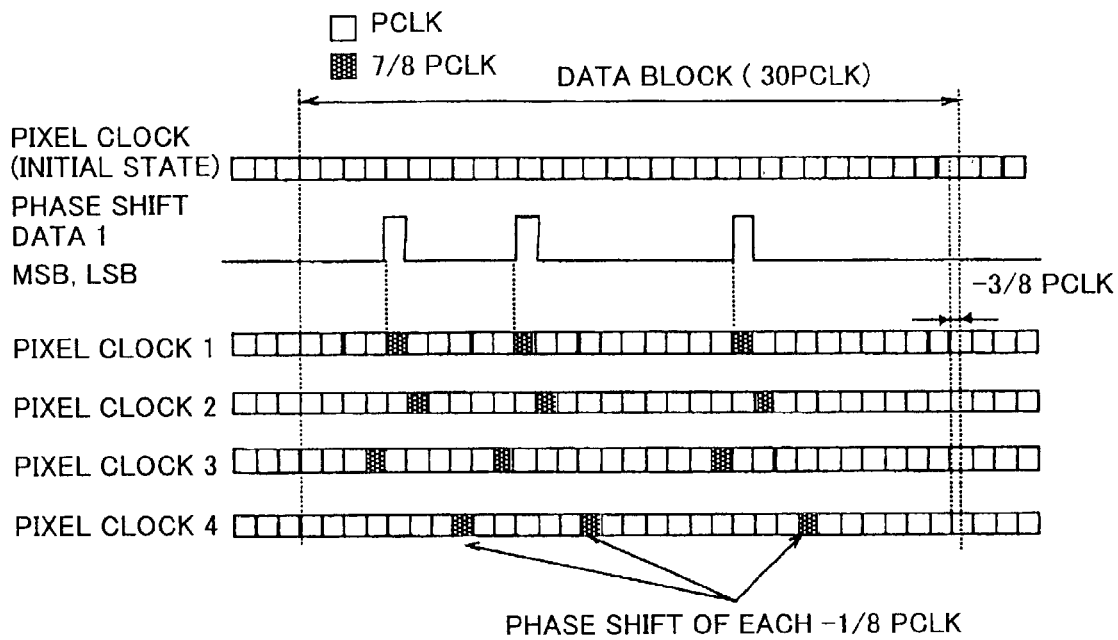
FIG. 17 illustrates an example of making phase shift correction in the negative direction to four successive pixel clock lines.
Figure 18:
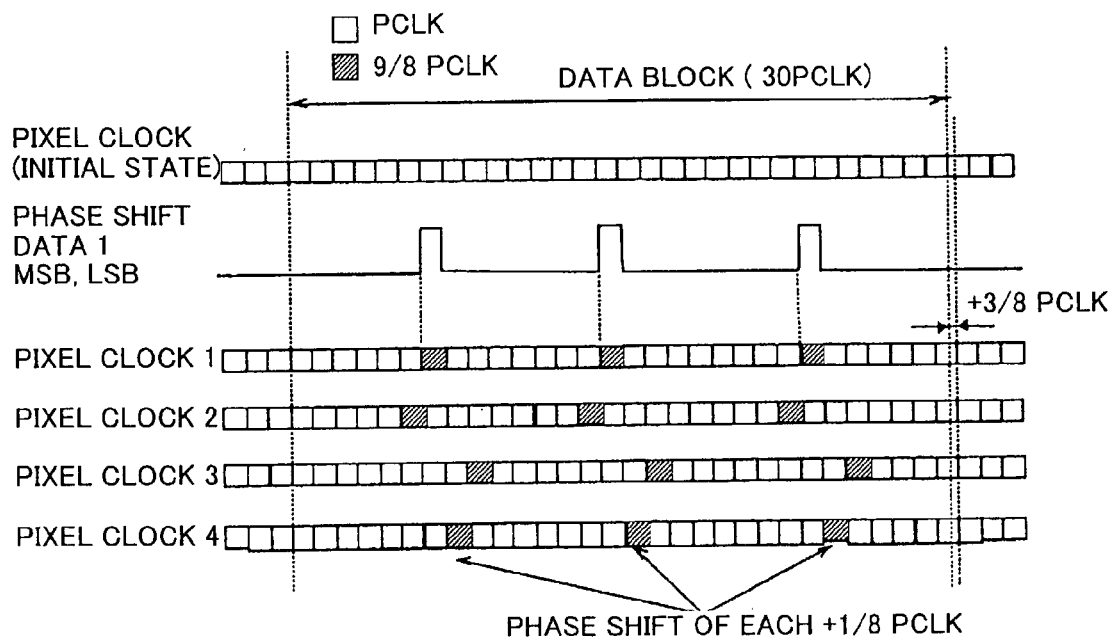
FIG. 18 illustrates an example of making phase shift correction in the positive direction to four successive pixel clock lines.

FIG. 17 and FIG. 18 illustrate examples of changing phase shift timing for each pixel clock line. In the example shown in FIG. 17, phase shift is carried out three times in the negative direction in each data block arranged at the same location of successive clock lines, and total of −(3/8)PCLK phase shift is produced in each data block; However, phase shift timing varies among pixel clock lines. In FIG. 10B, total of +(3/8)PCLK phase shift is carried, but with variable phase shift timing. In either example, phase data shown in Table 1 are stored in a memory in advance, and are given to each data block. The data offset circuit 60C varies phase-shift timing, including the phase shift start timing, for each pixel clock line.

A data block consists of thirty pixel clocks PCLK. Pixel clock lines 1, 2, 3, and 4 indicate successive scanning lines, each defining a different set of time-series data blocks generated as the clock oscillates.

In the example shown in FIG. 17, the value of phase shift data is −3, and three pixel clocks are selected at variable intervals. Each of the selected pixel clocks has a size of (7/8)PCLK, as a result of having being subjected to phase shift of −(1/8)PCLK. Consequently, the total period of the data block is shortened by three eighth (3/8) of PCLK, regardless of the position of the selected three pixel clocks.

The pixel clocks that are subjected to phase shift in pixel clock line 2 shift to the right by one clock, as compared with pixel clock line 1. The pixel clocks that are subjected to phase shift in pixel clock line 3 shift to the left by one clock, as compared to pixel clock line 1. The pixel clocks that are subjected to phase shift in pixel clock line 4 shift to the right by three clocks, as compared with pixel clock line 1. The phase shift start position can be varied by the data offset circuit 60C, which changes a start-position offset value for each pixel clock line.

In the example shown in FIG. 18, the value of phase shift data is +3, and three pixel clocks out of thirty clocks are selected at variable intervals. Each of the selected pixel clock has a size of (9/8)PCLK, as a result of having being subjected to phase shift of +(1/8)PCLK. Consequently, the total period of the data block is extended by three eighth (3/8) of PCLK. Timing of phase shift correction in FIG. 18 differs from that shown in FIG. 17.

In FIG. 17 and FIG. 18, timing of phase shift correction, including the phase shift start timing, is varied by the data offset circuit 60C for each line of time-series data blocks, so that the phase-shifted position does not align in the sub-scanning direction. Consequently, undesirable vertical streaks can be prevented from appearing in the resultant image.

Figure 19A:
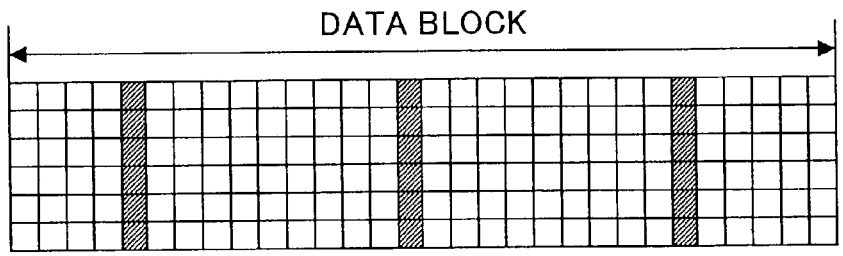
FIG. 19 illustrates an example of making phase shift correction to successive pixel clock lines using a data offset counter, compared with not adjusting the phase shift positions.
Figure 19B:
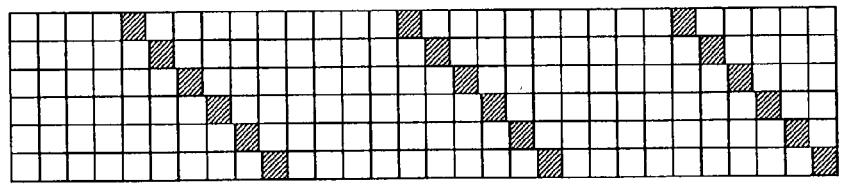

FIG. 19B illustrates an example of changing phase shift timing (i.e., dot offset correction timing) for successive lines of time-series data blocks. In this example, phase shift start timing is shifted with regularity using a data offset counter (not shown) provided in the optical writing apparatus 15. For each pixel block line, the phase-shift start position is designated by the data offset counter. The phase shift interval is determined by another counter for generating a phase shift timing signal every predetermined number of clocks (for example, every ten clocks in the example shown in FIG. 19B). The data offset counter is incremented by one for each line, and the phase shift start position is shifted to the right by one cock. This arrangement prevents the phase-shifted clocks from aligning in the sub-scanning direction. In contrast, in the comparison example shown in 19A, the phase shift is carried out at constant timing for all the pixel clock lines. Since the same positions of pickle clocks are subjected to phase shift correction for all the lines, vertical streaks are likely to appear in the resultant image. By shifting the phase shift timing for each pixel clock line, as illustrated in FIG. 19B, such undesirable vertical streaks can be prevented.

Figure 20A:
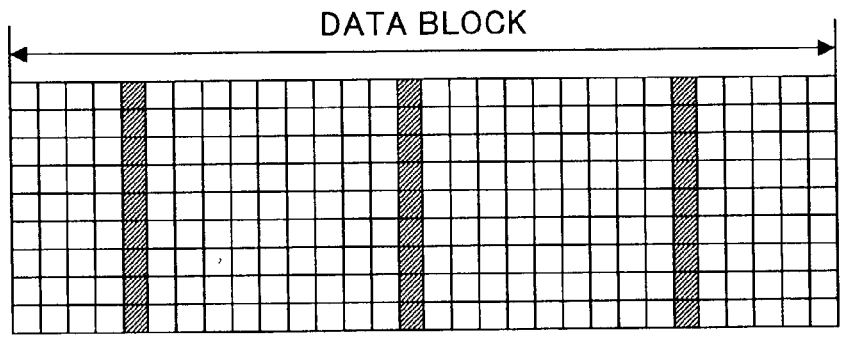
FIG. 20 illustrates an example of making phase shift correction to successive pixel clock lines using a reset function, compared with not adjusting the phase shift positions.
Figure 20B:
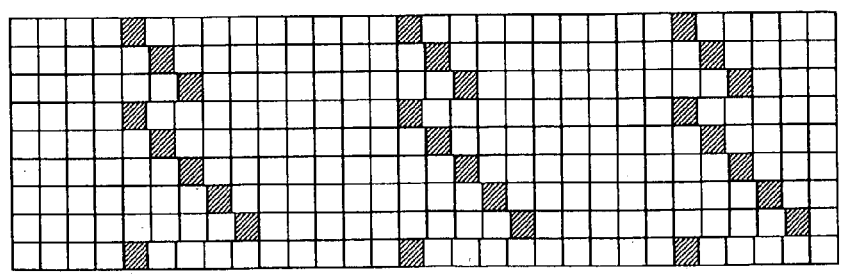

FIG. 20B illustrates another example of shifting dot offset correction timing, and FIG. 20A illustrates a comparison example, in which phase shift timing is kept constant-for all pixel clock lines. In this example, the optical writing apparatus 15 has a reset signal generator (not shown), which generates a reset signal after a prescribed number of scanning lines (i.e., pixel clock lines) have been counted. When the data offset counter (not shown) receives a reset signal, the counter value of the data offset counter is reset, and it start counting from the beginning.

In the example shown in FIG. 20B, the data offset counter (not shown) is reset after lines 1 through 3 have been counted. The counter then starts counting from the beginning for lines 4 through 8, and it is reset again after having counted the line 8. The reset interval is irregular. Irregular reset intervals prevent streaks from extending in one direction, and the image quality can be further improved.

FIG. 21B illustrates still another example of shifting dot offset correction timing, in comparison with FIG. 21A showing constant timing of phase shift correction-. In this example, the data offset counter is automatically reset when the counter value reaches a predetermined reset value. For example, increment of counter for the next pixel clock line is 1, and the counter reset value is 3. Accordingly, the counter is reset after clock lines 3, 6, 9, . . . have been counted.

FIG. 22B illustrates yet another example of shifting dot offset correction timing, in comparison with FIG. 22A, in which phase shift correction timing is kept constant. In this example, phase shift timing is varied at random for each pixel clock, and accordingly, the pixel clocks that are to be subjected to phase shift in a data block are selected randomly. This arrangement can further reduce adverse influence of vertical streak.

To carry out pixel clock random shifting, a phase-shift data timing correction circuit (not shown) may be provided in the optical writing apparatus 15. Alternatively, the initial pixel clock that is subjected to phase shift correction may be determined using a random number generator. In this case, the phase shift initial value for determining the first pixel clock that is to be phase-shifted is determined based on the output signal from the random number generator.

By changing the input timing of phase shift data for each pixel clock based on a random number, periodicity of phase-shifted clocks in the sub-scanning direction (i.e., in the vertical direction) can be further reduced.

FIG. 23B illustrates yet another example of shifting dot offset correction timing, in comparison with FIG. 23A showing constant phase shift timing. In this example, the correction start timing is varied randomly. To this end, a data offset random circuit (not shown) may be provided in the optical writing apparatus 15.

In the example shown in FIG. 23B, phase shift is carried out three times every ten pixel clocks in the data block. The phase shift initial value is controlled by the output signal from the random number generator. Correction values of −1, +1, 0, −1, 0, +1 are obtained from the random number generator for lines 1 through 6, and the phase-shift correction timing is shifted based on these correction values.

With this arrangement, although the phase-shift correction pattern is fixed (for example, every ten pixel clocks), periodicity of phase shift data in the sub-scanning direction is greatly reduced because of the randomness of phase-shift initial values.

FIG. 24B illustrates yet another example of shifting dot offset correction timing, in comparison with FIG. 24A in which phase shift correction timing is constant for all the pixel-clock lines.

In this example, the number of pixel clocks contained in a data block is set to a prime number, and a phase-shift data counter (not shown) is provided to the optical writing apparatus 15 to shift the correction timing. When proceeding to the next line, the phase-shift data counter starts counting beginning from the first pixel clock of the next data block. Phase-shift correction is made at substantially constant intervals.

In the example shown in FIG. 24B, the number of pixel clocks in a data block is thirty one (31), which is a prime number, and number of times phase shift is carried out in the data block is three. The phase shift is carried out every ten pixel clocks, and the phase-shift data counter value is set to two (2).

As the counter values increments, and if it reaches the number of pixel clocks in the data block, then, the counter starts counting from the first clock of the next data block. Since the number of pixel clock contained in a data block is a prime number, the positions of pixel clocks that are to be subjected to phase shift correction in the next line do not align in the sub-scanning direction. Consequently, undesirable streaks are effectively reduced.

Fourth Embodiment

Figure 25:
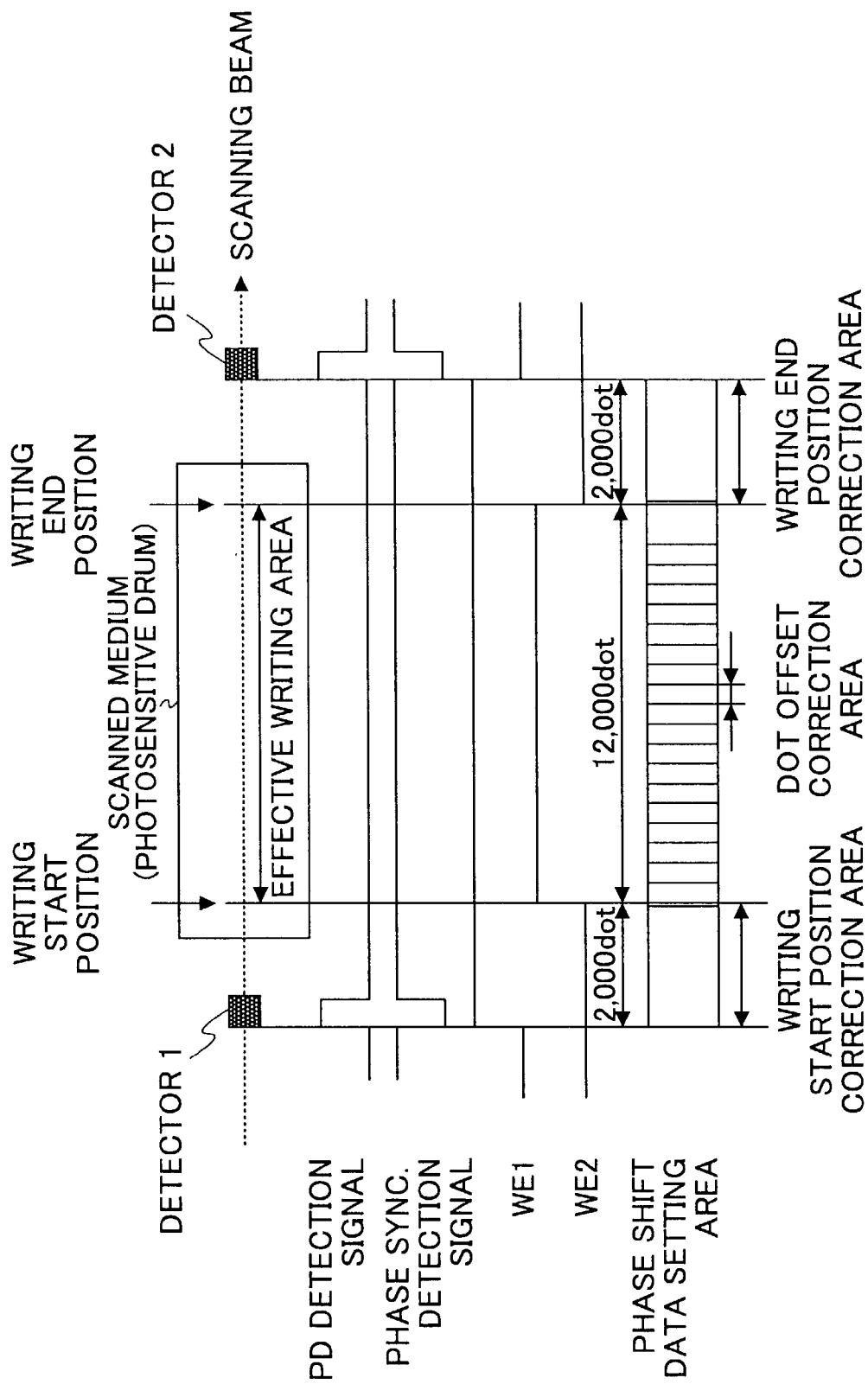
FIG. 25 illustrates an example of dot offset correction taking into account the writing start position and the writing end position of the effective writing area according to the fourth embodiment of the invention.

FIG. 25 illustrates an example of phase-shift correction according to the fourth embodiment of the invention. In the fourth embodiment, precise dot-position control is carried out taking into account the writing start position and the writing end position, in addition to the divided data block structure described in the first through third embodiment. Phase data (including phase shift clocks) are given not only to the effective writing area, but also to the writing start position correction area and the writing end position correction area, which are provided on both sides of the effective writing area.

Figure 1A:
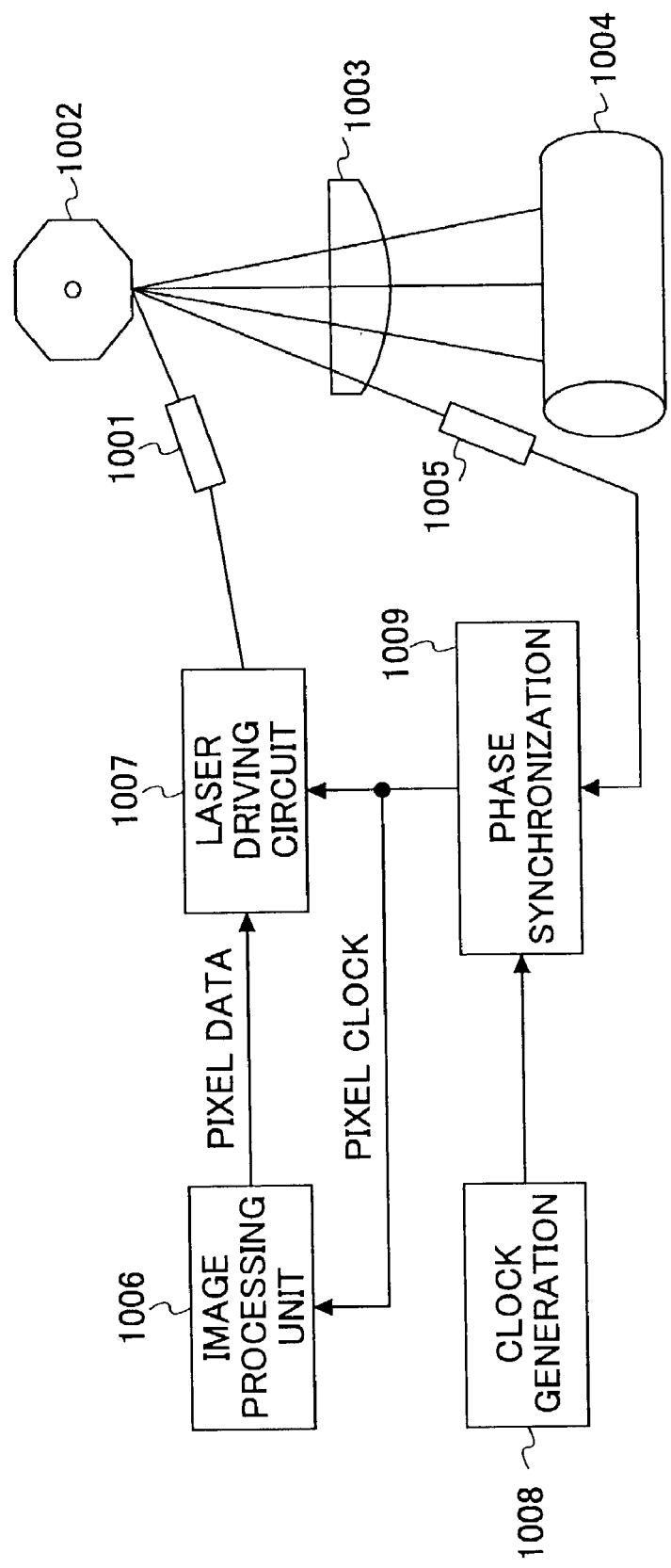
FIG. 1A and FIG. 1B schematically illustrate examples of conventional optical writing apparatuses.
Figure 1B:
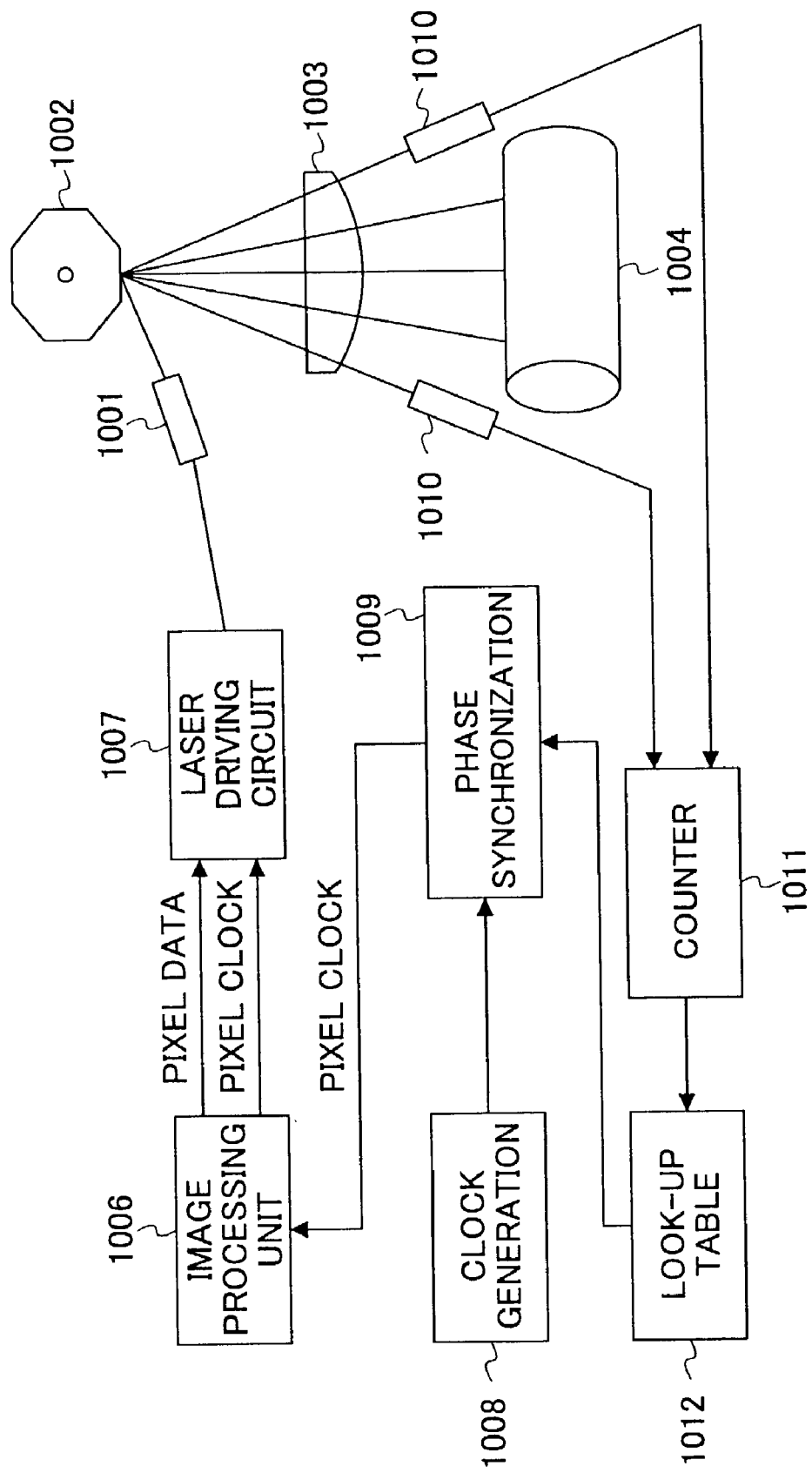

In FIG. 25, light, flux (i.e., a scanning beam) emitted from a light source (such as a laser diode shown in FIG. 1A or 1B) scans on the photosensitive drum in the direction indicated by the dashed arrow. The scanning beam first passes through the first phase-sync sensor (or detector) 221, at which a PD detection signal is acquired. Then, the scanning beam scans on the photosensitive drum, and then passes through the second phase-sync sensor (or detector) 222, at which another PD detection signal is acquired. The PD detection signals are inverted to obtain the phase-sync detection signal, which is generally used in an imaging apparatus. The phase-sync detection signal falls immediately after light flux is incident onto the phase-sync sensor 221.

A signal that stays "HI" from the rising edge of the detection signal from the sensor 1 to the rising edge of the detection signal from the sensor 2 is referred to as WE1. Another signal that stays "HI" during the effective writing period between the writing start position and the writing end position is referred to as WE2. In order to precisely determine the writing start position, 2000 dots are guaranteed as the writing start position correcting area from the rising edge of signal WE1. By giving phase data to this area, positional offset of dots due to the optical system or the deflectors is corrected and the writing start position can be set precisely. Similarly, 2000 dots before the trailing edge of signal WE1 is also guaranteed as the writing end position correction area, and phase data is given to this area. Between the writing start position correction area and the writing end position correction area is the dot offset correction area, in which phase data is given.

The dot offset correction area is divided into multiple data blocks, and phase shift data is set for each of the data block, as in the first through third embodiments, thereby reducing the data amount and the memory size, while precisely controlling the writing start position and the writing end position.

Fifth Embodiment

Figure 26:
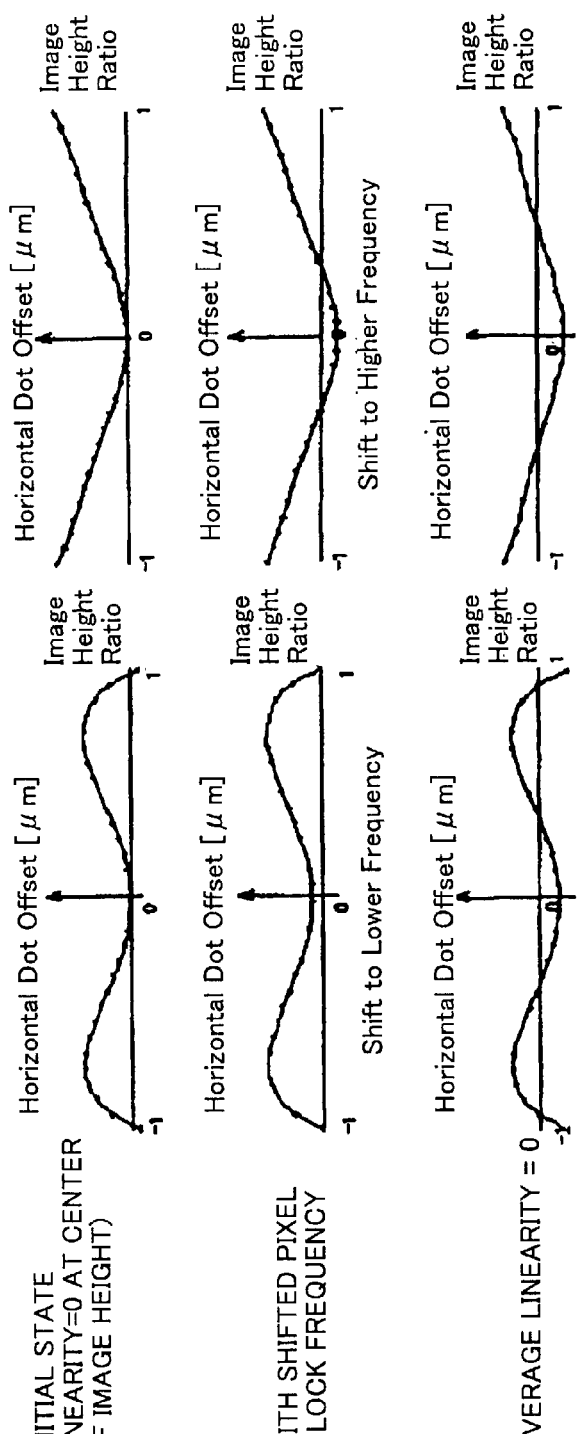
FIG. 26 illustrates examples of dot offset correction using frequency shift according to the fifth embodiment of the invention.

FIG. 26 illustrates examples of dot offset correction according to the fifth embodiment of the invention. In the fifth embodiment, the entire dot offset profile of the optical system is shifted in the positive or negative direction by shifting the frequency of the pixel clock, and then, phase shift correction is made to each data block. In this case, the pixel clock generating unit 19 illustrated in the first through third embodiments has a dot offset characteristic shifting unit (not shown).

In FIG. 26A, dot offset characteristics in the main scanning direction (i.e., in the horizontal direction) occurring in two types of optical systems are illustrated. In FIG. 26B, the profile of dot offset is shifted as a whole in the positive or negative direction by shifting the pixel clock frequency to a lower or higher frequency. In FIG. 26C, the dot offset profile shifting unit first determines the average of dot offset over the entire range of image height rate (from −1 to 1), and shifts the dot, offset profile so that the average of dot offset after the phase shift correction becomes zero.

If the pixel clock is set to a lower frequency, the amount of dot offset is shifted to the positive direction as a whole, as illustrated in the left chart of FIG. 26B. Then, the dot offset at image heights −1 and +1 is set to zero, thereby allowing the writing start position to be set precisely. On the other hand, if the pixel clock is set to a higher frequency, the dot offset amount is shifted to the negative direction as a whole, as illustrated in the right chart of FIG. 26B. By setting the dot offset amount in the main scanning direction to a negative value, dot positions at or near the medium image height can be set precisely.

If dot offset occurs at an image height of zero in either the positive or negative direction when the total amount of the entire dot offset is positive, correction for dot positions is required so as to compensate the offset in the positive direction.

Accordingly, the frequency of the writing clock itself is first shifted to a lower or a higher frequency to correct the profile of the dot offset as a whole, and then, second correction is made to the shifted profile of dot offset at a data block unit. The clock frequency can be shifted by means of, for example, combination of a PLL system and a programmable counter. A PLL system generally includes a phase detector, a charge pump, a low-pass filter, and a VCO (voltage controlled oscillator). Using such a PLL system and a programmable counter, an arbitrary frequency can be generated. By inserting a programmable counter between the VCO and the phase detector, the oscillation frequency of the VCO is controlled so as to satisfy the relation fv=fs*N, where fv is an oscillation frequency of the VCO, fs is reference clock input to the PLL, and N is a counter value. Accordingly, the output frequency fv, which is an output signal from the VCO, can be regulated by adjusting the counter value N. For example, the negative amount of dot offset at image height ratio of −1 and +1 shown in the left chart of FIG. 26A can be eliminated by shifting the clock frequency to a higher value (by changing clock frequency f to f+∠f. Consequently, the amount of dot offset becomes zero at image height ratio ±1, and the dot offset profile shown in the left chart of FIG. 26B can be obtained.

Then, if the cock frequency is adjusted to f−∠f, the dot offset in the main scanning direction shown in FIG. 26A is corrected so as to have a negative value, as illustrated in FIG. 26B. Consequently, the maximum value of the phase shift data at each data block can be reduced, as compared with the case before the clock frequency change.

In the left chart of FIG. 26C, the amount of dot offset is integrated between the range from image height ratio of −1 to +1, and the average is determined. The clock frequency is shifted to a further higher frequency so that the average of the dot offset amount becomes zero, and consequently, the entire dot offset profile is shifted to the negative direction. In this manner, the dot offset amount is distributed around zero, and the dot offset at or near the medium image height can be corrected precisely. The dot offset correction value in one line can be reduced, while achieving highly precise dot-position correction by finely adjusting the frequency of the pixel clock.

Sixth Embodiment

Figure 27:
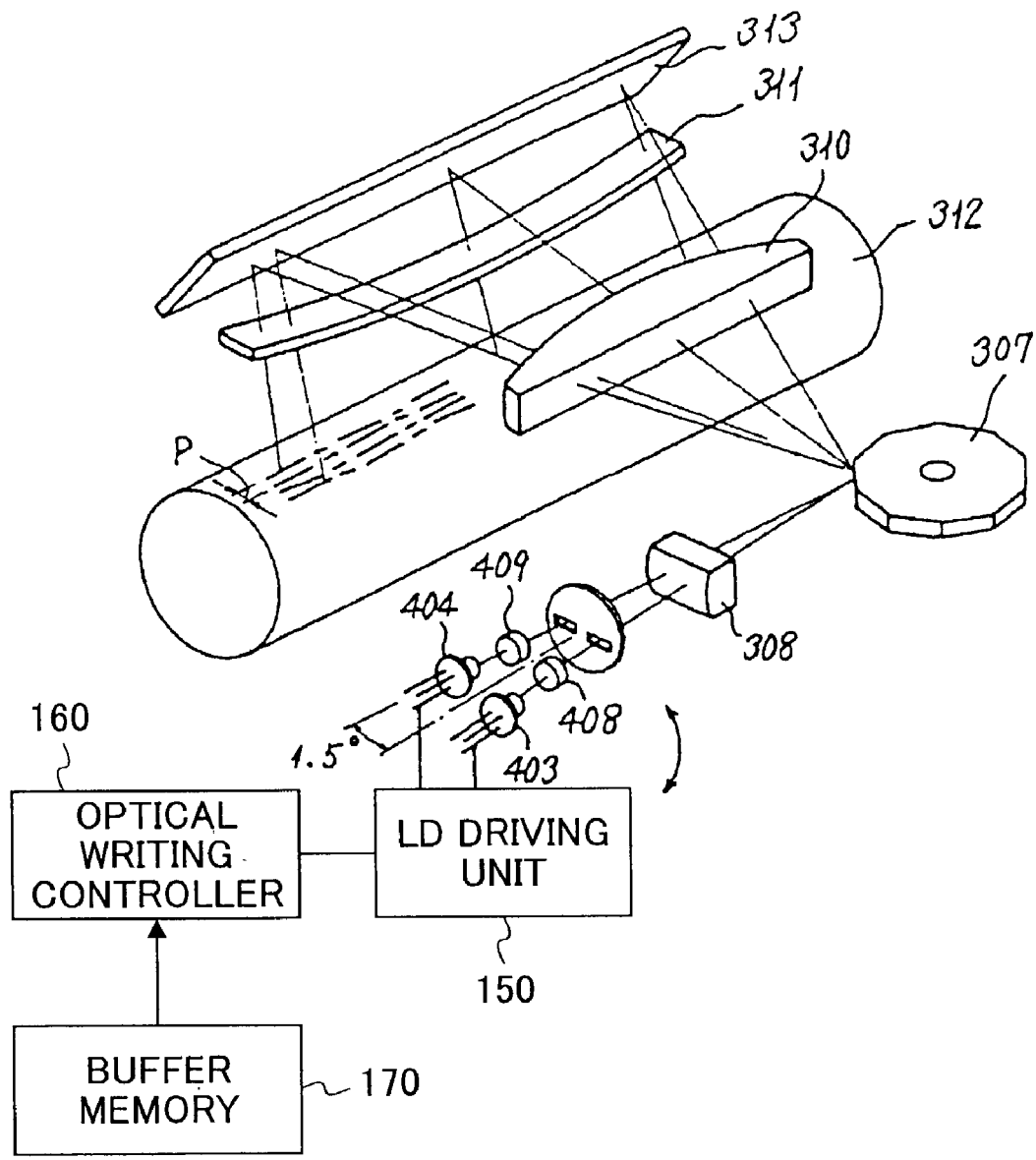
FIG. 27 illustrates an optical writing apparatus having a multi-beam structure according to the sixth embodiment of the invention.
Figure 28:
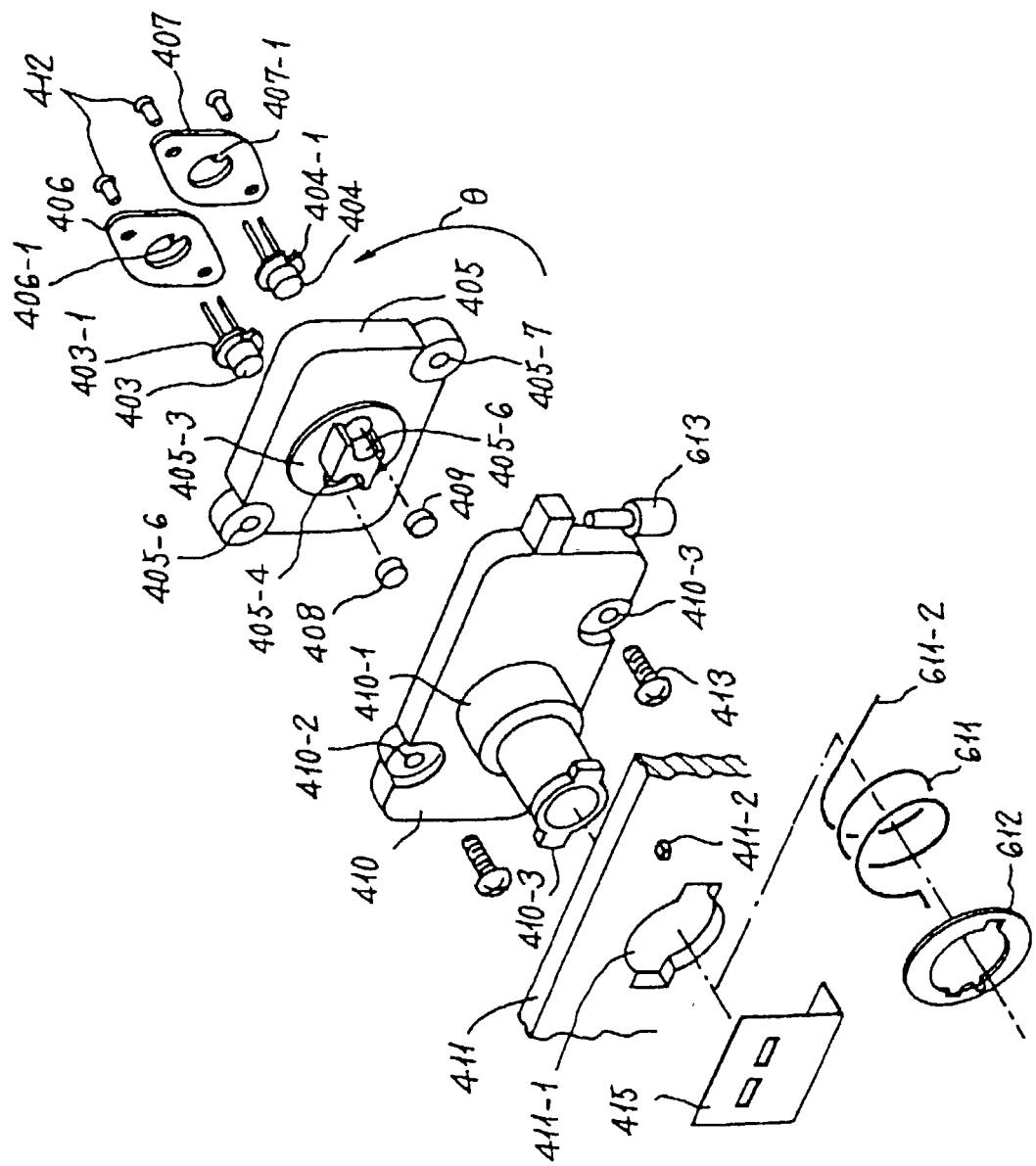
FIG. 28 is an exploded perspective view of the light source unit used in the optical writing apparatus shown in FIG. 27.
Figure 29:
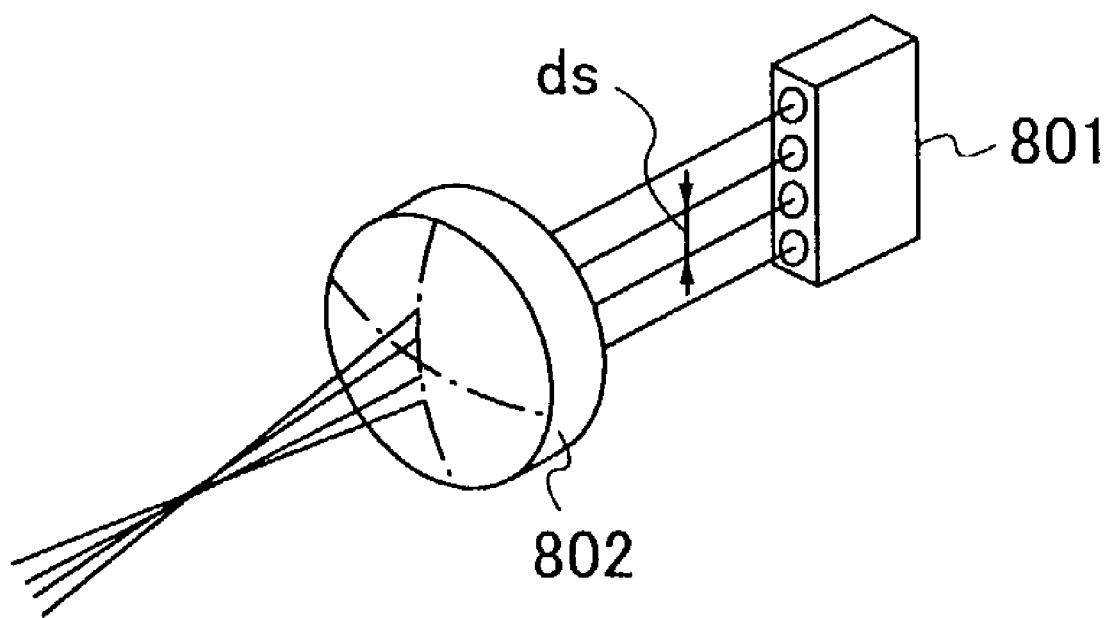
FIG. 29 illustrates another example of the light source unit used in the multi-beam structure.

FIGS. 27 through 29 illustrate a multi-beam type optical writing apparatus having two or more light sources. Using a multi-beam structure, two or more lines can be written at a time of scanning, and the productivity is increased. Although the first through fourth embodiments have been described in connection with the clock pixel generating unit 19 used in an optical writing apparatus 15 having a single light source, the inventions described in the first through fourth embodiment are equally applicable to a multi-beam optical writing apparatus.

The multi-beam optical writing apparatus shown in FIG. 27 has two semiconductor lasers 403 and 404, which are arranged in the sub-scanning direction so as to be symmetric with respect to the optical axis of the lens system. The optical axes of the semiconductor lasers 403 and 404 agree with those of the collimator lenses 408 and 409, respectively. The semiconductor lasers 403 and 404 are set obliquely and symmetrically with each other so as to define a certain light-emitting angle in the main scanning direction. The light-emitting axes (or the light paths) of these two lasers 403 and 404 intersect with each other at the reflecting point of the polygonal mirror 307.

The beams emitted from the semiconductor lasers 403 and 404 pass through the cylindrical lens 308 and are deflected by the polygonal mirror 307. The deflected laser beams are focused onto the photosensitive unit 312 via the fθ lens 310, the toroidal lens 311, and the reflecting mirror 313.

The buffer memory 170 stores print data of one line for each light source. The print data for the respective light sources are read out for every facet of the polygonal mirror 307, and two lines of print data are written simultaneously on the photosensitive unit 312.

FIG. 28 illustrates an exploded perspective view of a light source unit of the optical writing apparatus shown in FIG. 27. The semiconductor lasers 403 and 404 have cylindrical heat sinks 403-1 and 404-1, respectively. Each heat sink has a cut-away. The heat sinks 403-1 and 404-1 are fit into holes (not shown) formed in the rear face of the base 405, each hole inclining at a predetermined angle, for example, 1.5° in this example, in the main scanning direction. The cut-away of the cylindrical heat sinks 403-1 and 404-1 are engaged with the projections 406-1 and 407-1 of the pressing pieces 406 and 407, respectively, to align the orientations of the light sources. Then, the pressing pieces 406 and 407 are screwed to the base 405 using screws 412.

The positions of the collimator lenses 408 and 409 are adjusted in the axial direction by sliding the outer face thereof along the semicircular guide faces 405-4 and 405-5, respectively. The collimator lenses 408 and 409 are positioned and bonded so that the beams diverging from the light-emitting face are collimated into parallel beams. The semicircular guide faces 405-4 and 405-5 are also inclined so that the laser beams from the semiconductor lasers 403 and 404 intersect with each other within a main scanning plane.

The base 405 also has a cylindrical disc 405-3 and screw holes 405-6 and 405-7. The cylindrical disc 405-3 is fit into the holder 410, and the base 405 and the holder 410 are fixed to each other using screws 413, so that the holder holes 410-2 and 410-3 align with the screw holes 405-6 and 405-7, respectively. In this manner, the light source unit is assembled.

The light source unit is held on the wall 411 of the optical housing by inserting the cylinder 410-1 of the holder 410 into the reference hole 411-1 formed in the wall 411. Then, stopper 612 is engaged with the cylindrical projection 410-3, thereby holding the holder 410 tightly against the wall 411. At this time, one end 611-2 of the spring 611 is hooked on the projection 411-2, which produces a rotational force about a rotational axis that is in agreement with the center of the cylinder 410-1. An adjusting pin 613 provided so as to prevent the rotational force from causing the entire unit to rotate about the optical axis in the θ direction, thereby adjusting the pitch.

An aperture 415 is attached onto the optical housing. The aperture 415 has slits, each associated with one of the semiconductor lasers, to define the profile of the laser beam.

The multi-beam light source may be configured as an integrated light source, as illustrated in FIG. 29. In this case, the optical writing apparatus has a semiconductor laser array 801 having, for example, four integrated light sources, instead of using two separate light sources 403 and 404 shown in FIG. 28. The laser beams emitted from the laser array 801 may be synthesized using a beam synthesizer 802.

When using the multi-beam structure shown in FIG. 28 or FIG. 29, the phase shift value for each data block is adjusted corresponding to each light source. In this case, the correcting start timings in each data block is set so that the relative positions of data blocks of two adjacent light sources do not align with each other in the sub-scanning direction, and/or that the pixel clocks subjected to phase shift correction in each data block of two adjacent light source do not align with each other in the sub-scanning direction. In this manner, image offset due to phase shift between multiple light sources, or vertical streaks appearing in the image due to phase shift between the light sources can be prevented. Consequently, the image quality can be maintained high not only in the main scanning direction, but also in the sub-scanning direction.

Seventh Embodiment

Figure 30:
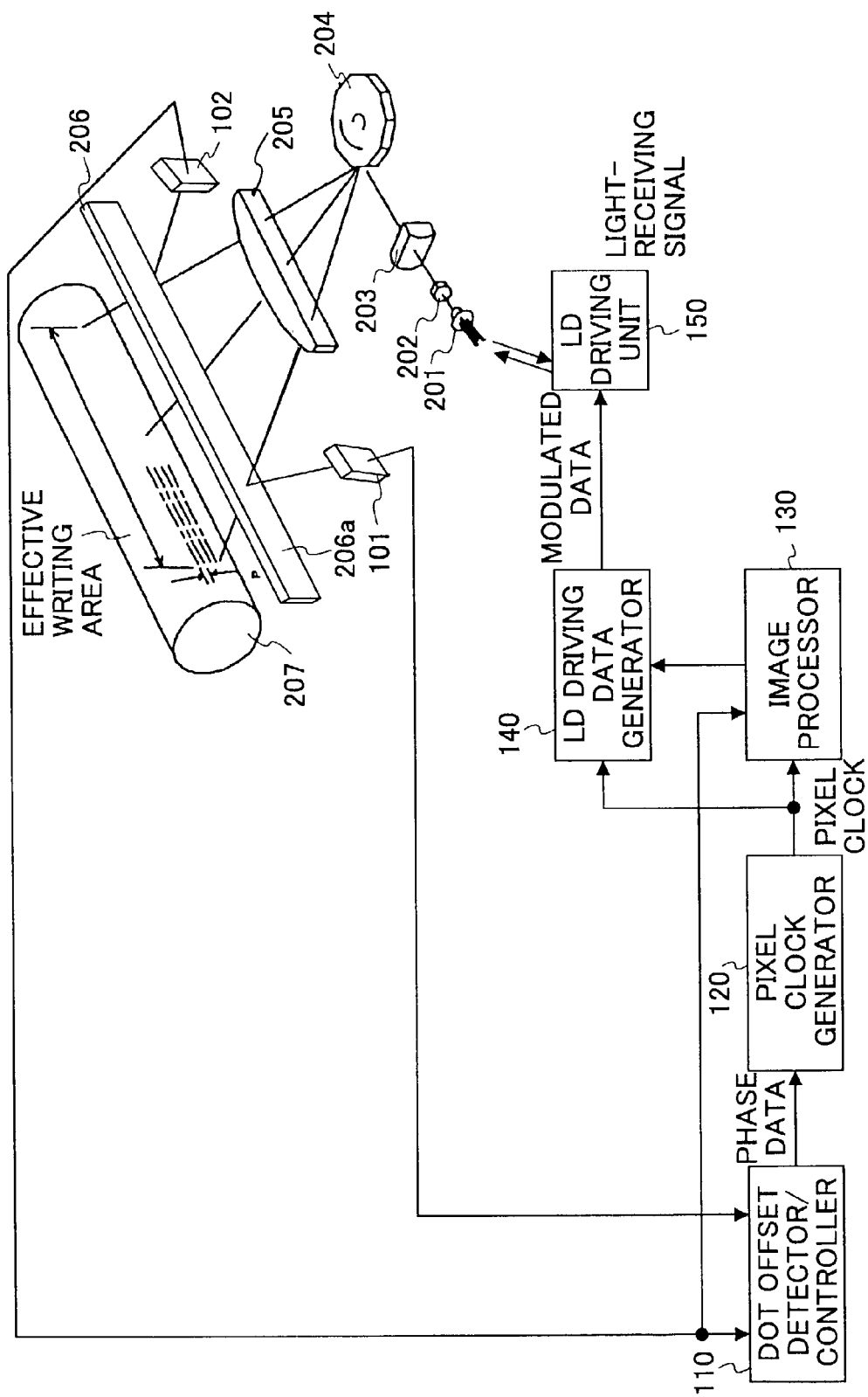
FIG. 30 illustrates an optical writing apparatus using a pair of detectors and a dot offset detector/controller according to the seventh embodiment of the invention.
Figure 31:
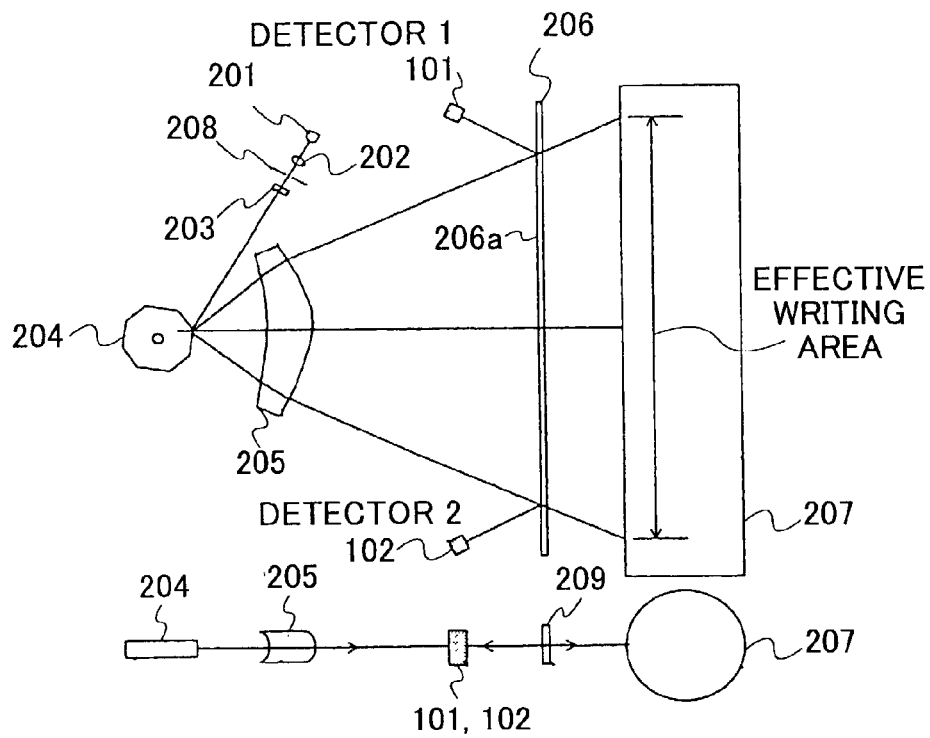
FIG. 31 illustrates the light path from the polygonal mirror to the photosensitive unit in the optical writing apparatus shown in FIG. 30.

FIG. 30 and FIG. 31 illustrate an optical writing apparatus according to the seventh embodiment of the invention. In the seventh embodiment, a transparent member 206 having a reflecting surface 206a is inserted between the deflector (i.e., the polygonal mirror) 204 and the photosensitive drum 207. The reflecting surface 206a is closest to the polygonal mirror 204, and the first surface of the transparent member 206 that the laser beam strikes. Detectors (e.g., photodetectors) 101 and 102 are provided to sense the scanning beam reflected by the reflecting surface (i.e., the first surface) 206a of the transparent member 206. The optical writing apparatus also has a dot offset detector/controller 110 connected to the detectors 101 and 102, and a pixel clock generator 120 receiving phase data from the dot offset detector/controller 110. The dot offset detector/controller 110 and pixel clock generator 120 comprise a pixel clock generating unit.

In the optical writing apparatus, the laser beam emitted from the semiconductor laser 201 passes through the collimator lens 202 and the cylindrical lens 203, and deflected by the polygonal mirror 204. The deflected laser beam passes through the fθ lens 205, and focuses on the photosensitive unit 208 via the transparent member 201 to form an electrostatic latent image on the photosensitive unit 208. In the example shown in FIG. 30, the transparent member 206 is a flat glass plate.

The detectors 101 and 102 detect the writing start position and the end position of the laser beam, and the detection results are supplied to the dot offset detector/controller 110.

The dot offset detector/controller 110 measures scanning time required for the laser beam to move between the detectors 101 and 102, and determines time offset from the reference scanning time that is obtained in advance in the ideal scanning operation. The dot offset detector/controller 110 then produces phase data that corrects the time offset, and supplies the phase data to the pixel clock generator 120. The output signal from the detector 102 is also supplied as a line synchronizing signal to the image processor 130.

The pixel clock generator 120 has a structure shown in FIG. 4A or FIG. 4B. If the pixel clock generator 120 does not have a phase data storage (as shown in FIG. 4A), the dot offset detector/controller 110 outputs phase data for each line to the pixel clock generator 120. If the pixel clock generator 120 has a phase data storage (as shown in FIG.

4B), phase data are produced in advance by the dot offset detector/controller 120, and stored in the pixel clock generator 120 in advance.

The dot offset detector/controller 110 produces second phase data for dynamic correction, in addition to first phase data for static correction. The first phase data is used repeatedly every line to correct dot offset due to statistic factors, such as the lens characteristic of the scanning lens. The second phase data is used to correct dot offset due to dynamic factors, such as fluctuation in rotational speed of the polygonal mirror that changes each line. In this case, the pixel clock generator 120 has a phase data composite circuit (not shown) to synthesize the first and second phase data. If the multi-beam light source structure described in the sixth embodiment is applied to the optical writing apparatus shown in FIG. 30, then multiple pairs of detectors 101 and 102 are furnished so as to simultaneously produce phase data for multiple lines corresponding to the respective light sources.

The pixel clock generator 120 generates a pixel clock based on the phase data supplied from the dot offset detector/controller 110, and supplies the pixel clock to the image processor 130 and the laser driving data generator 140.

The image processor 130 produces image data with reference to the pixel clock. The laser driving data generator 140 receive the image data, and produces laser driving data (that is, modulated data) with reference to the pixel clock to drive the semiconductor laser 201 via the laser driving unit 150.

In this manner, phase data is produced so as to correct the time offset from the reference scanning time, and is used to generate pixel clocks. A latent image is formed on the photosensitive unit 208 based on the corrected pixel clocks, while greatly reducing positional offset of the light spots from the correct (or the ideal) position on the photosensitive unit 208.

Explanation will be made of dot offset in an optical scanning system. In general, actual dot positions are offset from the ideal dot positions in the main scanning direction for the following reasons.
1) The fθ characteristic of the scanning lens is not sufficiently corrected.
2) The precision of the optical components of the optical scanning system and the assembling accuracy to assemble the optical scanning system onto the housing deteriorate.
3) The focal length changes due to deformation of the optical components and change in index of refraction caused by environmental changes, such as temperature change or humidity change in the apparatus, and consequently, the fθ characteristic of the lens deteriorates.

In the conventional optical writing apparatus, dot offset in the main scanning direction due to the environmental changes can not be prevented even if optical adjustment and electrical correction are made when shipping the apparatus. For example, the optical scanning system exhibits characteristic A for the first printing operation. However, as the subsequent printing operations are carried out, the temperature rises in the apparatus, and the characteristic changes to B. Consequently, the tint of the printed image will change after a certain amount of paper is printed.

To overcome this problem, in the seventh embodiment, characteristic values representing the relation between the actual image height and the ideal image height of the optical scanning system in use are determined in advance by preliminary experiment or simulation to create a lookup table. The optical scanning time is successively measured during the actual printing operation using the optical writing apparatus. A correction amount required for correcting dot offset is obtained from the lookup table based on the measured scanning time, and appropriate phase shift amount is determined so that the dot position approaches the ideal position. With this arrangement, dot offset in the main scanning direction due to the environmental changes in the apparatus can be effectively corrected.

How the dot offset is corrected using the optical writing apparatus shown in FIG. 30 is illustrated in FIG. 6, which is described in the first embodiment. In general, with a pixel clock generator generating a pixel clock a prescribed time after the trailing edge of the phase synchronizing signal that sets the writing start timing (see FIG. 34), a semiconductor laser is modulated during the effective scanning period, which defines the actual imaging area, based on the clock signal. When the laser beam emitted from the semiconductor laser forms an electrostatic latent image on the photosensitive unit via the optical system, light spots focused on the photosensitive unit are offset from the correct position in the main scanning direction due to adverse influence of the deflector and the lens system. The effective scanning period, which defines the effective writing range in the main scanning direction, varies depending on the optical system. In the embodiment, the maximum and the minimum image height ratios are set to +1 and −1, with the center of the image height set to zero.

In the example shown in FIG. 30 and FIG. 31, detectors 101 and 102 are positioned so as to correspond to the writing start position and the writing end position of the effective writing area, and scanning time is measured from the time difference between the first and second detectors 101 and 102 that detect the scanning beam reflected by the reflecting surface 206*a* of the transparent member (that is, a flat glass plate) 206. Based on the variation in the measured scanning time, the correction amount for dot offset in the scanning direction is determined from the lookup table created in advance.

The transparent member may be a beam splitter having a splitting surface as the first surface. In this case, the first surface splits the incident laser beam into light flux guided onto the photosensitive unit 207 and light flux reflected to the detectors 101 and 102. With this arrangement, light flux can be detected in real time at a time of starting and ending the writing in the effective scanning period.

Figure 32:
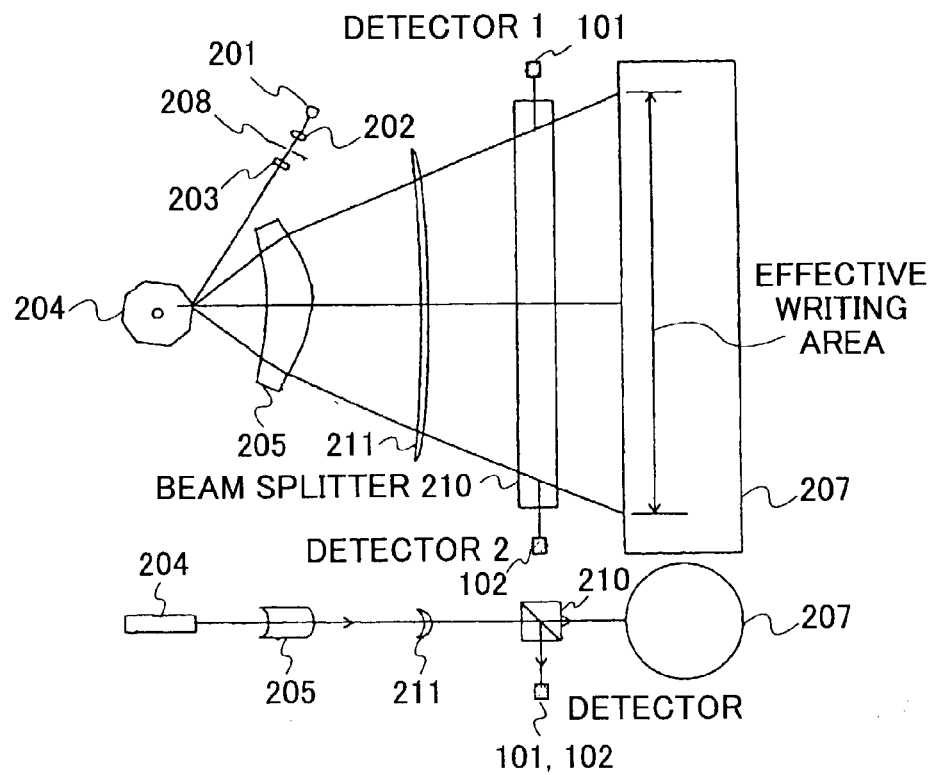
FIG. 32 illustrates a modification of the optical writing apparatus shown in FIG. 31 according to the seventh embodiment of the invention.

FIG. 32 illustrates a modification of the optical writing apparatus shown in FIG. 30 and FIG. 31. In the modification, a beam splitter 210 consisting of a pair of right-angled prisms is used as the transparent member, in place of the flat glass plate 206. The two prisms are bonded to each other, and the bonding face is a half-mirror surface. Light flux deflected by the polygonal mirror 204 strikes the beam splitter 210 via the first and second scanning lenses 205 and 211. A portion of the incident beam to the beam splitter 210 passes through the half mirror surface, and strikes the photosensitive unit. The remaining portion of the incident beam is reflected by the half mirror surface, and bent downward, as illustrated in the bottom diagram of FIG. 32. With this arrangement, first scan is carried out on the photosensitive unit as the polygonal mirror 204 rotates, while second scan is carried out by reflection from the half mirror surface of the beam splitter 210. The first and second detectors 101 and 102 are located on the second scanning line to acquire phase synchronizing signals.

In any of the arrangements shown in FIG. 30 through FIG. 32, the laser beam is deflected by the polygonal mirror 204 and forms light spots on the photosensitive unit 207 via the scanning lens 205.

When using the flat glass plate 206 having a reflecting surface 206a closest to the polygonal mirror 204, as illustrated in FIG. 30 and FIG. 31, the detectors 101 and 102 sense the light flux reflected by the first surface of the flat glass plate 206. This arrangement has the following advantages.

1) There are fewer number of surfaces through which the laser beam passes before the reflection, and deterioration of the wave front of the detection light flux can be prevented. Consequently, detection of beams position becomes accurate.
2) The reflected beam (that is, detected beam) is not affected by absorption of the material. Loss of light quantity can be reduced because of fewer transmissible surfaces.

When using the first surface of the transparent member 206 as the reflecting surface 206a to guide the reflected light flux to the detectors 101 and 102, it is necessary to reduce the power of the ghost light reflected from the second surface of the transparent member 206. To reduce the power of the ghost light, the following coating conditions are selected.

[Coating Condition 1]

When using a light source with the wavelength of 780 nm and a-flat glass plate with the index of refraction of 1.511:

the first surface is not coated, or coated with $MgF_2$ (having an index of refraction of 1.38) with the thickness of $\lambda/2$; and the second surface is coated with $MgF_2$ with the thickness of $\lambda/4$, where $\lambda=780$ nm.

The reflectance of the first surface is 4.14%, and the reflectance of the second surface is much lower.

[Coating Condition 2]

When using a light source with the wavelength of 780 nm and a flat glass plate with the index of refraction of 1.511:

the first surface is not coated, or coated with $MgF_2$ (having an index of refraction of 1.38) with the thickness of $\lambda/2$; and the second surface is two-layer coated with $MgF_2$ with the thickness of $\lambda/4$ and $Al_2O_3$ (having an index of refraction of 1.63) with the thickness of $\lambda/4$.

The reflectance of the first surface is 4.14%, and the reflectance of the second surface is 0.16%, which is further reduced, as compared with Coating condition 1.

[Coating Condition 3]

When using a light source with the wavelength of 780 nm and a flat glass plate with the index if refraction of 1.511, the second surface is tow-layer coated under the same condition with Coating condition 2, and the first surface is coated with $Al_2O_3$ (having an index of refraction of 1.63) with the thickness varied among $\lambda/5$, $\lambda/4$, and $2\lambda/5$. The reflectance of the first surface at each thickness is as follows:

7.24% at thickness of $\lambda/5$;
7.68% at thickness of $\lambda/4$; and
5.36% at thickness of $2\lambda/5$.

By setting the index of refraction of the coat layer on the first surface larger than that of the glass material, and by setting the thickness d of the coat layer within the range $0<d<\lambda/2$ (where $\lambda$ is the wavelength of the light source), the reflectance of the first layer can be further increased.

If the transparent member 206 is a parallel and flat glass plate, as illustrated in FIG. 30, float processing can be used. Because of the parallel surfaces, there is little difference in the optical characteristics between light flux guided to the scanned surface and light flux guided to the detectors 101 and 102.

The flat glass plate 206 may be a dustproof glass. In this case, the divergent light flux from the semiconductor laser 201 is coupled by a coupling lens (not shown), and guided to the cylindrical lens 203 (FIG. 30) having a power only in the sub-scanning direction. The cylindrical lens 203 makes the light flux form a line image extending in the main scanning direction near the reflecting point of the polygonal mirror 204. The light flux deflected by the polygonal mirror 204 passes through the scanning lens 205 and the dustproof flat glass plate 206, and strikes the scanned surface of the photosensitive unit 207. Using the dustproof flat glass plate, dust is prevented from entering the optical scanning path.

Thus, the transparent member 206 has a dustproof function and light splitting function for extracting light flux for detection.

Figure 33:
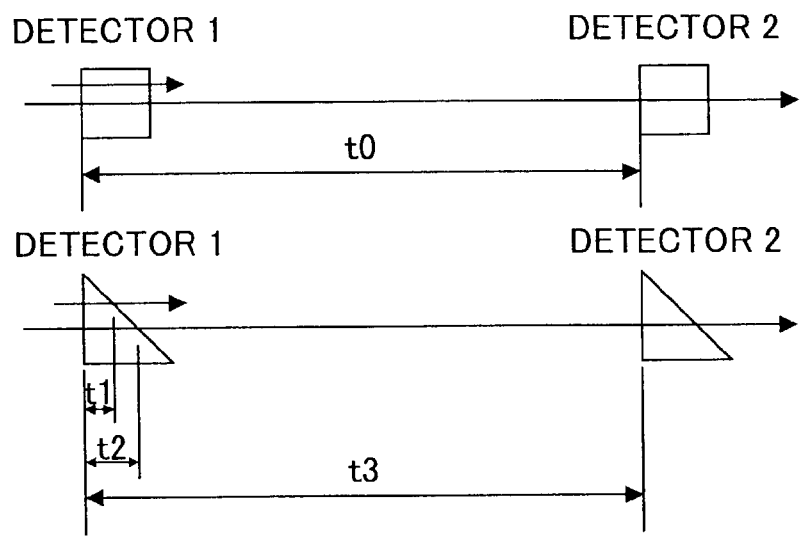
FIG. 33 illustrates how the scanning beam passes through the detectors.

As has been described above, light flux reflected from the transparent member is detected by a pair of detectors 101 and 102. The detector may have a rectangular shape (shown in the top diagram in FIG. 33) or a triangular shape (shown in the bottom diagram in FIG. 33). When using a rectangular detector, triangle slits are positioned immediately before the detectors 101 and 102, respectively.

By detecting time t1 and t2 required for the detector 101 to detect the light flux, the position in the sub-scanning direction can be measured. The rising edge of the detection signal agrees with the incidence of the beam onto the detectors 101 and 102. Accordingly, time difference t3 between the first detector 101 and the second detector 102 is determined by detecting the rising edge of the detection signals from the detectors 101 and 102. Using the measured time difference, a magnification error can be determined.

As illustrated in FIG. 31, Light flux toward the detector 101 and light flux toward the writing start position have an overlapped area on the reflecting surface (or the first surface) 206a of the transparent member 206, and therefore, light flux is detected in synchronization with the incidence of the beam onto the photosensitive unit 206 at a location very close to the actual writing start position. Accordingly, precision of synchronizing detection is improved. In addition, the deflector 104, the scanning lens 205, and the transparent member 206 can be made compact. Similarly, light flux toward the second detector 102 and light flux toward the writing end position have an overlapped area on the reflecting surface 206a of the transparent member 206, and therefore, bend of the scanning line or a partial magnification error can be measured in the effective wiring range.

Figure 35:
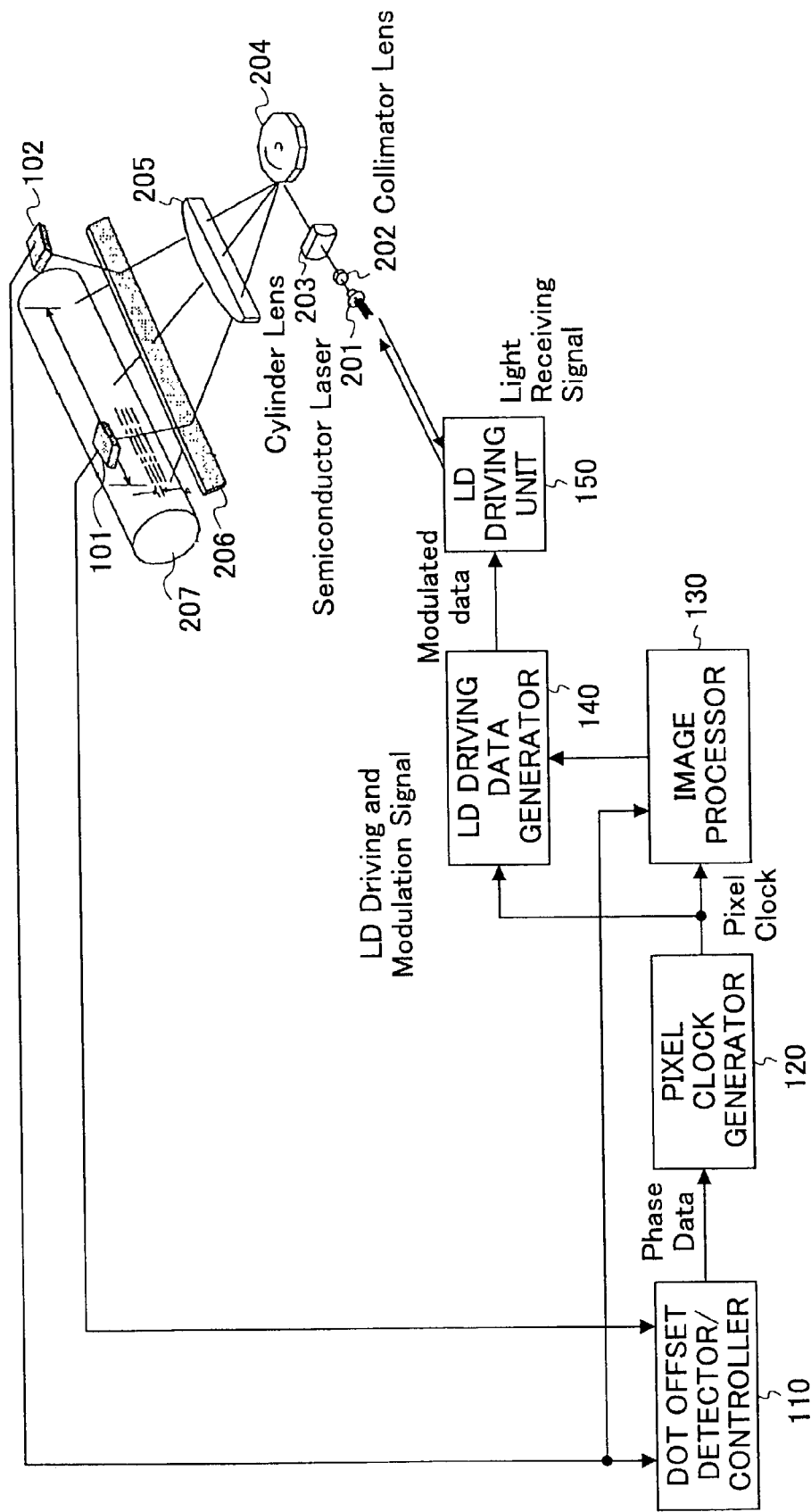
FIG. 35 illustrates the second modification of the optical writing apparatus according to the seventh embodiment of the invention.
Figure 36:
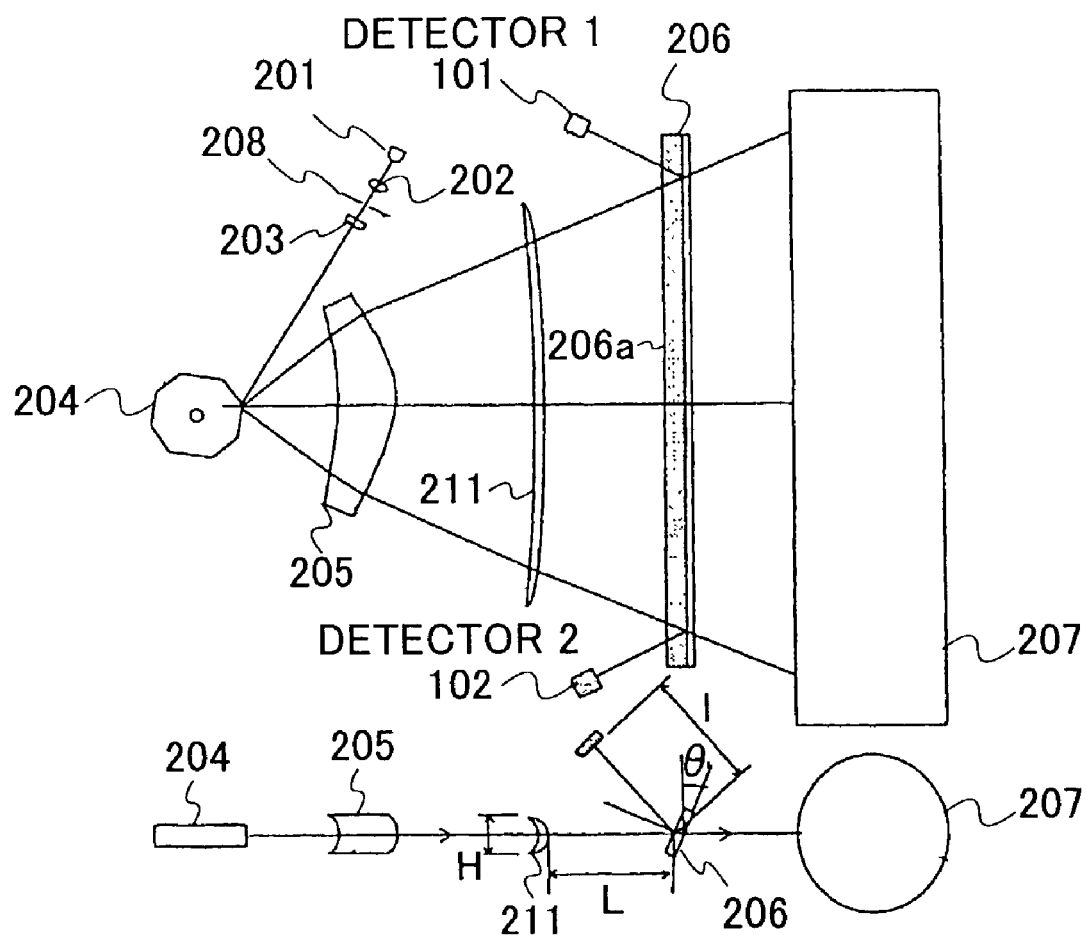
FIG. 36 illustrates the light path from the polygonal mirror to the photosensitive unit in the optical writing apparatus shown in FIG. 35.

FIG. 35 and FIG. 36 illustrate a second modification of the optical writing apparatus shown in FIG. 30. In the second modification, the transparent member 206 is tilted with respect to a place perpendicular to the light flux directed toward the center of the effective scanning range on the photosensitive unit 207, as illustrated in the bottom diagram of FIG. 36. The bottom diagram of FIG. 31 is a cross-sectional side view extending from the polygonal mirror 204 (located on the upstream side) to the scanned surface of the photosensitive unit 207, in which the transparent member 206 is rotated about the longitudinal axis so as to tilt by angle θ from a plane perpendicular to the light flux incident onto the photosensitive unit 207. By tilting the transparent member 206, light flux incident to the transparent member 206 can be separated easily. Tilting the transparent member 206 not only increases the degree of freedom for layout of the detectors 101 and 102, but also prevents the light flux reflected by the reflecting surface (or the first surface) 206a from returning to the scanning lens 205 or the polygonal mirror 104. Accordingly, ghost light is removed effectively.

In FIG. 36, the width (or height) of the scanning focusing element 211 closest to the transparent member 206 on the upstream side is H, the length from the scanning focusing element to the transparent member 206 is L, the tilting angle of the transparent member 206 is θ, and the length from the transparent member 206 to the detector 101 or 102 is 1. Then, the condition of positioning the detector 101 or 102 without causing the detecting light flux to interfere with the scanning focusing element is $H/2 < L \times \tan \theta$ or $l < L$.

If length l is set to 60 mm in FIG. 36, and if the surface precision of the transparent member 206 at an available machining level is 400 mR, then the scanning line bends 50 μm or more on the synchronizing detection surface when θ is set to 71 degrees. To carry out the detection at high precision, the bend of the scanning line must be reduced below 50 μm. To reduce the bend less than 50 μm, the tilting angle θ has to be set less than 70 degrees (θ<70°) By setting θ smaller than 70 degrees, separation of light flux become easy without causing interference, and the detection accuracy increases. Consequently, correction value for the dot offset can be determined precisely in the effective scanning range, based on the time difference detected between the first and second detectors 101 and 102.

Dot offset correction is carried out in the same manner as explained in the first through fifth embodiments. That is, the effective scanning period is divided into multiple data blocks, and phase shift data is given for each data block. Each data block includes, for example, 30 pixel clocks as shown in FIG. 7, and three pixels in the data block are subjected to phase shift to carry out −(⅜)PCLK-of phase shift to correct dot offset, where the phase shift resolution is ±(⅛)PCLK.

Figure 37:
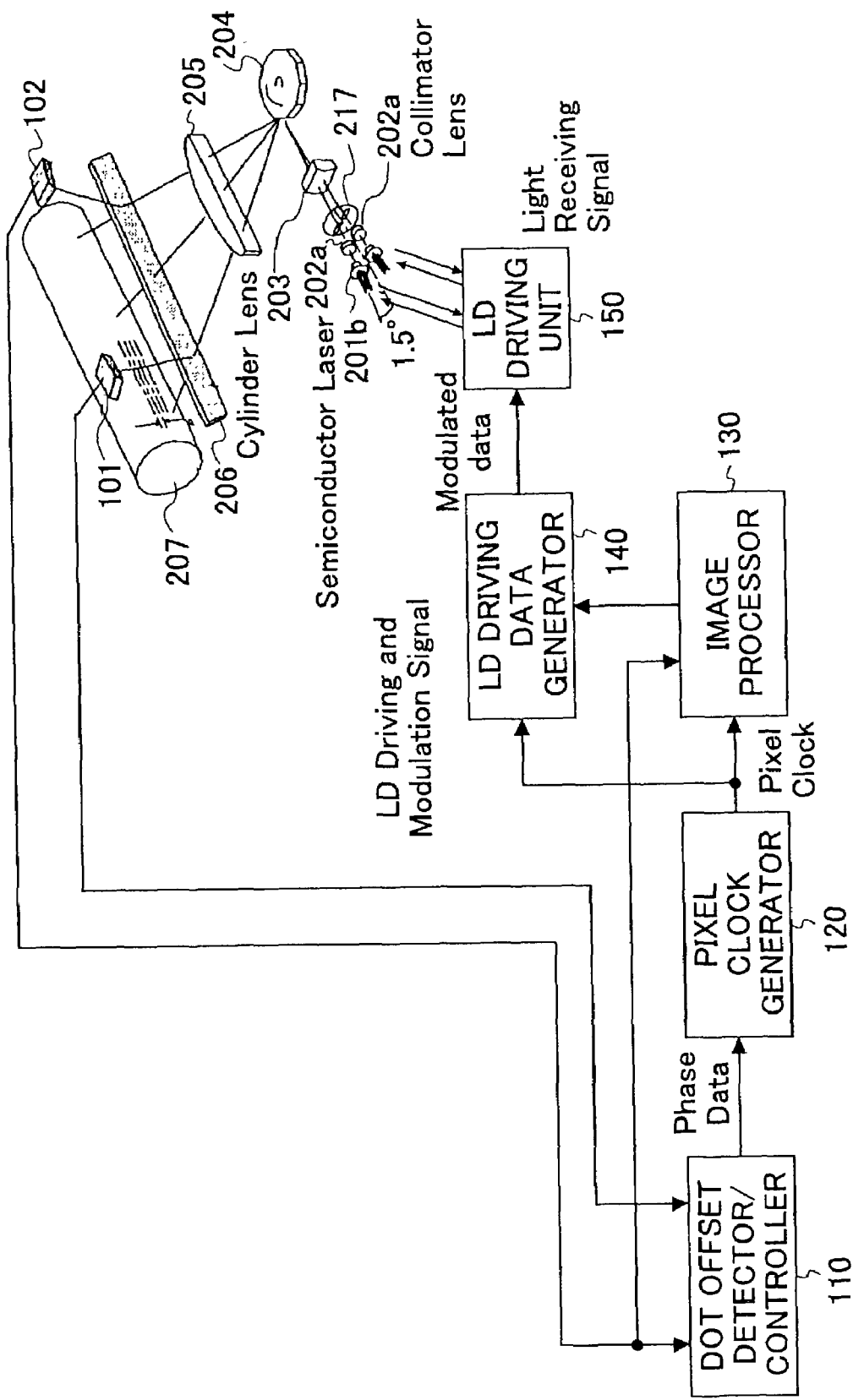
FIG. 37 illustrates an example in which a multi-beam structure is applied to the optical writing apparatus shown in FIG. 35.

FIG. 37-*illustrates* an example in which a multi-beam structure described in the sixth embodiment is applied to the optical writing apparatus shown in FIG. 35. In the example shown in FIG. 37, semiconductor lasers 201a and 201b are used, and the detectors 101 and 102 detect light flux of each laser beam emitted from one of the semiconductor lasers 201a and 201b to take synchronization with each writing light flux. Writing operation under dot offset correction is conducted for two lines simultaneously.

Figure 38:
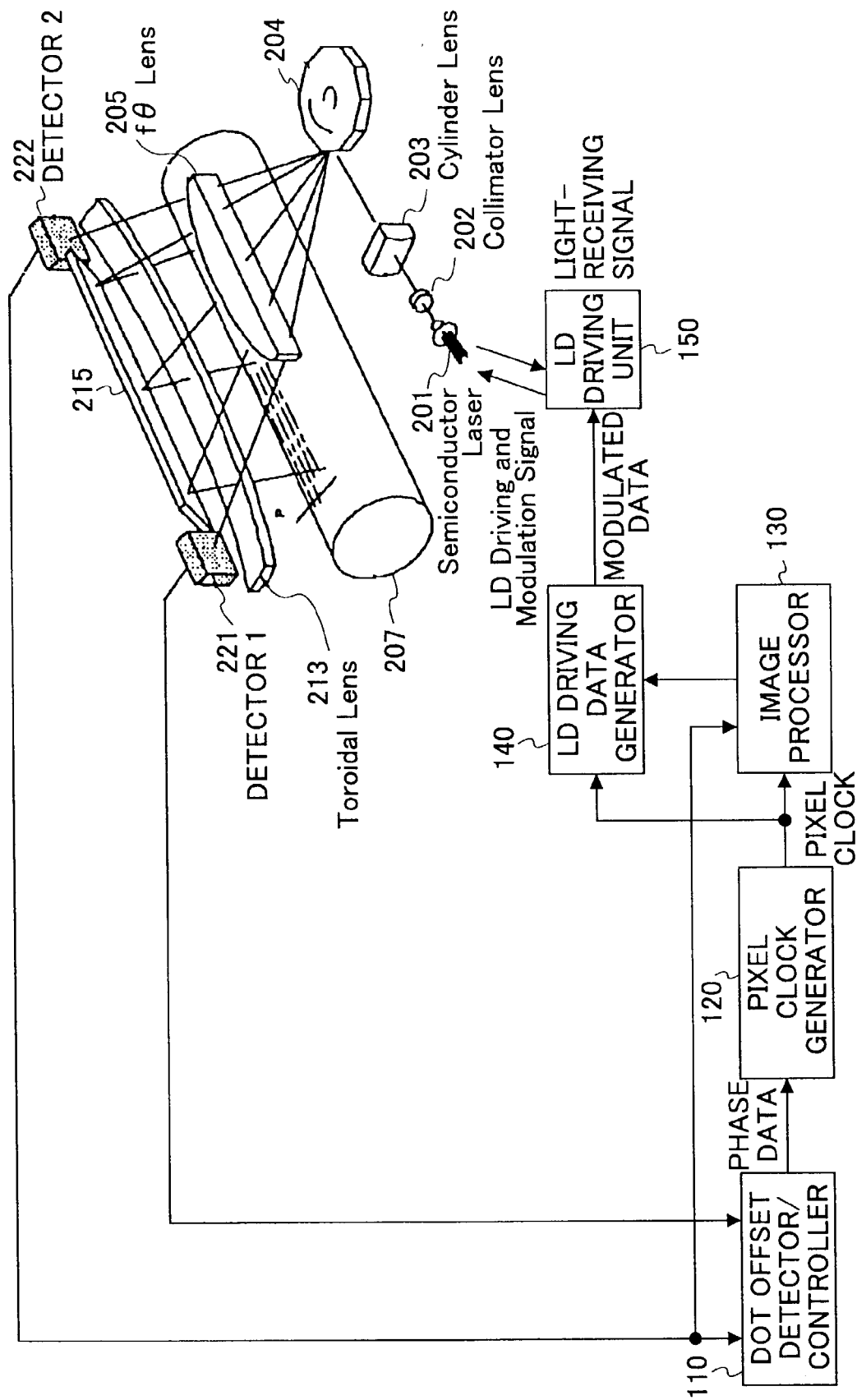
FIG. 38 illustrates the third modification of the optical writing apparatus according to the seventh embodiment of the invention.

FIG. 38 illustrates the third modification of the optical writing apparatus shown in FIG. 30, in which light flux having passed through the scanning lens (or the fθ lens) 205 is guided directly to the first and second detectors 221 and 222, while the light flux reflected by the reflecting mirror 215 is guided to the effective writing range on the photosensitive unit 207 via the toroidal lens 213. The phase data is produced by the dot offset detector/controller 110, based on time difference between the first and second detectors 221 and 222, as has been described above.

Figure 39:
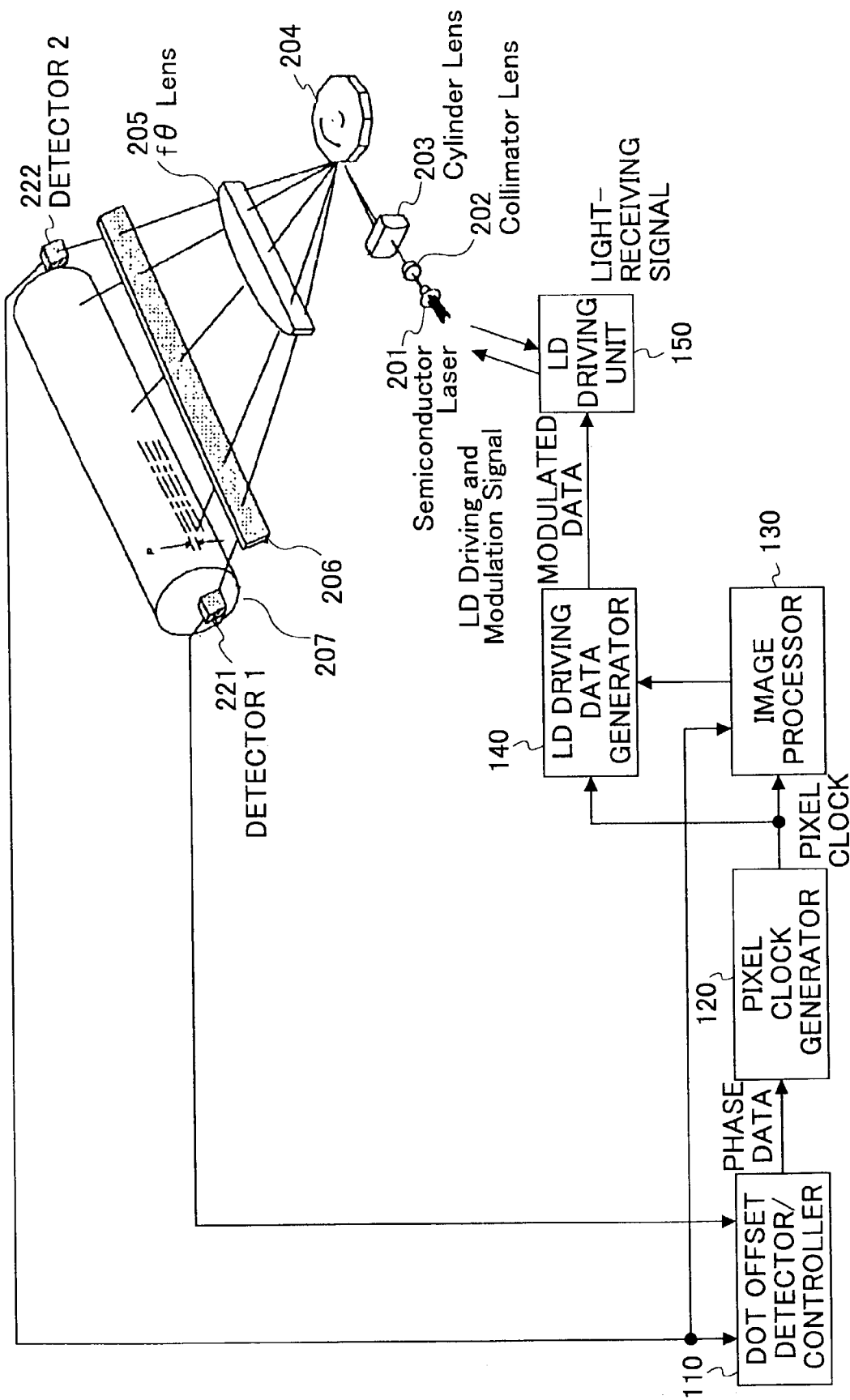
FIG. 39 illustrates the fourth modification of the optical writing apparatus according to the seventh embodiment of the invention.

FIG. 39 illustrates the fourth modification of the optical writing apparatus shown in FIG. 30, in which the light flux passing through the transparent member 206 strikes the first and second detectors 221 and 222, as well as the effective writing area. The synchronizing detection results are supplied from the first and second detectors 221 and 222 to the dot offset detector/controller 110, which then produces phase data based on time difference detected between the first and second detectors 221 and 222.

Figure 40:
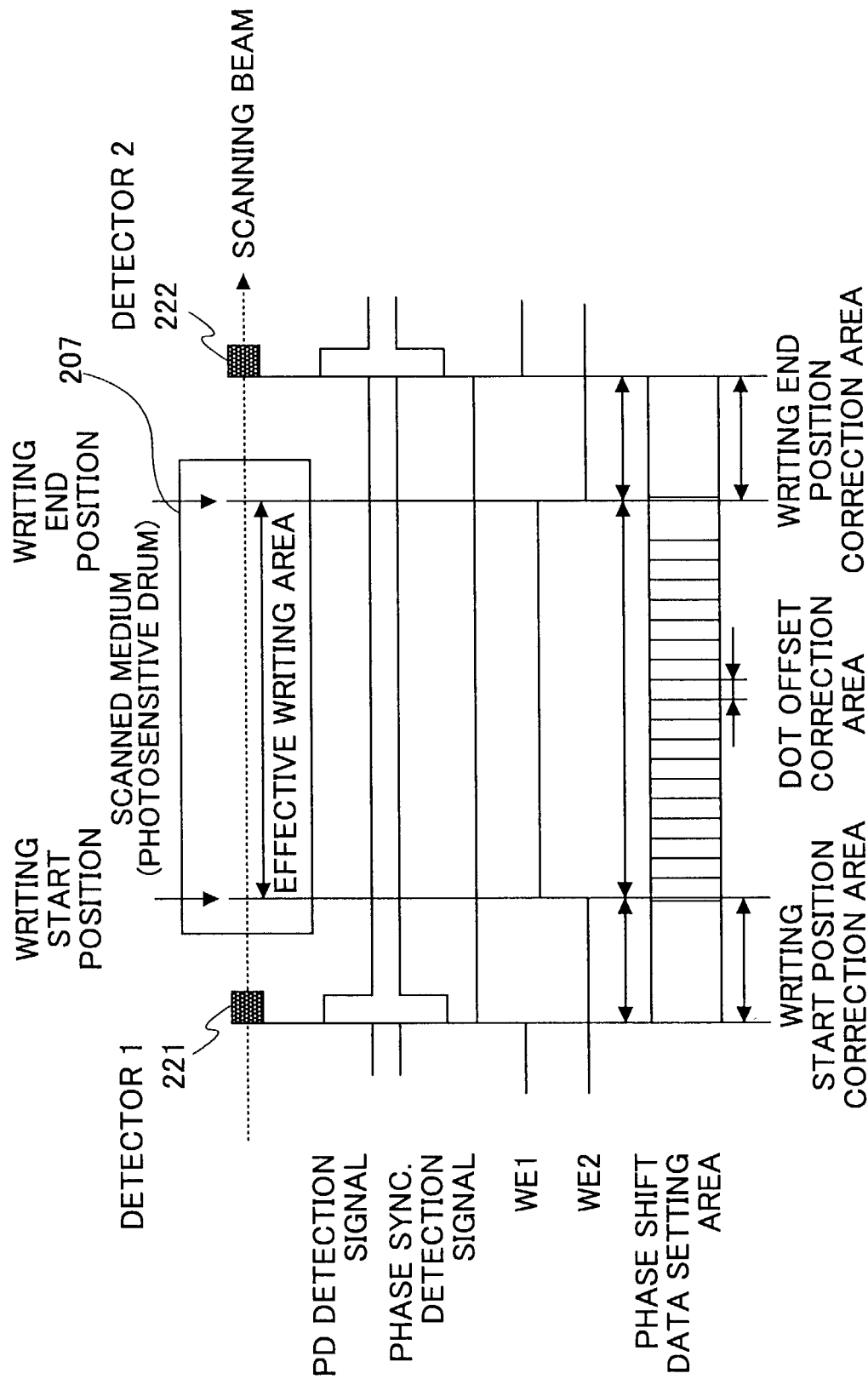
FIG. 40 illustrates charts showing the relation between the detection signal and the effective writing area using the optical writing apparatus shown in FIG. 38 or FIG. 39.

FIG. 40 illustrates the relation between the detection signal supplied from the first and second detector 221 and 222 and the effective writing area when using the optical writing apparatus shown in FIG. 38 or FIG. 39.

Figure 34:
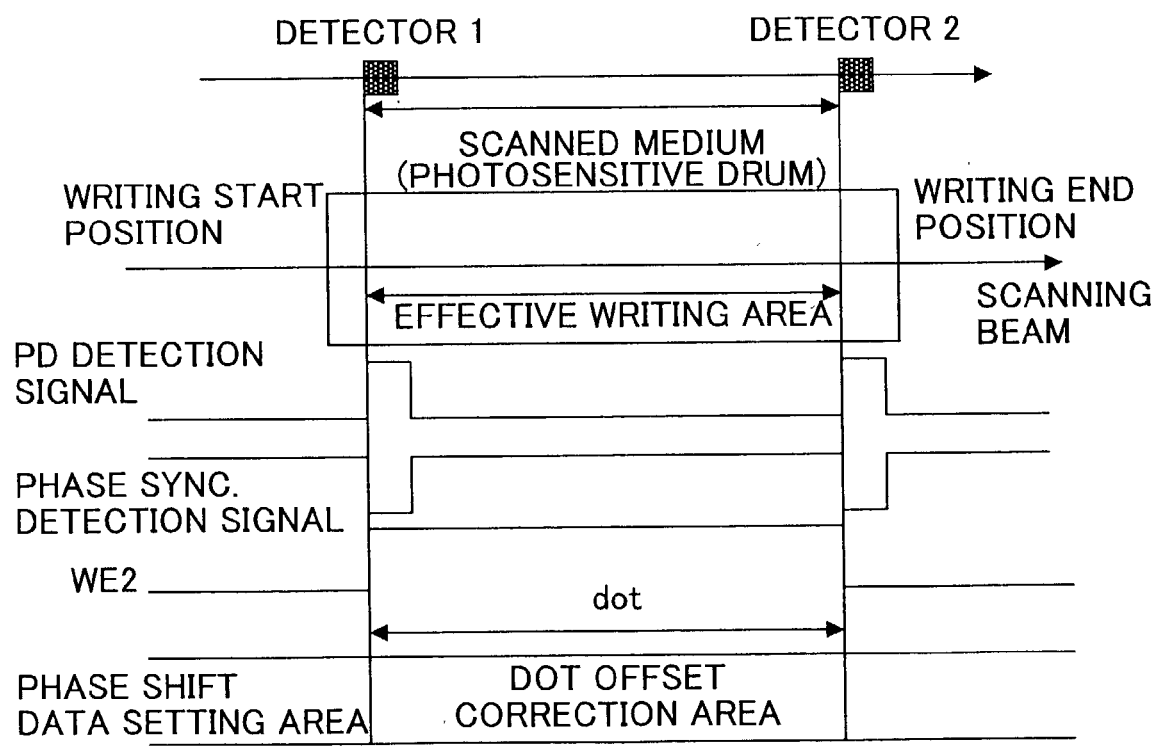
FIG. 34 illustrates timing charts showing the relation between the detection signal and the effective writing area.
Figure 41:
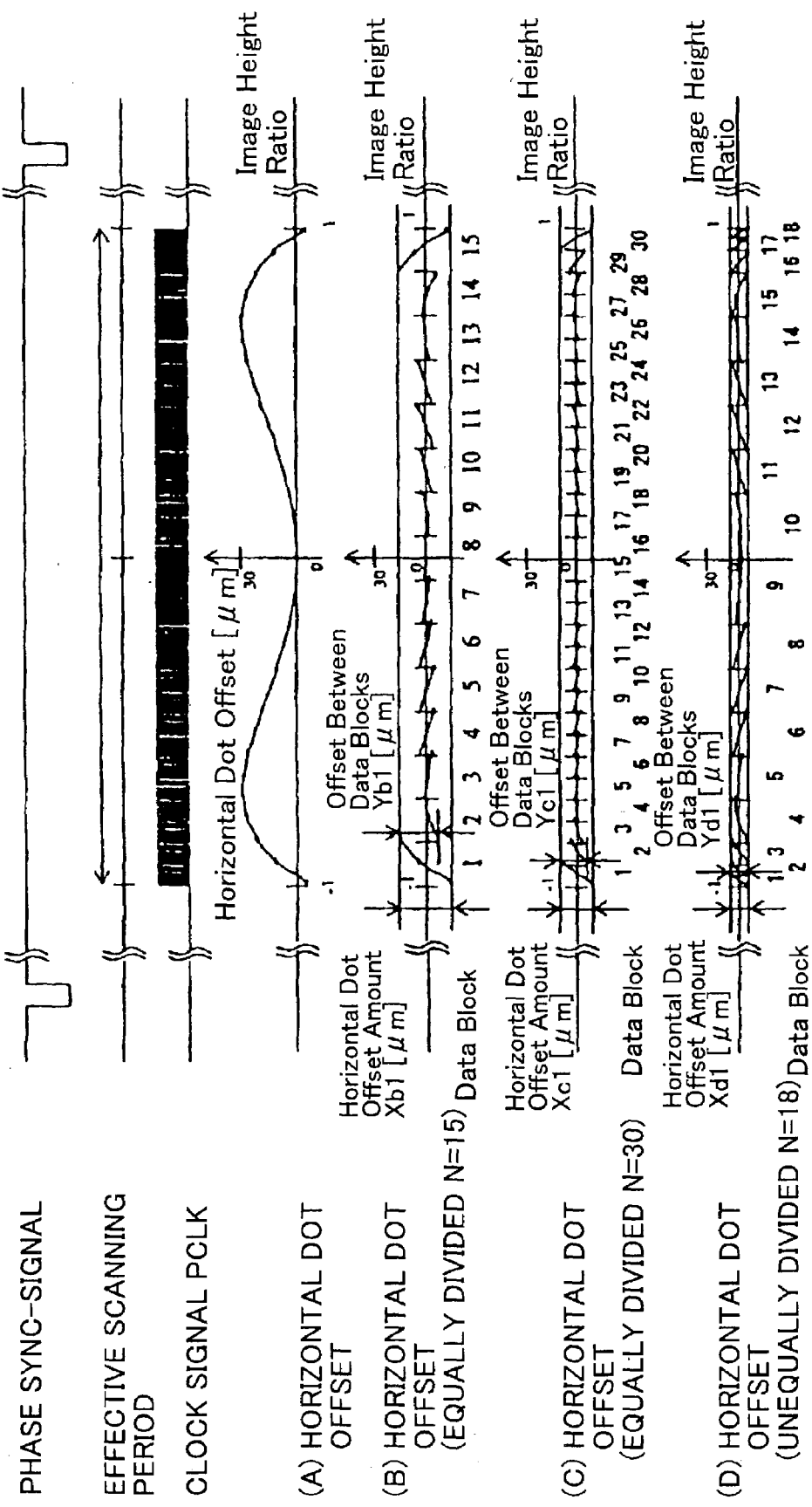
FIG. 41 illustrates the dot offset amount versus image height ratio when conducting dot offset correction using the optical writing apparatus of the seventh embodiment.

In either case shown in FIG. 34 or FIG. 40, the writing start position and the writing end position can be controlled precisely. The pixel generating unit, which comprises the dot offset detector/controller 110 and the pixel clock generator 120, defines multiple data blocks within the effective writing range extending between the writing start position and the writing end position, and gives phase data to each data block, as in the first through fourth embodiment. The effective writing period may be equally divided, or alternatively, unequally divided. In the latter case, the data blocks at or near the image height of zero include more pixel clocks, and the data block size at or near the image height of ±1 becomes smaller, as illustrated in FIG. 41.

If the resolution of phase shift correction is plus or minus one eighth (±⅛) of pixel clock, dot offset can be corrected at resolution of ±⅛ dot, and consequently the correction amount of linearity can be adjusted between 0% to 12.5%. If the writing rate is 1200 dpi, the dot offset in the main scanning direction in the effective writing area can be reduced to 2.6 μm (which equals 21.2 μm/8), as described in the first embodiment.

Any one of, and any combinations of the first through sixth embodiments can be combined with the seventh embodiment. In this case, phase shift timing of a pixel clock is synchronized with a high-frequency reference clock. The cycle of the pixel clock is adjusted at one-clock step or half-clock step of the high-frequency reference signal According to the seventh embodiment, a transparent member is inserted between the scanned surface on the photosensitive unit and the deflector (or the polygonal mirror). Two detectors are provided corresponding to the writing start position and the writing end position, each of which detects light flux reflected from the transparent member.

With this arrangement, the scanning optical system can be made compact, and deterioration of the optical characteristics of the detection beam, such as bend of scanning line, magnification error, and beam spot diameter, can be prevented. Since the scanning optical system is made compact, power consumption, noise, and vibration can be reduced for driving the deflector.

Coating conditions for the transparent member are selected so as to-effectively reduce ghost light, and detection accuracy increases.

Synchronizing detection signals are acquired from two detectors, and dot offset can be corrected in real time based on two-point synchronization.

The effective writing period is divided into multiple data blocks, and phase data produced from offset of scanning time is given to a data block unit. Accordingly, the data amount required for dot offset correction is greatly reduced. The memory size and the chip size are reduced, and ASIC is made compact with reduced cost.

Eighth Embodiment

FIGS. 42 through 45 illustrates an optical writing apparatus according to the eighth embodiment of the invention. In the eighth embodiment, three detectors 221, 222, and 223 are used to detect the synchronization of optical writing in order to correct positional offset of dots.

The laser beam emitted from the semiconductor laser 201 passes through the collimator lens 202 and the cylindrical lens 203, and is deflected by the polygonal mirror 204. The deflected beam passes through the fθ lens 205. A portion of the laser beam that has passed through the fθ lens 205 is reflected by the reflecting surface (i.e., the-first surface) 206a of the transparent member 206, and guided to the first through third detectors 221, 222, and 223. The remaining portion of the laser beam passes through the transparent member 206, and strikes the photosensitive unit 208 to form an electrostatic latent image on it.

The first and second detectors 221 and 222 detect the writing start position and the writing end position, respectively. The third detector 223 detects the center of the effective writing area. The detection signals are supplied from these detectors to the dot offset detector/controller 110. The dot offset detector/controller 110 measures the scanning time required for the scanning laser beam to move from the first detector 221 to the third detector 223, and to move from the third detector 223 to the second detector 222. The measured scanning time is compared with the reference scanning time, which is obtained in advance when the ideal scanning operation is carried out, to determine time offset. The dot offset detector/controller 110 then produces phase data that corrects the time offset, and outputs the phase data to the pixel clock generator 120. The dot offset detector/controller 110 and the pixel clock generator 120 comprise a pixel clock generating unit. Although not shown in FIG. 41, the detection signal from the first detector 221 is also input to the image processor 130, and used as a line synchronizing signal.

The pixel clock generator 120 has a structure shown in FIG. 4A or FIG. 4B. If the pixel clock generator 120 does not have a phase data storage (as shown in FIG. 4A), the dot offset detector/controller 110 outputs phase data for each line to the pixel clock generator 120. If the pixel clock generator 120 has a phase data storage (as shown in FIG. 4B), phase data are produced in advance by the dot offset detector/controller 120, and stored in the pixel clock generator 120 in advance.

As in the example using a pair of detectors (shown in FIG. 30 through FIG. 41), the dot offset detector/controller 110 produces second phase data for dynamic correction, in addition to first phase data for static correction. The first phase data is used repeatedly-every line to correct dot offset due to statistic factors, such as the lens characteristic of the scanning lens. The second phase data is used to correct dot offset due to dynamic factors, such as fluctuation in rotational speed of the polygonal mirror that changes each line. In-this case, the pixel clock generator 120 has a phase data composite circuit (not shown) to synthesize the first and second phase data. If the multi-beam light source structure described in the sixth embodiment is applied to the optical writing apparatus shown in FIG. 30, then multiple pairs of detectors 101 and 102 are furnished so as to simultaneously produce phase data for multiple lines corresponding to the respective light sources.

The pixel clock generator 120 generates a pixel clock based on the phase data supplied from the dot offset detector/controller 110, and outputs the pixel clock to the image processor 130 and the laser driving data generator 140.

The image processor 130 produces image data with reference to the pixel clock. The laser driving data generator 140 receives the image data, and produces laser driving data (that is, modulated data) with reference to the pixel clock to drive the semiconductor laser 201 via the laser driving unit 150. Consequently, a latent image is formed on the photosensitive unit 208 with greatly reduced positional offset.

Figure 43:
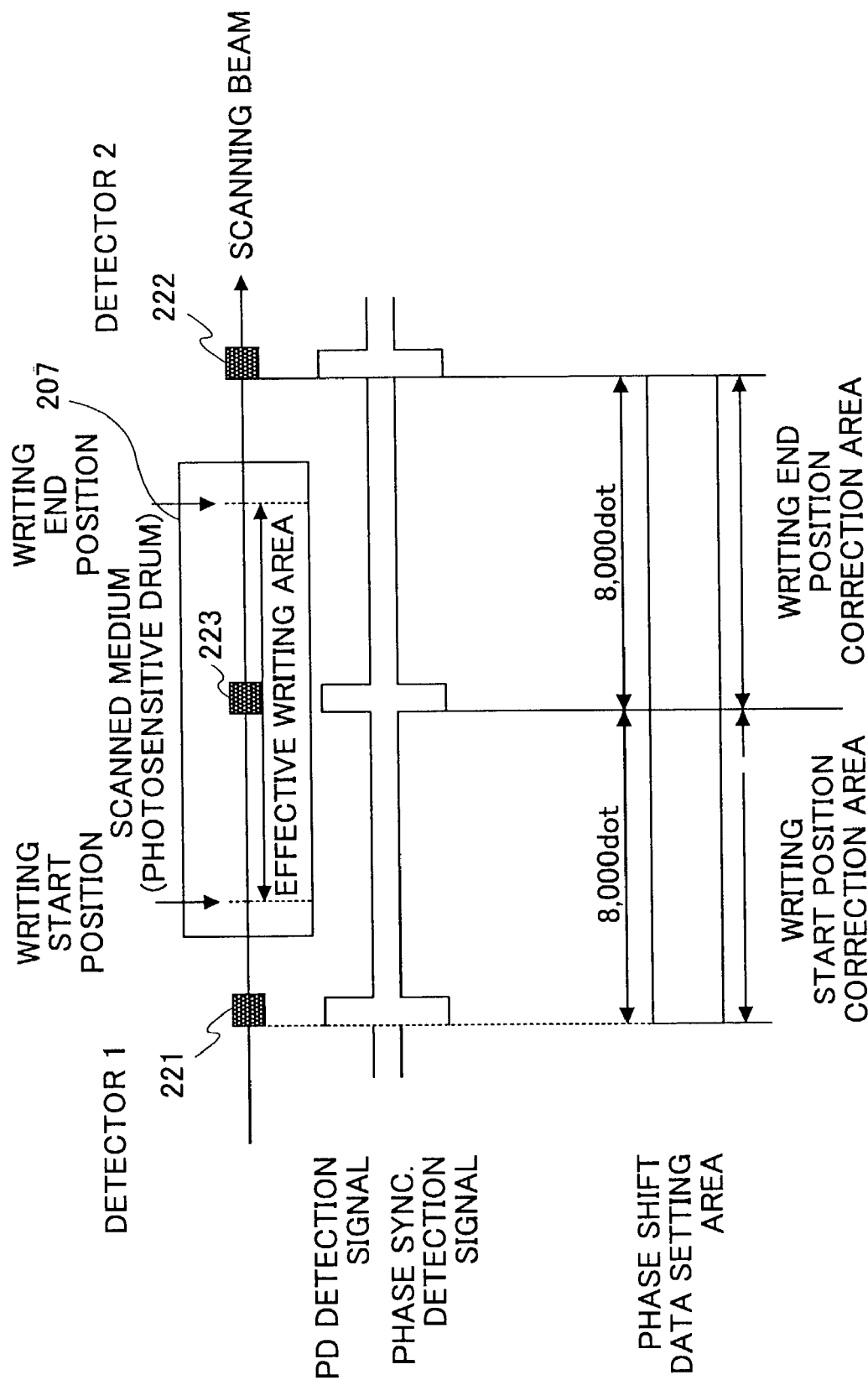
FIG. 43 illustrates the detection signals from the first through third detectors, together with the writing start position correction area and the writing end position correction area.

FIG. 43 illustrates the detection signals supplied from the first through third detectors 221, 222, and 223, and the phase synchronizing signals converted from the detection signals, together with the phase shift data setting area to which phase shift data are given.

The area from the first detector 221 to the third detector 223 is a writing start position correction area, and the area from the third detector 223 to the second detector 222 is a writing end position correction area. Each of the correction areas includes 8000 dots. At or near the start positions of the respective correction area, which correspond to the first and third detectors 221 and 223, the dot positions are synchronized with the pixel clocks at high accuracy because of the detection signals from the detectors 221 and 223. On the other hand, in the region between the detectors, the pixel clocks are likely to fluctuate due to variation in the lens system-or the deflector. To prevent the pixel clocks from fluctuating, phase shift data is given to each of the writing start position correction area and the writing end position correction area. For example, among 8000 dots, dot offset correction is carried out so that $-\frac{1}{16}$ dot of phase shift is given to an arbitrary dot in every ten dots.

Although three detectors 221, 222 and 223 are used in the example shown in the eighth embodiment, the number of detectors can be increased. Dots can be written accurately at the position corresponding to the detectors.

Figure 44:
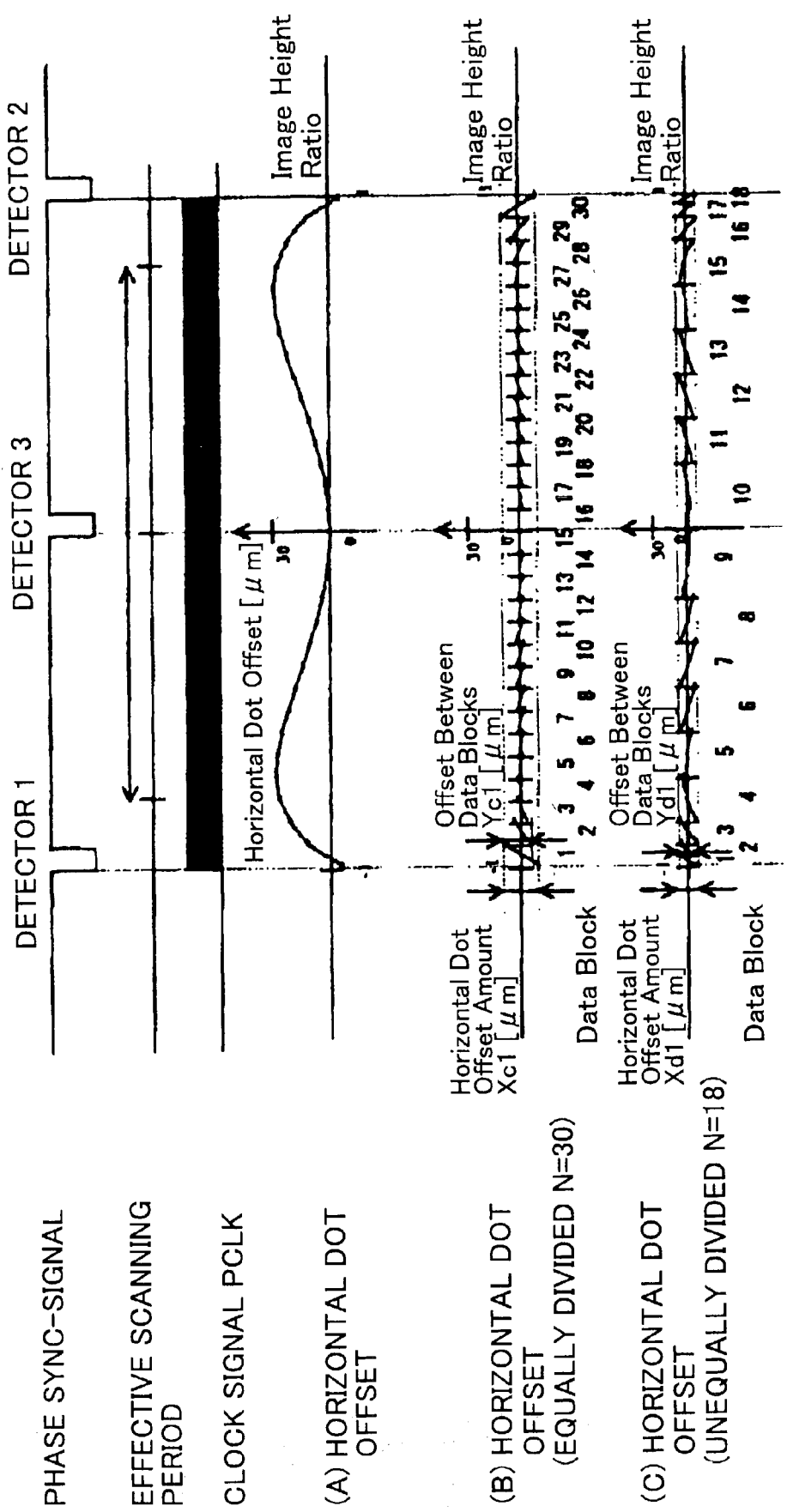
FIG. 44 illustrates the dot offset amount versus image height ratio when conducting dot offset correction using the optical writing apparatus shown in FIG. 42.

FIG. 44 illustrates the amount of dot offset versus image height ratio when performing phase shift correction using three detectors. In FIG. 44(B), the region between the first and third detectors 221 and 223 is equally divided into 15 data blocks. Similarly, the region between the third and second detectors 223 and 222 is equally divided into 15 data blocks. In FIG. 44(C), each of the regions between the first and third detectors 221 and 223 and between the third and second detectors 223 and 222 is unequally divided into 9 data blocks. Phase shift correction is made in each data block based on the time offset in scanning time between the associated detectors. If the resolution of dot offset correction is $\pm \frac{1}{8}$ dot, the correction amount of linearity can be adjusted from 0% to 12.5%. If the writing rate is 1200 dpi, the dot offset in the main scanning direction within the effective writing area can be reduced to 2.6 µm (which equals 21.2 µm/8)

Figure 42:
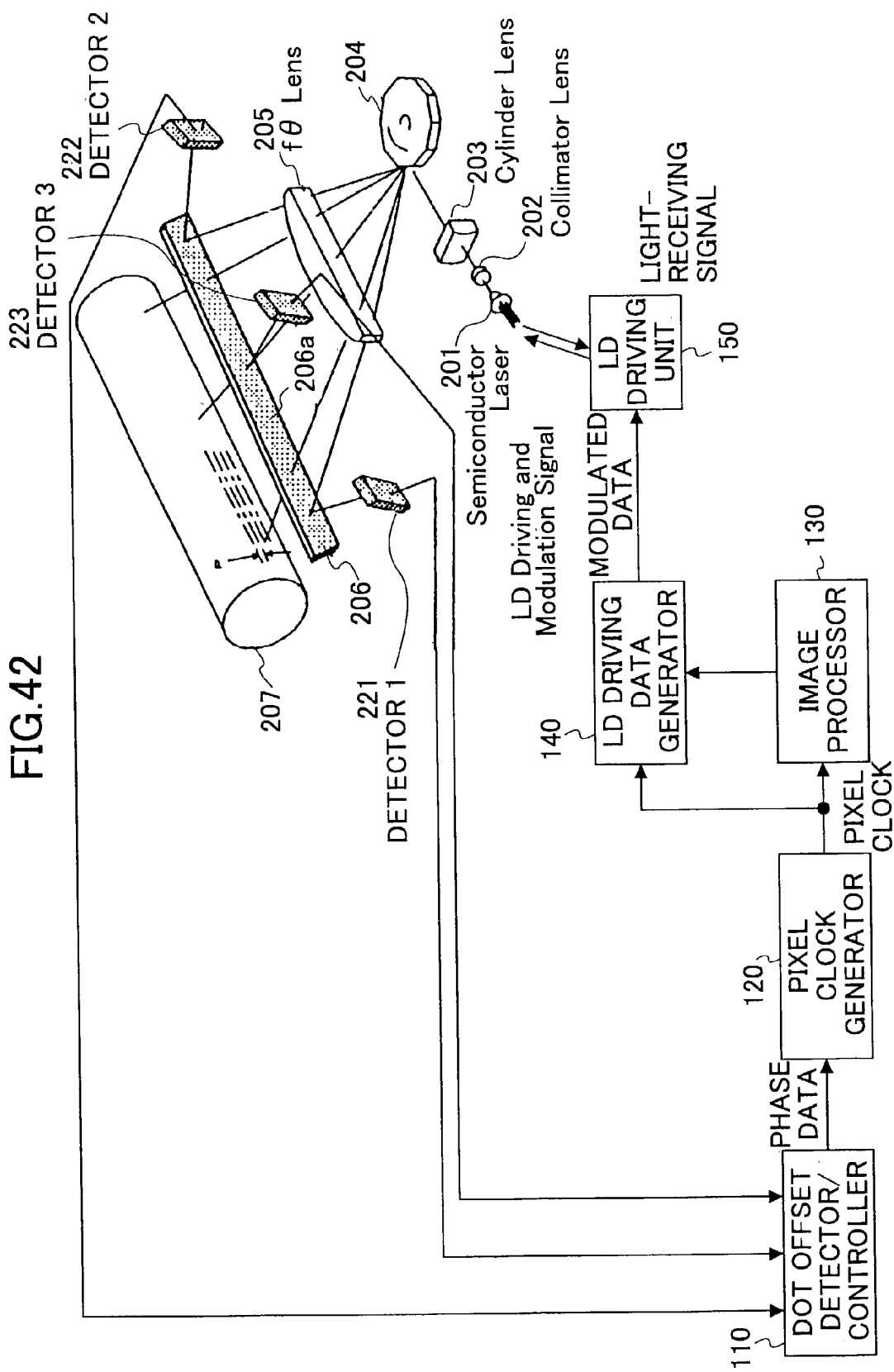
FIG. 42 illustrates an optical writing apparatus according to the eighth embodiment of the invention.
Figure 45:
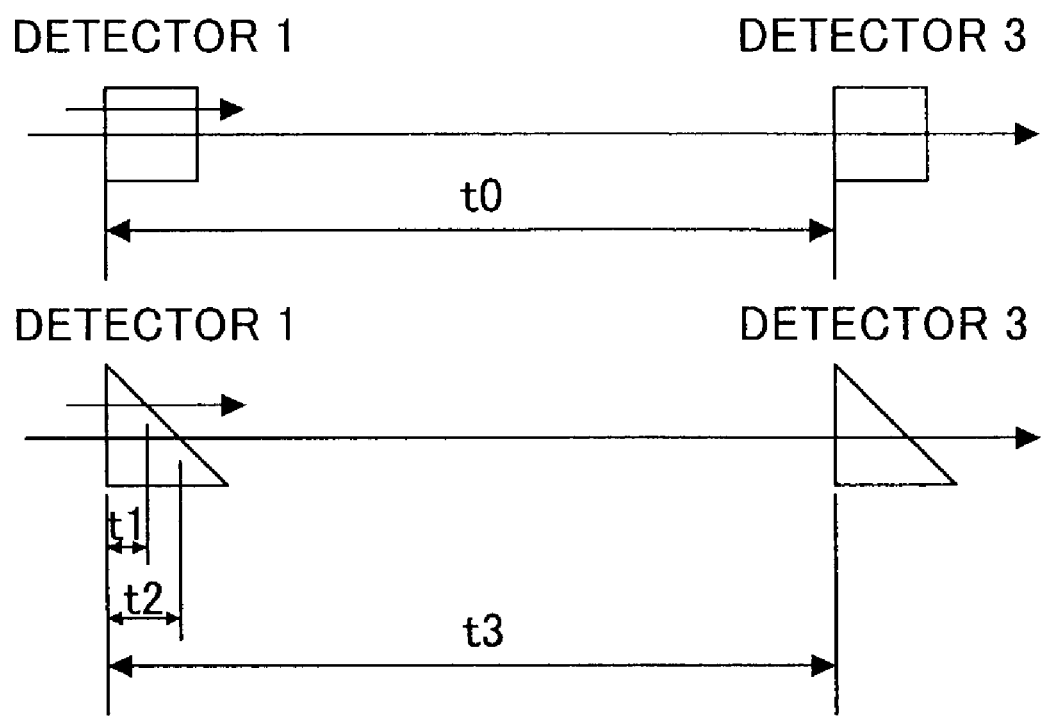
FIG. 45 illustrates examples of the first and third detectors, together with the scanning beam path.

FIG. 45 illustrates examples of detectors used in the optical writing apparatus shown in FIG. 42. The detector has a rectangular shape as shown in the top diagram in FIG. 45, or alternatively, a triangular shape as shown in the bottom diagram in FIG. 45. When using a rectangular detector, triangle slits are positioned immediately before the detectors 221, 222, and 223, respectively.

By detecting time t1 and t2 required for the first detector 221 (or detector 1) to detect the light flux, the position in the sub-scanning direction can be measured. The rising edge of the detection signal agrees with the incidence of the beam onto the detectors 221, 222, and 223 Time difference t3, which is the scanning time required for the laser beam to move between the first detector 221 (i.e., detector 1) and the third detector 223 (i.e., detector 3), is determined by detecting the rising edge of the detection signals Similarly, time difference t4 (not shown), which is the scanning time required for the laser beam to move between the third detector 223 (i.e., detector 3) and the second detector 222 (i.e., detector 2), is determined by detecting the rising edge of the detection signals. From time t3 and t4, magnification error can be determined.

The transparent member 206 is, for example, a flat glass plate 206 having a reflecting surface (or the first surface)

206, and the first through third detectors 221, '222, and 223 are positioned so as to sense the light flux reflected by the first surface 206a of the flat glass plate 206. This arrangement has the following advantages.

1) There are fewer surfaces through which the laser beam passes before the reflection, and deterioration of the wave front of the detection light flux can be prevented. Consequently, detection of beams position becomes accurate.
2) The reflected beam (that is, detected beam) is not affected by absorption of the material. Loss of light quantity can be reduced because of fewer transmissible surfaces.

When using a material with high reflectance, reduction of the intensity level at the reflecting surface 206a can be prevented, and loss of light quantity can be reduced. The second surface of the transparent member 206 is also coated to reduce the power of the ghost light reflected by the second surface. When coating the first and second surfaces of the transparent member 206, coating condition 1 through coating condition 3, which are explained in the seventh embodiment above, can be employed to increase the reflectance of the first surface 206a.

Preferably, the index of refraction of the coat layer on the first surface is set larger than that of the glass material, and the thickness d of the coat layer is set within the range $0<d<\lambda/2$ (where $\lambda$ is the wavelength of the light source), as described in the seventh embodiment. With these arrangements, the reflectance of the first layer on the first surface 206a can be further increased.

The transparent member 206 may be a dustproof flat glass plate. Light flux passing through the transparent member 206 toward the effective writing area on the photosensitive unit 207 and light flux reflected by transparent member 206 toward the detectors 221, 222, and 223 share a region on the first surface 206a, and therefore, synchronizing detection can be carried out very close to the actual writing position. Accordingly, precision of synchronizing detection can be improved. In addition, the deflector (polygonal mirror) 204, the scanning lens 205, and the transparent member 206 can be made compact. A float process can be employed to process the parallel flag glass plate 206. The optical characteristic of light flux guided toward the scanned surface on the photosensitive unit 207 is substantially similar to that of light flux toward the detectors.

Figure 46:
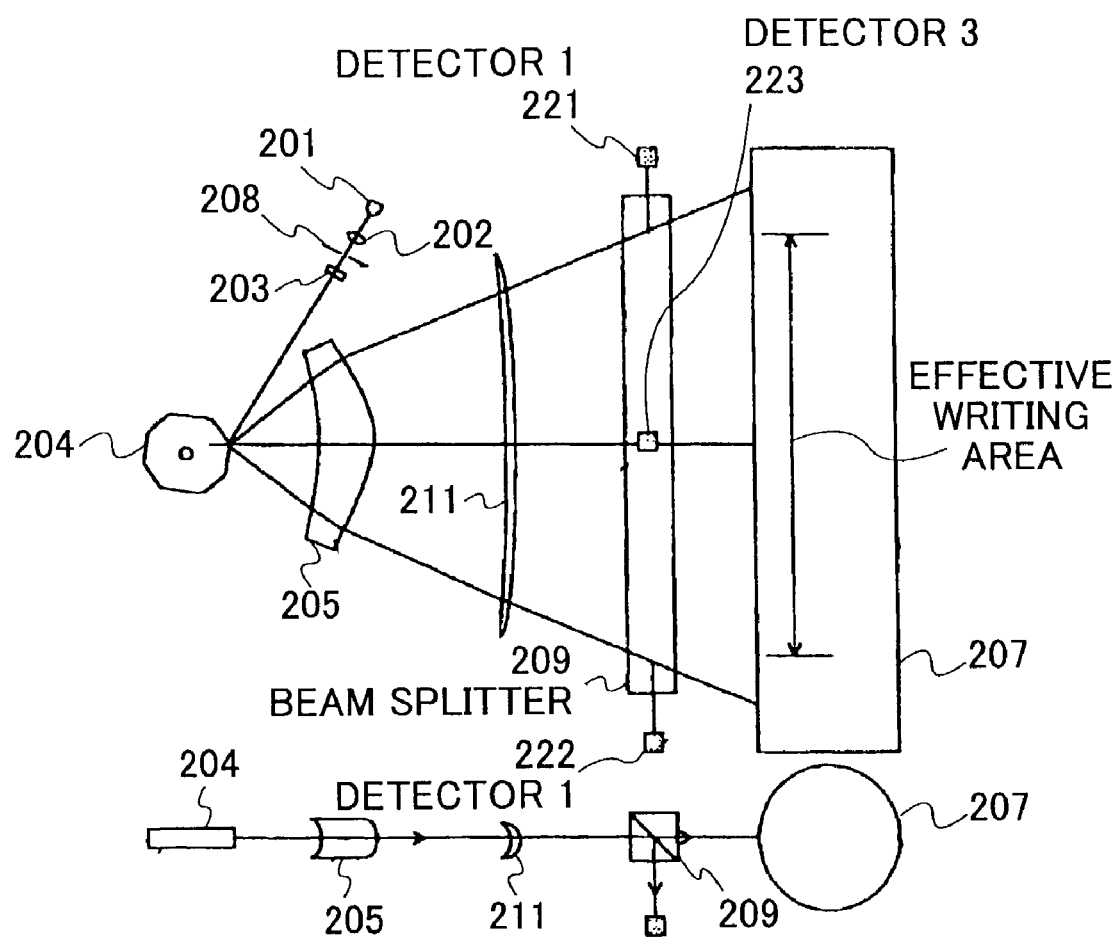
FIG. 46 illustrates a modification of the optical writing apparatus shown in FIG. 42.

FIG. 46 illustrates a modification of the optical writing apparatus shown in FIG. 42. In the modification, a beam splitter 209 consisting of a pair of right-angled prisms is used as the transparent member, in place of the flat glass plate 206. The two prisms are bonded to each other, and the bonding face is a half-mirror surface. Light flux deflected by the polygonal mirror 204 strikes the beam splitter 209 via the first and second scanning lenses 205 and 211. A portion of the incident beam to the beam splitter 209 passes through the half mirror surface, and strikes the photosensitive unit. The remaining portion of the incident beam is reflected by the half mirror surface, and bent downward, as illustrated in the bottom diagram of FIG. 46. With this arrangement, first scan is carried out on the photosensitive unit as the polygonal mirror 204 rotates, while second scan is carried out by reflection from the half mirror surface of the beam splitter 209. The first through third detectors 221, 222, and 223 are located on the second scanning line to acquire phase synchronizing signals.

Figure 47:
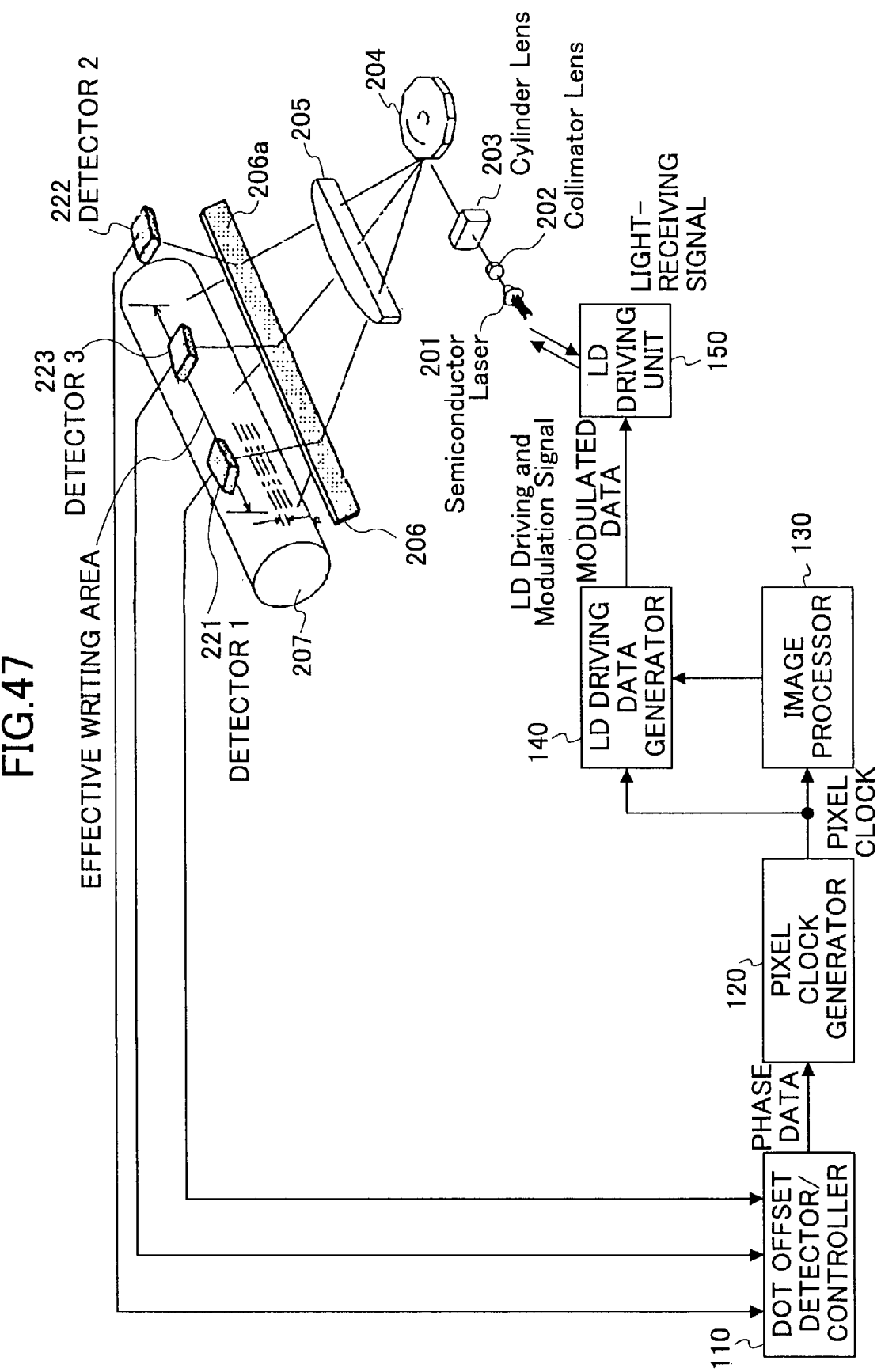
FIG. 47 illustrates the second modification of the optical writing apparatus shown in FIG. 42, in which the transparent member is tilted with respect to a plane perpendicular to the beam.
Figure 48:
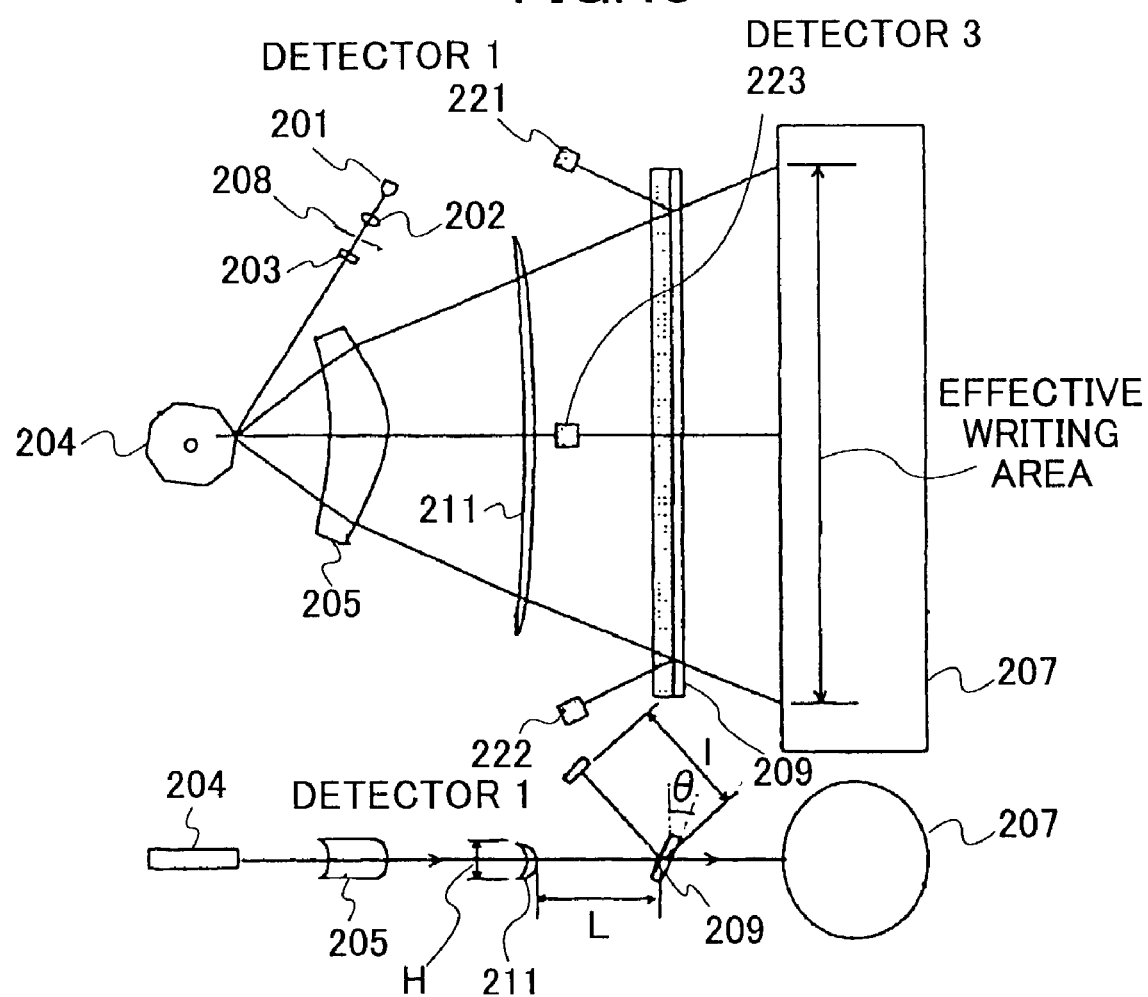
FIG. 48 illustrates the optical path from the polygonal mirror to the photosensitive unit in the optical writing apparatus shown in FIG. 47.
Figure 49:
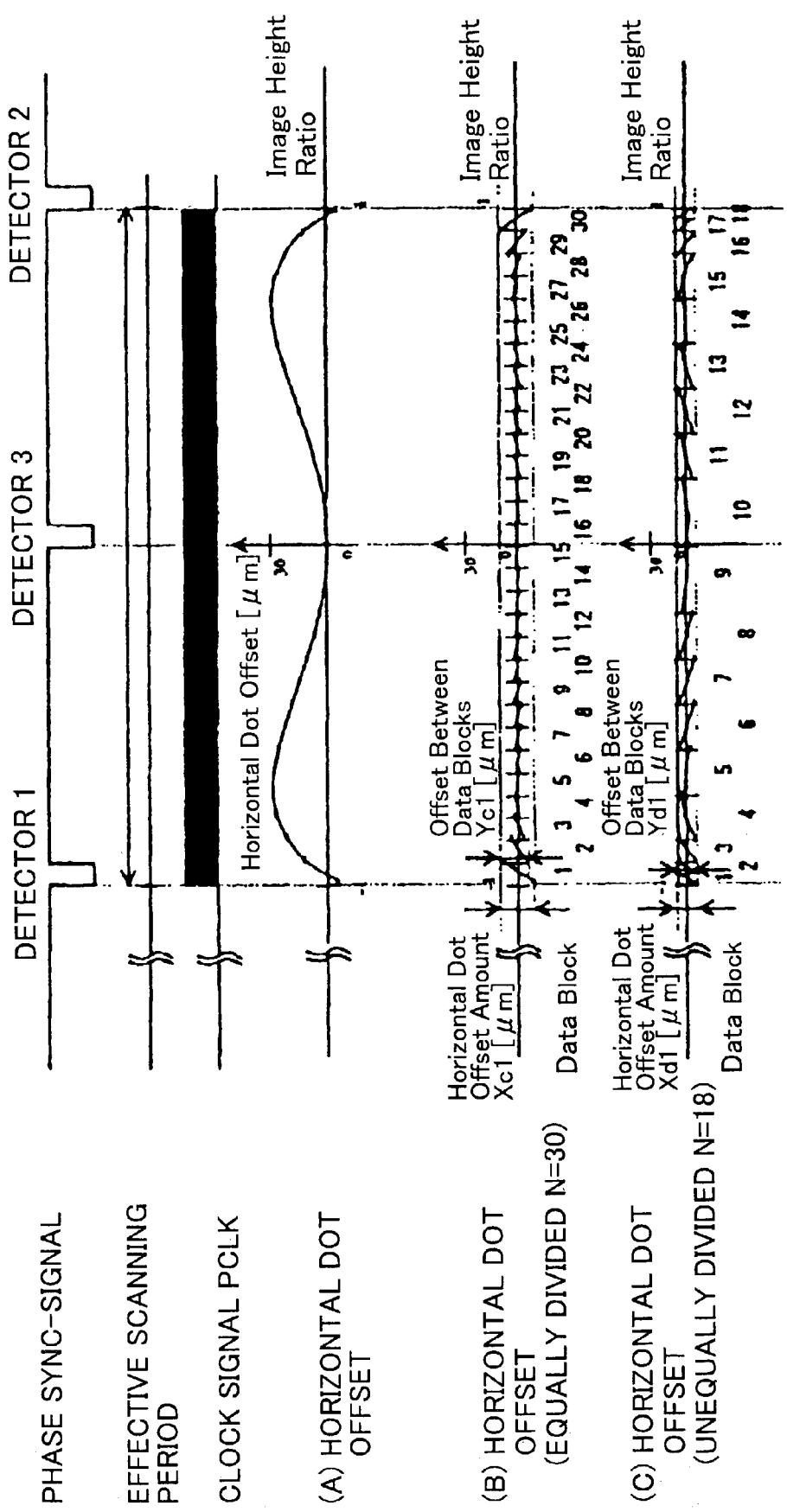
FIG. 49 illustrates the dot offset amount versus image height ratio when conducting dot offset correction using the optical writing apparatus of the eighth embodiment.

FIGS. 47-49 illustrate the second modification of the optical writing apparatus shown in FIG. 42. In the second modification, the transparent member 206 having a reflecting surface 206a is tilted, and the detectors 221, 222, and 223 are arranged so that the positions of the left-most detector 221 and the right-most detector 222 align with the writing start position and the writing end position of the effective writing area, respectively. The transparent member 206 is tilted at angle $\theta$ with respect to a plane perpendicular to the beam guided to the center of the effective writing area, as illustrated in FIG. 48.

With this arrangement, the distance between the first and second detectors 221 and 223 agrees with the length of the effective writing area, with the positions of the first and second detectors corresponding to the writing start and end positions. Light flux reflected by the reflecting surface 206a can be detected simultaneously when the beam passes through the writing start position and the writing end position of the effective writing area. Consequently, control of phase synchronization and correction for dot offset can be carried out in real time at high precision.

FIG. 49 illustrates the amount of dot offset in each data block when dot offset correction is carried out using the optical writing apparatus shown in FIG. 47. The effective writing period is divided into multiple data block, and dot offset correction is carried out for each data block, based on the phase data produced from time offset of scanning time between the first and third detectors 221 and 223, and between the third and second detectors 223 and 222, in synchronization with detection of light flux.

Any one of, and any combinations of the first through sixth embodiments can be combined with the eighth embodiment.

Ninth Embodiment

Figure 50:
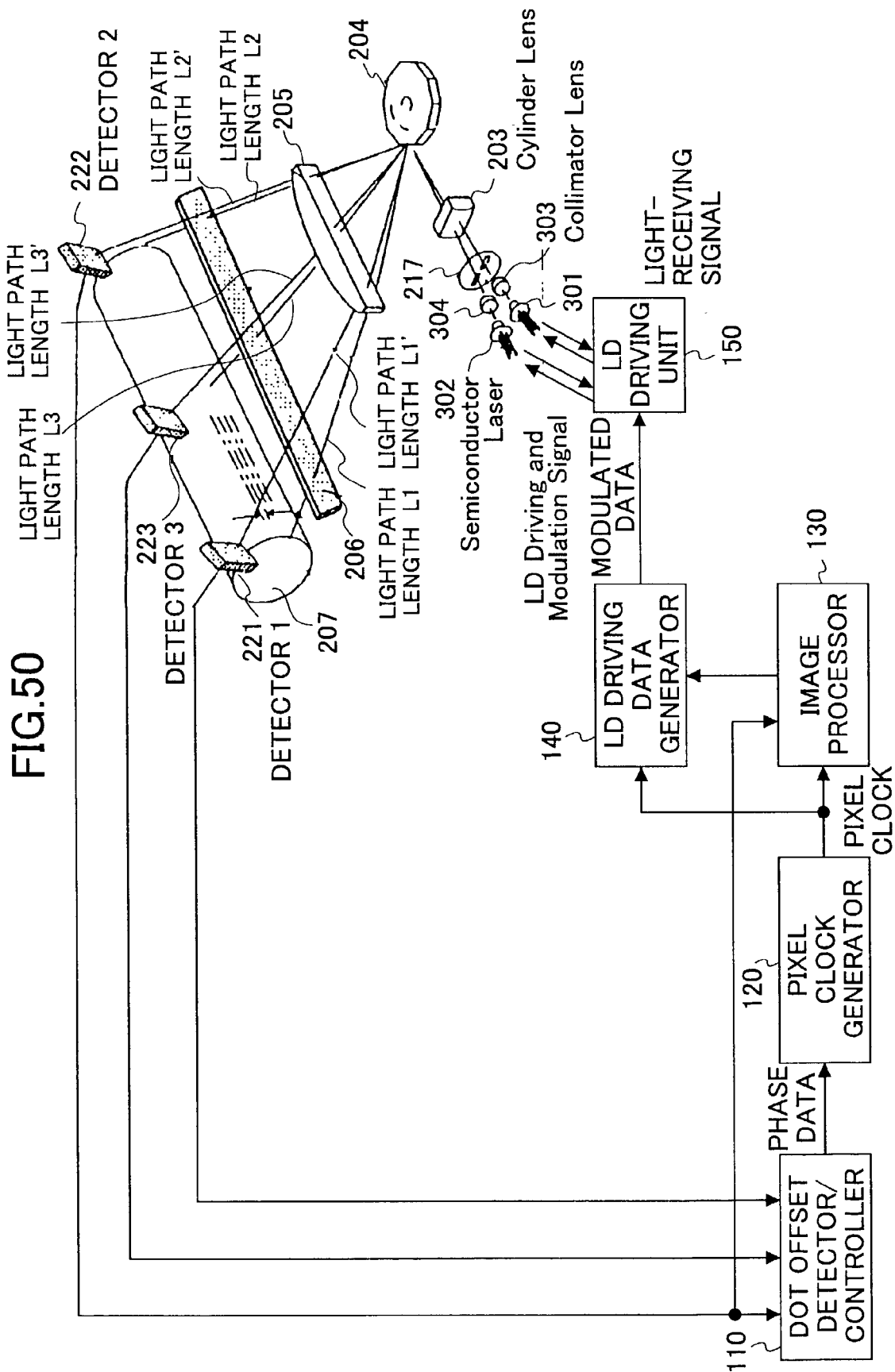
FIG. 50 illustrates an optical writing apparatus according to the ninth embodiment of the invention, in which a reference beam emitted from a reference light source is used, in addition to a writing beam.

FIG. 50 illustrates an optical writing apparatus according to the ninth embodiment of the invention. In the ninth embodiment, a reference light source (laser) 301 is used to emit a reference beam for detection, in addition to a writing light source (laser) 302 to emit a writing beam scanning on the photosensitive unit 207.

A writing beam emitted from the semiconductor laser 302, which functions as a writing light source, passes through the collimator lens 303 and the cylindrical lens 203, and is deflected by the polygonal mirror 204. The deflected beam passes through the fθ lens 205, and strikes the photosensitive unit 207 via the transparent member 206.

The semiconductor laser 301, which functions as a reference light source, emits a reference beam in the same direction as the writing light source 302. The reference beam passes through the collimator lens 304 and the cylindrical lens 203, and strikes a facet of the polygonal mirror 204 with a certain gap from the light spot of the writing light source 301 in the sub-scanning (or the vertical) direction. The reference beam deflected by the polygonal mirror 204 passes through the fθ lens 205, and successively strikes the first, the third, and the second detectors 221, 223 and 222, via the transparent member 206, as the polygonal mirror 204 rotates. The first through third detectors 221, 222, and 223 are located above the scanned surface of the photosensitive unit 207. A detection signal and a phase synchronizing signal are acquired from the reference beam incident on each of the detectors 221, 222, and 223.

The detection signals are supplied from the first through third detectors 221, 222, and 223 to the dot offset detector/controller 110. The dot offset detector/controller 110 measures scanning time between the first and third detectors 221 and 223, and between the third and second detectors 223 and 222, and produces phase data based on the offset of scanning time. The phase data is supplied to the pixel clock generator 120. The dot offset detector/controller 110 and the pixel clock generator 120 comprise a pixel clock generating unit.

The path lengths from the reference light source 301 to the first, the second, and the third detectors 221, 222, and 223 are L1', L2', and L3', respectively. The path lengths from the writing light source 302 to the light spots on the photosensitive unit 207 corresponding to the first through third detectors are L1, L2, and L3, respectively. L1', L2', and L3' are substantially the same as L1, L2, and L3, respectively so as to exclude scanning time error due to light path difference. Dot position is corrected precisely based on the phase synchronizing signal obtained from the detector having received a beam from the reference light source.

Preferably, the wavelength of the reference light source 301 is substantially the same as that of the writing light source 302 in order to reduce scanning position error and fluctuation due to wavelength difference.

If the light source is a semiconductor laser, it is preferable to use semiconductor lasers fabricated in the same lot, in order to reduce scanning position error and other fluctuation due to wavelength variation between the light sources. By reducing the wavelength variation as much as possible, dot position correction can be carried out accurately.

It is further preferable to use semiconductor lasers fabricated at close locations on the substrate in the same lot. This arrangement can further reduce wavelength variation, and consequently, scanning position error and other fluctuations can be reduced.

Figure 51:
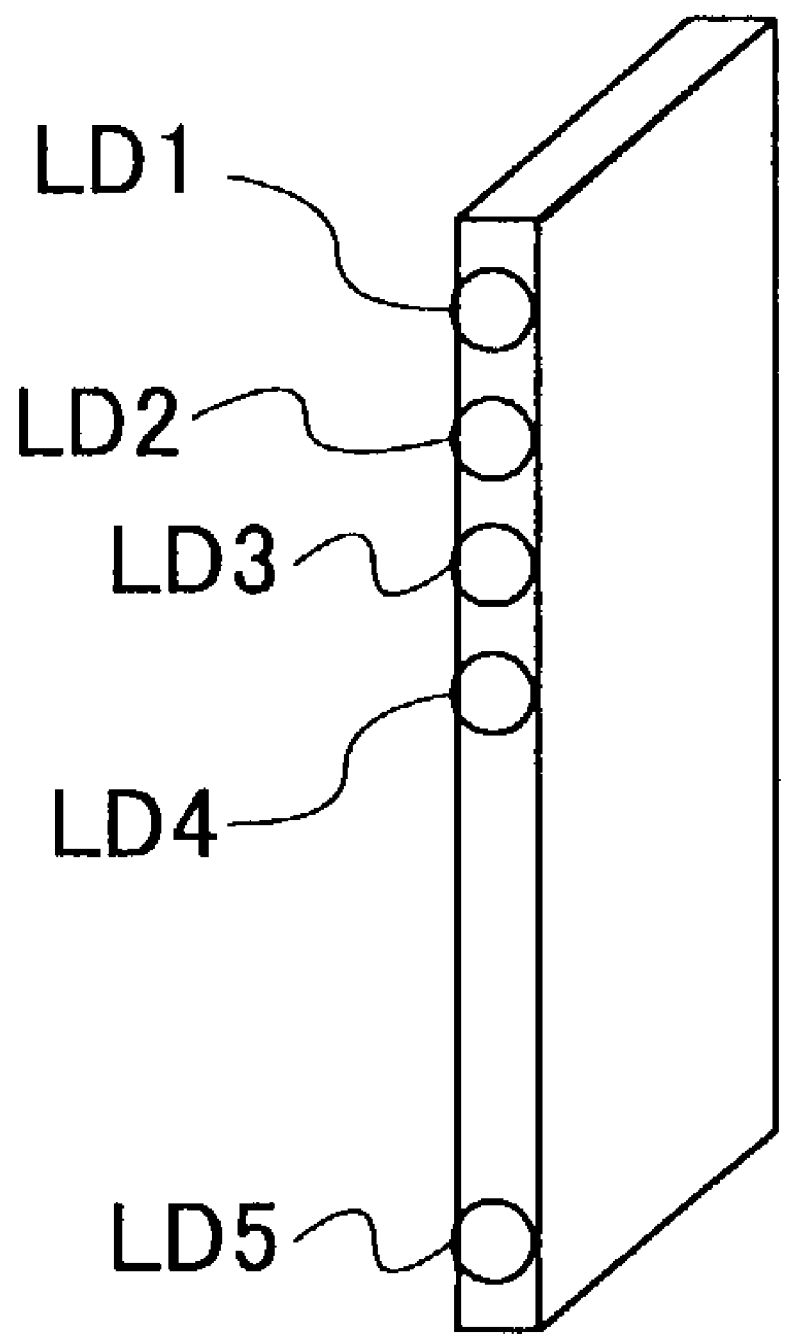
FIG. 51 illustrates an example of an integrated laser array having a reference light source.

FIG. 51 illustrates an example of semiconductor laser array having four writing light sources LD1 through LD4, and a reference light source LD5. The distance between the writing light source LD 4 and the reference light source LD 5 is set larger than the interval between two adjacent writing light sources. This arrangement facilitates separation of reference beam from the writing beam. This laser array can reduce scanning position error and fluctuations due to wavelength difference in light sources, and allows a highly precise correction of dot offset.

By using a reference beam, it is not necessary to separate a portion of light flux using a reflecting surface of the transparent member.

Any one of, and any combinations of the first through eighth embodiments can be combined with the ninth embodiment.

Tenth Embodiment

Figure 52:
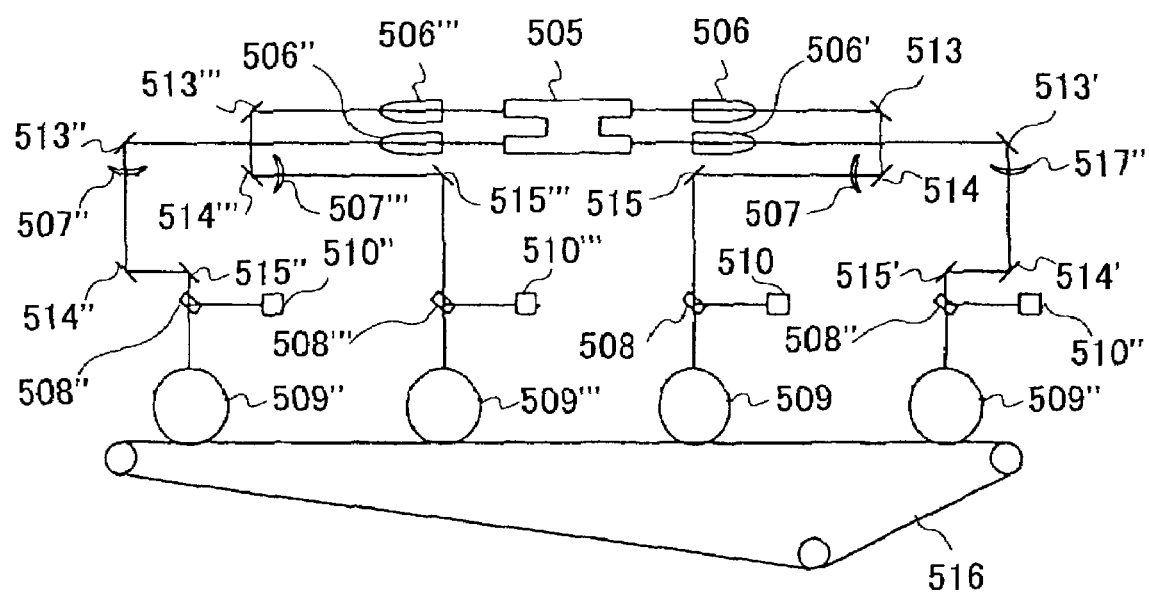
FIG. 52 schematically illustrates a tandem color imaging apparatus according to the tenth embodiment of the invention, to which the present invention is applied.

FIG. 52 illustrates a tandem color imaging apparatus having multiple photosensitive units 509-509''', each corresponding to one of cyan, magenta, yellow, and black. Separate scanning optical paths are formed to the respective photosensitive units to form different latent images on the photosensitive unit. Deflector 505 deflects beams to four cylindrical lenses 506, 506', 506'', and 506'''. Each beam passes through mirrors 513, 514, 515 and scanning lens 507. The beam then passes through the transparent member (e.g. a beam splitter) 508, and strikes on the associated photosensitive unit 509. A portion of beam is guided to the detector 510.

In general, the dot offset characteristics on the respective photosensitive units differ with each other, and therefore, the quality of the composite image is likely to deteriorate.

With application of the present invention to the tandem imaging apparatus, dot offset in the main scanning direction is precisely corrected at each photosensitive unit, and a high-quality color image can be obtained by reducing the color shift among the stations. For example, if several tens of microns of color shift occurs among the color stations, phase shift correction is made to a pixel cock that produces dot offset of more than one eighth (⅛) of dot in the main scanning direction. At 1200 dpi, the dot offset can be reduced to about 2.6 μm, which corresponds to ⅛ of dot and equals 21.2 μm/8.

As in the previous embodiments, phase data is given to each data block, not to each pixel clock, to reduce the data size for dot offset correction. As has been described above, each phase data has a correction pattern for the associated data block. Accordingly, dot offset can be corrected precisely with simplified phase data.

The tandem color structure illustrated in the tenth embodiment can be combined with any one of, or any combinations of the first through ninth embodiments.

In the first embodiment, as has been described above, a set of phase shift clock (i.e., phase data) are set for each data block, not for each pixel clock. An ASIC can be made compact with reduced cost, while achieving highly precise dot offset correction. Since phase data is given to a data block unit, adverse affection from delay in data transfer can be effectively reduced during a high-speed operation with pixel clocks of about 100 MHz.

In the second embodiment, the number of data blocks and the size of each data block can be adjusted based on, for example, the image resolution, the amount of dot offset, the slope (or the rate of change) of dot offset, the symmetry of the dot offset characteristic, etc. By adjusting the number of data blocks and each data block size, the frequency of phase shift correction can be adjusted for each data block in an efficient manner, and consequently, the amount of dot offset correction data can be further reduced. The memory size (and the chip size) can be reduced, achieving cost down.

In the third embodiment, the dot offset correction timing for each data block is shifted when the laser beam starts scanning the next line. Consequently, undesirable vertical streaks can be prevented from appearing in the resultant image, while reducing the data amount for dot offset correction.

In the fourth embodiment, a writing start position correction area and a writing end position correction are provided on both sides of the effective writing area. Accordingly, the writing start position and the writing end position can be controlled precisely. In addition, the effective writing period is divided into multiple data blocks, and phase data are given to each data block. The dot offset can be corrected precisely, while keeping the writing start position and the writing end position at correct positions.

In the fifth embodiment, the frequency of the pixel clock signal is shifted so as shift the entire dot offset profile in the positive or negative direction. Then, phase data are given to each data block. The number of times of correction can be reduced throughout the entire correction process, and the correction data amount can be reduced.

In the sixth embodiment, the optical writing apparatus has a multi-beam structure, and two or more lines of pixel data are written simultaneously, while performing dot offset correction for each data block in each line. Productivity increases, while reducing dot offset in the main scanning direction due to wavelength difference (or variation) between light sources. By performing dot offset correction (i.e., phase shift correction) for each data block, the correction data amount can be reduced.

In the seventh embodiment, a transparent member is inserted between the photosensitive unit and the deflector (or the polygonal mirror), and a pair of detectors are provided corresponding to the writing start position and the writing end position. Each detector detects light flux reflected from the transparent member, and synchronizing detection signals are produced thereby achieving real-time correction for dot offset. Phase data is produced from offset of scanning time, and is given to a data block unit. Accordingly, the data amount required for dot offset correction is greatly reduced. The memory size and the chip size are reduced, and ASIC is made compact with reduced cost.

In the eighth embodiment, three or more detectors are provided to detect synchronization. With the multi-point synchronization, accuracy of dot offset correction is further improved, while reducing the correction data amount on the basis of correction of data block unit.

In the ninth embodiment, a reference light source for emitting a reference beam is used, in addition to a writing light source. Using a reference beam, dot offset correction can be carried out accurately, while reducing the correction data amount on the basis of correction of data block unit.

In the tenth embodiment, phase shift correction is made to each color of optical path to reduce dot offset in the main scanning direction for each color in a tandem color imaging apparatus. Color offset and the resultant image deterioration can be effectively prevented.

Although the present invention has been described using specific examples, the invention is not limited to these examples, and there are many substitutions and modifications that can be made without departing from the scope of the invention.

This patent application is based on and claims the benefit of the earlier filing dates of Japanese patent application Nos. 2001-302644, 2002-011618, and 2002-079455 filed Sep. 28, 2001, Jan. 21, 2002, and Mar. 20, 2002, respectively, the entire contents of which are hereby incorporated by reference.

What is claimed is:

1. A pixel clock generating apparatus used in an optical writing system for optically producing an image at timing of a pixel clock, the pixel clock generating apparatus comprising:
   a data offset circuit configured to define multiple data blocks, each of the data blocks consisting of a predetermined number of successive clocks, and to produce phase data for each of the data blocks, the phase data representing an amount and a direction of phase shift made to a certain clock in each of the data blocks; and
   a pixel generator configured to receive the phase data from the data offset circuit and generate a phase-shifted pixel clock a predetermined number of times in each of the data blocks based on the phase data,
   wherein the data offset circuit comprises:
      a data block setting unit configured to determine said predetermined number of successive clocks in each of the data blocks,
      a phase data generating unit configured to produce the phase data for each of the data blocks based on said predetermined number of clocks and phase shift data, the phase shift data representing a number of times phase shift is to be carried out in each of the data blocks, and
      a data block setting value storage configured to store a data block setting value determined for each of the data blocks at an associated image height based on a dot offset characteristic of the optical writing system that has been measured in advance, and to read and supply the data block setting value for each of the data blocks to the data block setting unit and the phase data generating unit.

2. The pixel clock generating apparatus according to claim 1, wherein the data block setting unit determines at least one of a size of each data block and the number of the data blocks included in a scanning line of the optical writing system, based on the data block setting value.

3. The pixel clock generating apparatus according to claim 1, wherein the data block setting unit determines at least one of the size of each of the data blocks and the number of the data blocks, so that an amount of dot offset occurring in a main scanning direction of the optical writing system is reduced to or less than a prescribed value determined based on an image resolution of the optical writing system.

4. The pixel clock generating apparatus according to claim 1, wherein the data block setting unit determines at least one of the size of each data block and the number of the data blocks in response to a change in dot offset occurring in a main scanning direction of the optical writing system.

5. The pixel clock generating apparatus according to claim 1, wherein the data block setting unit determines at least one of the size of each data bock and the number of the data blocks based on a slope of dot offset occurring in the optical writing system.

6. The pixel clock generating apparatus according to claim 1, wherein if the optical writing system has a symmetric dot offset characteristic with respect to said image height of zero, the phase data generating unit generates first phase data for a first portion of the dot offset characteristic, and then generates second phase data for a second portion of the dot offset characteristic from the first phase data.

7. The pixel clock generating apparatus according to claim 1, further comprising:
   a dot offset characteristic shifting unit configured to shift the dot offset characteristic by shifting a frequency of the clock.

8. The pixel clock generating apparatus according to claim 7, where the dot offset characteristic shifting unit shifts the dot offset characteristic so that the average of dot offset occurring in the main scanning direction of the optical system becomes zero.

9. The pixel clock generating apparatus according to claim 1, further comprising a phase shift counter configured to cause the phase data generating unit to generate a phase shift timing signal every predetermined number of clocks for each of the data blocks.

10. The pixel clock generating apparatus according to claim 1, wherein the data offset circuit shifts phase shift start timing for each of the data blocks when the optical writing apparatus moves to a next scanning line.

11. The pixel clock generating apparatus according to claim 10, further comprising a data offset counter configured to shift the phase shift start timing for each of the data blocks by a predetermined number of clocks in a main scanning direction of the optical writing system.

12. The pixel clock generating apparatus according to claim 11, further comprising a reset unit configured to reset a counter value of the data offset counter when the data offset counter counts up a certain number of scanning lines.

13. The pixel clock generating apparatus according to claim 12, wherein said certain number is not constant.

14. The pixel clock generating apparatus according to claim 11, further comprising an automatic reset unit configured to automatically reset a counter value of the data offset counter when the counter value reaches a predetermined value.

15. The pixel clock generating apparatus according to claim 10, further comprising a data offset random circuit configured to change the phase shift start timing at random when the optical writing apparatus moves to the next scanning line.

16. The pixel clock generating apparatus according to claim 10, further comprising a phase shift counter configured to generate a phase shift timing signal every predetermined number of clocks for each of the data block.

17. The pixel clock generating apparatus according to claim 16, wherein the total number of clocks included in the data block is a prime number, and the phase shift counter starts counting from an initial value when proceeding to the next data block.

18. The pixel clock generating apparatus according to claim 10, wherein the pixel clock generator has a high-frequency clock generator for generating a high-frequency reference clock, and generates the phase-shifted pixel clock in synchronization with the high-frequency reference clock.

19. The pixel clock generating apparatus according to claim 10, further comprising a phase shift data timing correction circuit configured to change phase shift timing of each of the phase-shifted pixel clocks in each of the data blocks at random.

20. The pixel clock generating apparatus according to claim 19, wherein the phase shift timing is changed based on a random number signal.

21. The pixel clock generating apparatus according to claim 1, wherein the pixel clock generator has a high-frequency clock generator for generating a high-frequency reference clock, and generates the phase-shifted pixel clock in synchronization with the high-frequency reference clock.

22. An optical writing apparatus comprising:
a light source configured to emit a beam;
a photosensitive unit on which an image is optically formed;
an optical scanning system configured to guide the beam onto the photosensitive unit and let the beam scan along a scanning line on the photosensitive unit;
a pixel clock generating unit configured to generate a pixel clock; and
a light source driving unit configured to drive the light source based on the pixel clock, wherein the pixel clock generating unit comprises:
a data offset circuit configured to define multiple data blocks within an effective scanning period, each of the data blocks consisting of a predetermined number of successive clocks, and to produce phase data for each of the data blocks, the phase data representing an amount and a direction of phase shift made to a certain clock in each of the data blocks; and
a pixel generator configured to receive the phase data from the data offset circuit and generate a phase-shifted pixel clock based on the phase data,
wherein the data offset circuit comprises:
a data block setting unit configured to determine said predetermined number of successive clocks in each of the data block, and
a phase data generating unit configured to produce the phase data for each of the data blocks based on said predetermined number of clocks and phase shift data, the phase shift data representing a number of times phase shift is to be carried out in each of the data blocks,
wherein the predetermined number of successive clocks defining each data block is variable according to a dot offset measured in the main scanning direction, and
a data block setting value storage configured to store a data block setting value determined for each of the data blocks at an associated image height based on a dot offset characteristic of the optical writing system that has been measured in advance, and to read and supply the data block setting value for each of the data blocks to the data block setting unit and the phase data generating unit.

23. An imaging apparatus comprising:
an optical writing unit configured to optically form a latent image; and
an image reproducing unit configured to reproduce the latent image as a visible image, the optical writing unit comprising:
a light source configured to emit a beam;
a photosensitive unit on which the latent image is formed;
an optical scanning system configured to guide the beam onto the photosensitive unit and let the beam scan along a scanning line on the photosensitive unit; and
a pixel clock generating unit configured to generate a pixel clock and comprising:
a data offset circuit configured to define multiple data blocks within an effective scanning period, each of the data blocks consisting of a predetermined number of successive clocks, and to produce phase data for each of the data blocks, the phase data representing an amount and a direction of phase shift made to a certain clock in each data block; and
a pixel generator configured to receive the phase data from the data offset circuit and generate a phase-shifted pixel clock based on the phase data,
wherein the data offset circuit comprises:
a data block setting unit configured to determine said predetermined number of successive clocks in each of the data block, and
a phase data generating unit configured to produce the phase data for each of the data blocks based on said predetermined number of clocks and phase shift data, the phase shift data representing a number of times phase shift is to be carried out in each of the data blocks,
wherein the predetermined number of successive clocks defining each data block is variable according to a dot offset measured in the main scanning direction, and
a data block setting value storage configured to store a data block setting value determined for each of the data blocks at an associated image height based on a dot offset characteristic of the optical writing system that has been measured in advance, and to read and supply the data block setting value for each of the data blocks to the data block setting unit and the phase data generating unit.

24. An imaging apparatus comprising:
multiple optical writing units corresponding to multiple colors, each configured to optically form a latent image of an associated color; and
an image reproducing unit for reproducing a color image based on the latent images formed by the optical writing units, each of the optical writing units comprising:
a light source configured to emit a beam;
a photosensitive unit on which the latent image is formed;

an optical scanning system configured to guide the beam onto the photosensitive unit and let the beam scan along a scanning line on the photosensitive unit; and a pixel clock generating unit configured to generate a pixel clock, the pixel clock generating unit comprising a data offset circuit that defines multiple data blocks within an effective scanning period, each data block consisting of a predetermined number of successive clocks, and produces phase data for each of the data blocks, the phase data representing an amount and a direction of phase shift made to a certain clock in each of the data blocks, and a pixel generator configured to receive the phase data from the data offset circuit and generate a phase-shifted pixel clock based on the phase data;

wherein the data offset circuit comprises:
  a data block setting unit configured to determine said predetermined number of successive clocks in each of the data block, and
  a phase data generating unit configured to produce the phase data for each of the data blocks based on said predetermined number of clocks and phase shift data, the phase shift data representing a number of times phase shift is to be carried out in each of the data blocks,
  wherein the predetermined number of successive clocks defining each data block is variable according to a dot offset measured in the main scanning direction, and
  a data block setting value storage configured to store a data block setting value determined for each of the data blocks at an associated image height based on a dot offset characteristic of the optical writing system that has been measured in advance, and to read and supply the data block setting value for each of the data blocks to the data block setting unit and the phase data generating unit.

25. A method for generating a pixel clock used in an optical writing apparatus when optically writing pixel data, the method comprising:
  defining multiple data blocks, each of the data blocks consisting of a predetermined number of successive clocks;
  producing phase data for each of the data blocks, the phase data representing an amount and a direction of phase shift that is to be made to a certain clock in each of the data blocks;
  generating a phase-shifted pixel clock based on the phase data;
  determining a number of data blocks included in one scanning line so that a difference in dot offset in a main scanning direction among the data blocks does not exceed a prescribed value corresponding to a pixel resolution;
  shifting timing of generating the phase-shifted pixel clock for each of the data blocks every time the optical writing apparatus moves to a next scanning line, incrementing a counter; and
  when said shifting of timing of phase-shifted pixel clock is carried out for a prescribed number of scanning lines, resetting the counter.

26. The method according to claim 25, wherein at least one of the number of data blocks and a size of each data block are variable depending on an amount of change of said dot offset in the main scanning direction.

27. The method according to claim 26, wherein if the amount of change in dot offset in the main scanning direction is large, the size of a corresponding data block is set small, and if the amount of change in dot offset in the main scanning direction is small, the size of a corresponding data block is set large.

28. The method according to claim 25, wherein a size of each of the data blocks is varied depending on a slope of dot offset in the main scanning direction.

29. The method according to claim 25, further comprising:
  determining whether a dot offset characteristic of the optical writing apparatus is symmetric; and
  if the dot offset characteristic is symmetric, Producing first phase data for a first half of the dot offset characteristic, and producing second phase data for the second half of the dot offset characteristic based on the first phase data.

30. The method according to claim 25, further comprising:
  defining an effective writing area corresponding to an effective writing period;
  defining a writing start area and a writing end area on both sides of the effective writing area; and
  giving said phase data to each of the effective writing area, the writing start area, and the writing end area.

31. The method according to claim 25, further comprising:
  changing a frequency of said successive clocks to shift a dot offset characteristic of the optical writing apparatus as a whole in a negative or positive direction with respect to an amount of dot offset in a main scanning direction.

32. The method according to claim 31, wherein the dot offset characteristic is shifted so that an average of the amount of dot offset in the main scanning direction becomes zero.

33. The method according to claim 25, wherein the phase-shifted pixel clock is generated every predetermined number of clocks in each of the data blocks.

34. The method according to claim 25, wherein said timing of generating the phase-shifted pixel clock is shifted at random for each of the phase-shifted pixel clock in each of the data blocks.

35. The method according to claim 25, further comprising:
  generating a high-frequency reference clock, wherein the phase-shifted pixel clock is generated in synchronization with the high-frequency reference clock.

* * * * *